(12) United States Patent
Hall et al.

(10) Patent No.: US 8,899,060 B2
(45) Date of Patent: Dec. 2, 2014

(54) METHODS AND APPARATUS FOR COOLING ELECTRONICS

(75) Inventors: Shawn Anthony Hall, Pleasantville, NY (US); Gerard Vincent Kopcsay, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 13/173,082

(22) Filed: Jun. 30, 2011

(65) Prior Publication Data
US 2013/0006427 A1    Jan. 3, 2013

(51) Int. Cl.
*H05K 7/20* (2006.01)
*G05D 23/19* (2006.01)
*G06F 1/20* (2006.01)

(52) U.S. Cl.
CPC ............ *G05D 23/1919* (2013.01); *G06F 1/206* (2013.01); *Y02B 60/1275* (2013.01)
USPC ......................................... 62/259.2; 361/689

(58) Field of Classification Search
USPC ............... 625/259.2; 361/688, 689, 690, 699, 361/701; 62/259.2
See application file for complete search history.

(56) References Cited

U.S. PATENT DOCUMENTS

| 6,896,404 B2 * | 5/2005 | Seki et al. ......................... 374/29 |
| 7,472,558 B1 * | 1/2009 | Narita .............................. 62/175 |
| 2011/0100045 A1 * | 5/2011 | Carlson .......................... 62/259.2 |

* cited by examiner

*Primary Examiner* — Cheryl J Tyler
*Assistant Examiner* — Jonathan Bradford
(74) *Attorney, Agent, or Firm* — Scully, Scott, Murphy & Presser, P.C.; Daniel P. Morris, Esq.

(57) ABSTRACT

Methods and apparatus are provided for choosing an energy-efficient coolant temperature for electronics by considering the temperature dependence of the electronics' power dissipation. This dependence is explicitly considered in selecting the coolant temperature $T_0$ that is sent to the equipment. To minimize power consumption $P_{Total}$ for the entire system, where $P_{Total}=P_0+P_{Cool}$ is the sum of the electronic equipment's power consumption $P_0$ plus the cooling equipment's power consumption $P_{Cool}$, $P_{Total}$ is obtained experimentally, by measuring $P_0$ and $P_{Cool}$, as a function of three parameters: coolant temperature $T_0$; weather-related temperature $T_3$ that affects the performance of free-cooling equipment; and computational state C of the electronic equipment, which affects the temperature dependence of its power consumption. This experiment provides, for each possible combination of $T_3$ and C, the value $T_0^*$ of $T_0$ that minimizes $P_{Total}$. During operation, for any combination of $T_3$ and C that occurs, the corresponding optimal coolant temperature $T_0^*$ is selected, and the cooling equipment is commanded to produce it.

12 Claims, 34 Drawing Sheets

```
for(i = 0; i ≤ i_max; ++i) {                                                          (402)
    T_3[i] = (T_3)_min + (i / i_max)[(T_3)_max - (T_3)_min]                           (404)
    for(j = 0; j ≤ j_max; ++j) {                                                      (406)
        Cause computers 302 to perform the computational task designated by C_j.     (408)
        T_0*(i,j) = (T_0)_min                                                         (410)
        P* = 9E99;                                                                    (412)
        for((T_0)_set = (T_0)_min; (T_0)_set ≤ (T_0)_max-allowed; (T_0)_set += ΔT_0) {  (414)
            while(|(T_0)_set - (T_0)_meas| > ε);                                      (416)
            Read(P̄_0);                                                                (418)
            Read(P̄_Cool);                                                             (420)
            P̄_Total = P̄_0 + P̄_Cool;                                                   (422)
            if(P̄_Total < P*) {                                                        (424)
                P* = P̄_Total;                                                         (426)
                T_0*[i][j] = T_0;                                                     (428)
            } // if                                                                   (430)
        } // for T_0                                                                  (432)
    } // for j (Loop on C)                                                            (434)
} // for i (Loop on T_3)                                                              (436)
```

$T_0^* = (T_0)_{min}$ (610)

$P^* = 9E99;$ (612)

$\text{for}\big((T_0)_{set} = (T_0)_{min}; (T_0)_{set} \leq (T_0)_{max-allowed}; (T_0)_{set} += \Delta T_0\big) \{$ (614)

$\quad \text{while}\big(|(T_0)_{set} - (T_0)_{meas}| > \varepsilon\big);$ (616)

$\quad \text{Read}(\bar{P}_0);$ (618)

$\quad \text{Read}(\bar{P}_{Cool});$ (620)

$\quad \bar{P}_{Total} = \bar{P}_0 + \bar{P}_{Cool};$ (622)

$\quad \text{if}\big(\bar{P}_{Total} < P^*\big) \{$ (624)

$\quad\quad P^* = \bar{P}_{Total};$ (626)

$\quad\quad T_0^* = (T_0)_{set};$ (628)

$\quad \} \text{ // if}$ (630)

$\} \text{ // for } (T_0)_{set}$ (632)

$(T_0)_{Set} = T_0^*;$ (634)

Figure 7

(a)
```
while(1) {
    Algorithm 600: Lines (610)–(634)    (606)
    sleep(Δt);                           (636)
}
```

(b)
```
while(1) {
    Algorithm 600: Lines (610)–(634)    (608)
    P̄₀_OLD = P̄₀;                        (638)
    P̄_Cold_OLD = P̄_Cold;                 (640)
    while ( |Read(P̄₀) − P̄₀_OLD| < ε₁
          & |Read(P̄_Cool) − P̄_Cool_OLD| < ε₂ );    (642)
} //while(1)
```

Figure 11

| Computational State | Case # | $T_0$ [°C] | $\overline{T_0}$ [°C] | $P_0$ [W] | $T$ [°C] | $\lambda$ | $P_{ref}$ [W] | $(P_0)_{16°C}$ [W] | $\kappa$ | $\overline{\mathfrak{R}}$ [°C/W] |
|---|---|---|---|---|---|---|---|---|---|---|
| Un-Initialized | A | | | 256.9 | 25.0 | 0.6686 | 226.3 | 242.95 | 0.01789 | 0.769 |
| | B | | | 469.6 | 69.5 | | | | | |
| Idle | C | 15.0 | 17.0 | 935.7 | 38.1 | 0.1612 | 867.8 | 937.2 | | |
| | D | 25.0 | 27.1 | 978.2 | 48.5 | | | | | |
| Full Power | E | 15.0 | 18.3 | 1558.1 | 56.8 | 0.08839 | 1422.9 | 1541.1 | | |
| | F | 25.0 | 28.4 | 1610.9 | 67.1 | | | | | |

Figure 28

| Slide # | $\kappa$ | $\overline{\Re}\ [°C/W]$ | $\dfrac{\rho cV}{UA}$ | $\alpha$ |
|---|---|---|---|---|
| 29 | 0.15 | 0.769 | 0.5 | 0.15 |
|    | 0.20 |       |     |      |
|    | 0.22 |       |     |      |
| 30 | 0.01789 | 0.2 | 0.2 | 0.15 |
|    |         | 0.5 | 1.0 |      |
|    |         | 1.0 | 2.0 |      |
| 31 | 0.01789 | 0.769 | 0.5 | 0.10 |
| 32 |         |       |     | 0.15 |

```
for(i = 0; i ≤ i_max; ++i) {                                                    (3302)
    T_3[i] = (T_3)_min + (i / i_max)[(T_3)_max - (T_3)_min]                     (3304)
    for(j = 0; j ≤ j_max; ++j) {                                                (3306)
        Cause computers 302 to perform the computational task designated by C_j. (3308)
        T_0*(i,j) = (T_0)_min                                                    (3310)
        P* = 9E99;                                                               (3312)
        for(k = 1; k ≤ 2; ++k) {                                                 (3314)
            switch(k) {                                                          (3316)
                case 1: (T_0)_set = (T_0)_min; break;                            (3318)
                case 2: (T_0)_set = (T_0)_Local Min; break;                      (3320)
            } // switch(k)                                                       (3322)
            while(|(T_0)_set - (T_0)_meas| > ε);                                 (3324)
            Read(P̄_0);                                                          (3326)
            Read(P̄_Cool);                                                       (3328)
            P̄_Total = P̄_0 + P̄_Cool;                                           (3330)
            if(P̄_Total < P*) {                                                  (3332)
                P* = P̄_Total;                                                   (3334)
                T_0*[i][j] = T_0;                                                (3336)
            } // if                                                              (3338)
        } // for T_0                                                             (3340)
    } // for j (Loop on C)                                                       (3342)
} // for i (Loop on T_3)                                                         (3344)
```

$T_0^* = (T_0)_{min}$ (3410)
$P^* = 9E99$; (3412)
for($k = 1; k \leq 2; ++k$) { (3414)
  switch($k$) { (3416)
    case 1: $(T_0)_{set} = (T_0)_{min}$; break; (3418)
    case 2: $(T_0)_{set} = (T_0)_{Local\,Min}$; break; (3420)
  } // switch($k$) (3422)
  while($|(T_0)_{set} - (T_0)_{meas}| > \varepsilon$); (3424)
  Read($\bar{P}_0$); (3426)
  Read($\bar{P}_{Cool}$); (3428)
  $\bar{P}_{Total} = \bar{P}_0 + \bar{P}_{Cool}$; (3430)
  if($\bar{P}_{Total} < P^*$) { (3432)
    $P^* = \bar{P}_{Total}$; (3434)
    $T_0^* = (T_0)_{set}$; (3436)
  } // if (3438)
} // for $(T_0)_{set}$ (3440)
$(T_0)_{Set} = T_0^*$; (3442)

METHODS AND APPARATUS FOR COOLING ELECTRONICS

This invention was made with Government support under Contract No. B554331 awarded by the Department of Energy. The Government has certain rights in this invention.

The present invention is related to the cooling of electronics, such as computer equipment in a data center. More specifically, this invention is related to methods and apparatus for optimizing the energy efficiency of cooling such electronic equipment when the temperature dependence of the electronics' power dissipation is considered in conjunction with the power dissipated in cooling equipment such as a chiller. In particular, when a chiller is used in conjunction with a free-cooling heat exchanger, the invention provides apparatus and methods for choosing the temperature of coolant provided to the electronics that minimizes the overall power consumption of the system.

BACKGROUND

In a manner similar to an electric light bulb that gives off heat when it is powered on, electronics such as computer equipment dissipate electrical power as heat. In many cases, to prevent the electronics from overheating, that heat must be removed by a cooling system, typically using a cooling fluid such as air or water that is passed through the electronics. The current invention applies to all types of cooling fluids and many types of electronic equipment, but for specificity, consider the example of a liquid-cooled computer. Referring to the traditional system 100 shown in FIG. 1, electrical power is consumed by liquid-cooled computers 102 in a machine-room 104. The computers' electrical power is dissipated as an arbitrary number of power consumptions (or heat loads) $P_A$, $P_B$, ..., $P_X$, which are removed to the outside world in several steps.

First, the power consumption of the electronics (or aggregate machine-room heat load)

$$P_0 = P_A + P_B + \ldots + P_X \quad (1)$$

is transferred from the computers to a liquid coolant 106, which enters each computer at a cold temperature $T_0$, and flows under pressure created by pump 108 in a closed loop of liquid-coolant pipes. The pump 108 creates an additional power consumption (or heat load) $P_1$.

Second, in chiller 110, the combined heat load $P_0+P_1$ is transferred from the liquid coolant 106 to a refrigerant 112, which flows in a closed loop of refrigerant pipes, wherein evaporation of the refrigerant 112 occurs during its absorption of heat load $P_0+P_1$, and compression of the refrigerant occurs in a compressor 114. The compressor 114 creates an additional heat load $\alpha(P_0+P_1)$ that is proportional to the incident heat load $P_0+P_1$. The proportionality factor $\alpha$ is a characteristic of the compressor 114. The temperature $T_0$ entering computers 102 is maintained by feedback circuitry comprising a temperature-measurement device 116 and a processing device 118 that compares the measured value $T_0$ to a user-defined set-point temperature $(T_0)_{Set}$, and commands the chiller 110 to drive the difference $T_0-(T_0)_{Set}$ to zero by modulation of the compressor 114.

Third, heat load $(1+\alpha)(P_0+P_1)$ is transferred from the refrigerant 112 to condenser water 120, which flows under pressure created by pump 122 in a closed loop of condenser-water pipes, with the transfer of heat $(1+\alpha)(P_0+P_1)$ causing condensation of the refrigerant 112. The pump 122 creates an additional heat load $P_2$.

Fourth, by means of a cooling tower 124, which typically contains an air mover 126 that produces an additional heat load $P_3$, heat load $(1+\alpha)(P_0+P_1)+P_2+P_3$ is transferred from the condenser water 120 to the outside air.

The "useful" electrical power consumed in the machine room 104 by computers 102 is $P_0$, whereas the "overhead" power consumed by the cooling equipment in system 100 is, by inspection of FIG. 1, $$P_{Cool}^{(100)} = P_1 + \alpha(P_0+P_1) + P_2 + P_3. \quad (2)$$

Thus, the total electrical power consumed by system 100 is $$P_{Total}^{(100)} = P_0 + P_{Cool}^{(100)}. \quad (3)$$

In equations (2) and (3), superscript "(100)" indicates that the symbols apply to system 100.

The dominant term on the right-hand side of equation (2) is the compressor power $\alpha(P_0+P_1)$, where the chiller-overhead fraction $\alpha$ is typically 0.10 to 0.20. Consequently, to save some or all of compressor power a $(P_0+p)$, the concept of "free cooling" has been developed in prior art, as described, for example, in "Free Cooling Using Water Economizers", by Susanna Hanson and Jeanne Harshaw, *TRANE Engineers Newsletter*, Volume 37-3, September 2008, which is incorporated herein in its entirety by reference. It is worth noting that in the Unites States, the overhead fraction $\alpha$ is often expressed in kW/ton, where a ton of cooling is 3.517 kW. Thus, for example, 0.53 kW/ton corresponds to the dimensionless value $\alpha = 0.53/3.517 = 0.15$.

Referring to FIG. 2, a typical "free cooling" system 200 is to some extent similar to the traditional system 100; namely, callouts 202 through 226 of system 200, shown on FIG. 2, are exactly analogous, respectively, to callouts 102 through 126 of system 100, shown on FIG. 1. However, system 200 is distinguished from system 100 by the addition of a free-cooling heat exchanger 230 to the loop of liquid-coolant loop 206, which allows the liquid coolant 206 to reject some of its heat load $P_0+P_1$ to free-cooling water 232. Let $$\beta = \text{Fraction of heat load } P_0+P_1 \text{ that coolant 206 rejects to free-cooling water 232 via the free-cooling heat exchanger 230.} \quad (4)$$

Free-cooling water 232 flows under pressure created by a pump 234 in a closed loop of pipes. The pump 234 creates an additional heat load $P_6$. By means of a cooling tower 238, which typically contains an air mover 240 that produces additional heat load $P_7$, a heat load $\beta(P_0+P_1)+P_6+P_7$ is transferred from the free-cooling water 232 to outside air.

System 200 is further distinguished from system 100 by the addition of feedback circuitry comprising a device 242 to measure temperature $T_3$ and to communicate this measurement to processing device 218. System 200 is further distinguished by the addition of electrical feedback from processing device 218 to pump 234 to enable speed modulation of the pump is cases where $T_3 < T_0$, so that the liquid coolant does not become too cold, and also to enable powering off the pump in cases where $T_3 > T_1$, to prevent undesired heating of the liquid coolant as it passes through the free-cooling heat exchanger 230.

Because of the heat-load rejection $\beta(P_0+P_1)$ from liquid coolant 206 by means of heat exchanger 230, the amount of remaining heat to be rejected to the refrigerant 212 in system 200 is $(1-\beta)(P_0+P_1)$. Thus, the incident heat load on the compressor 214 in system 200 is a factor of $1-\beta$ smaller than that on the compressor 114 in system 100. Because we assume the compressors 114 and 214 to be otherwise identical, the power consumption of compressor 214 in system 200 is likewise reduced by the factor $1-\beta$ compared to compressor 114 in system 100. That is, system 200's compressor 214 consumes only $(1-\beta)\alpha(P_0+P_1)$.

In comparing systems 100 and 200 to assess how much power is saved by "free cooling", the useful electrical power $P_0$ consumed in the machine room 204 of system 200 is naturally assumed to be the same as that consumed in the machine room 104 of system 100. This assumption merely states that, to make a fair comparison, the computers 202 in system 200 are identical to the computers 102 in system 100, and are performing identical computations.

The "overhead" power consumed by cooling equipment in system 200 is $$P_{Cool}^{(200)} = P_1 + (1-\beta)\alpha(P_0+P_1) + P_4 + P_5 + P_6 + P_7. \qquad (5)$$

Comparing equations (2) and (5) yields the power-saving advantage of system 200 over system 100:

$$\Delta P = P_{Cool}^{(100)} - P_{Cool}^{(200)} = \beta\alpha(P_0+P_1) + (P_2+P_3) - (P_4+P_5+P_6+P_7) \qquad (6)$$

The power consumed by pumps ($P_1$, $P_4$, $P_6$) and air movers ($P_5$, $P_7$) is typically small compared to that consumed by the refrigerant-loop compressor, so the first term on the right-hand side of equation (6), $\beta\alpha(P_0+P_1)$, is the dominant term. Moreover, if the pumps 122, 222, and 234 as well as the cooling-tower air movers 126, 226, and 240 are controlled so that power consumed is proportional to incident heat load, then $$P_4 = (1-\beta)P_2; P_6 = \beta P_2 \qquad (7)$$

and $$P_5 = (1-\uparrow)P_3; P_7 = \beta P_3. \qquad (8)$$

Assuming this type of control, by combination of equations (7) and (8), $$P_4+P_5+P_6+P_7 = P_2+P_3, \qquad (9)$$

whence, substituting equation (9) into equation (6), the second the third terms on the right-hand side of equation (6) disappear, and the power saving from free cooling becomes simply $$\Delta P = P_{Cool}^{(100)} - P_{Cool}^{(200)} = \beta\alpha(P_0+P_1). \qquad (10)$$

Equation (10) implies that to maximize the amount of saved power $\Delta P$, $\beta=1$ is desired, whereby the entire incident heat load $P_0+P_1$ on free-cooling heat exchanger 230 is rejected thereby. In such a scenario, the chiller 210, pump 222, and cooler tower 126 may be turned off. In fact, if $\beta=1$ can be achieved at all times, then the chiller 212, pump 222, and cooling tower 224 are superfluous and need not be purchased. This is the most aggressive objective of the free-cooling paradigm.

Still referring to FIG. 2, this aggressive objective can typically only be achieved, unfortunately, by permitting the coolant 206 that enters computers 202 to have a high temperature $T_0$. In general, from energy arguments, the relation between $\beta$ and coolant temperatures is $$\beta = \frac{T_1 - T_2}{T_1 - T_0}. \qquad (11)$$

Consequently, if the chiller 210 is turned off or absent, then $\beta=1$, so, according to equation (11), $T_2=T_0$. But $T_2$ is weather dependent, because the temperature $T_3$ of water returning from the cooling tower 238 depends on the wet-bulb temperature $T_{WB}$ of ambient outside air, which depends on geographical location and season. The wet bulb temperature $T_{WB}$ currently never exceeds 31° C. anywhere on earth, but may be higher in the future due to climate change, as reported by Steven C. Sherwood and Matthew Huber in "An adaptability limit to climate change due to heat stress", *Proceedings of the National Academy of Sciences*, May 2010, (0913352107), which is included herein in its entirety by reference. Temperature $T_3$ exceeds $T_{WB}$ by an amount $\Delta T_{CT}$, sometimes called the "cooling-tower approach temperature", which is a function of several variables (see the aforementioned *TRANE Engineers Newsletter*) but typically in the range of 1 to 5° C. Thus, $$T_3 = T_{WB} + \Delta T_{CT}. \qquad (12)$$

Moreover, temperature $T_2$ exceeds $T_3$ by an amount $\Delta T_{HX}$, sometimes called the "heat-exchanger approach temperature", which is typically in the range of 1 to 2° C. Thus, $$T_2 = T_{WB} + \Delta T_{CT} + \Delta T_{HX}. \qquad (13)$$

Consequently, to achieve year-round free cooling anywhere on earth under current climate conditions, the water-inlet temperature $T_0$ to computers 202 may need to be as high as $$(T_0)_{max} = (T_{WB})_{max} + (\Delta T_{CT})_{max} + (\Delta T_{HX})_{max} = 31+5+2 = 38° C. \qquad (14)$$

In contrast, $$(T_0)_{min} \equiv 16° C. \qquad (15)$$

is just warm enough to avoid condensation of air-borne moisture for "Class 1" machine-room conditions, as specified by the American Society of Heating, Air-Conditioning, and Refrigeration Engineers (ASHRAE) in "Thermal Guidelines for Data Processing Environments, $2^{nd}$ edition", ISBN 978-1-933742-46-5, which in included herein in its entirety by reference. Specifically, ASHRAE's "Recommended" Class 1 envelope in psychrometric space is bounded above by a 15° C. dew-point, which implies, with a 1° C. margin of safety, that $T_0=16°$ C. is the minimum safe temperature at which air-borne water is guaranteed not to condense inside the computers 202.

Less aggressive than equation (14), a more typical free-cooling option is to choose a moderate set-point value of $T_0$, and to retain the chiller 210, pump 222, and cooling tower 224 so that, when weather precludes the free-cooled temperature $T_2$ from reaching the desired set-point $T_2=(T_0)_{Set}$, the chiller can make up the difference. Even in such systems, with a chiller present as in system 200, users of computers and other electronic equipment urge manufacturers to design their equipment to allow high inlet temperature $T_0$ so that, despite adverse weather conditions, the fraction $\beta$ of the heat load removed by the heat exchanger 230 remains high, and thus the power-saving $\Delta P$, given by equation (10), remains large. This strategy says that maximizing the amount of free cooling is always better—even if it means higher water inlet temperature $T_0$ to the computers 202.

The current invention calls this strategy into question, purely on the basis of power savings. It explains why maximizing the amount of free cooling, regardless of $T_0$, does not necessarily save energy, but may actually waste energy. Based on this insight, the invention provides, for a system like system 200, an innovative method and apparatus to determine the value of $T_0$ that actually provides the greatest conservation of energy. Depending on the weather-related temperature 7; and the computational state C, the power-optimal solution may be for the chiller 310 to provide some or even all of the cooling, despite the presence of the free-cooling heat exchanger 330.

SUMMARY OF THE INVENTION

For computers and other electronic equipment, power dissipation depends on temperature. In particular, for CMOS (Complementary Metal-Oxide-Semiconductor) circuits, power is an increasing function of junction temperature $T_j$ of CMOS transistors, due to a component of leakage power called sub-threshold leakage, which depends exponentially on temperature, as described, for example, in *Leakage in Nanometer CMOS Technologies*, edited by Siva G. Narenda and Anantha Chandrakasan, published by Springer, 2010, ISBN-13 978-1-4419-3826-8, which is included herein in its entirety by reference. As a result, power dissipation in CMOS circuits is an increasing function of the inlet temperature $T_0$ of the coolant, because increasing $T_0$ by $\Delta T$ also increases $T_j$ directly by $\Delta T$, and even slightly more, because the additional sub-threshold leakage power attending the higher $T_j$ increases the cooling load, leading to a small additional temperature burden through the cooling path.

Combining the understanding that power dissipation depends on temperature with the foregoing discussion relating to FIGS. 1 and 2, it appears that power conservation in electronics is antithetical to power conservation in the associated cooling system. On the one hand, to conserve power in the electronics, the inlet temperature $T_0$ of the coolant should always be as low as possible; namely $T_0=(T_0)_{min}$, where $(T_0)_{min}$ is specified by equation (15). On the other hand, as explained in the foregoing discussion, to conserve power in the cooling system despite weather, $T_0$ should be allowed to be as high as possible, so that free-cooling may be fully used, year-round, in all climates.

According to this invention, the above dichotomy suggests optimization: by striking a balance between the needs of the electronics and the capabilities of the cooling system, it is possible to find an optimum temperature $T_0^*$ that minimizes the aggregate power consumption of the electronic equipment and the cooling equipment combined. The invention specifies methods and apparatus to choose, for a given system, the optimum value $T_0^*$ of the set-point temperature $(T_0)_{Set}$, despite the fact that this optimum is a function of the weather as well as the computational work-load of the computers 202. Further, the invention shows by means of a mathematical model that, for certain conditions, the optimum temperature $T_0^*$ is likely to be lower than what is suggested by prior-art that focuses solely on $P_{Cool}$, but ignores the temperature dependence of $P_0$.

BRIEF DESCRIPTION OF THE DRAWINGS

FIG. 4 illustrates pseudo-code of a calibration algorithm for the first embodiment of the invention.

FIG. 6 illustrates a calibration algorithm for the second embodiment of the invention.

FIG. 7 illustrates two examples an operational algorithm for the second embodiment of the invention.

FIG. 11 tabulates various parameters used in a mathematical model that quantifies the advantages of the invention.

FIG. 28 is a table describing how various parameters are varied on FIGS. 29-32.

takes on several values, thereby showing how the downshift boundary depends on $$\frac{\rho c V}{UA}.$$

Figure 27:
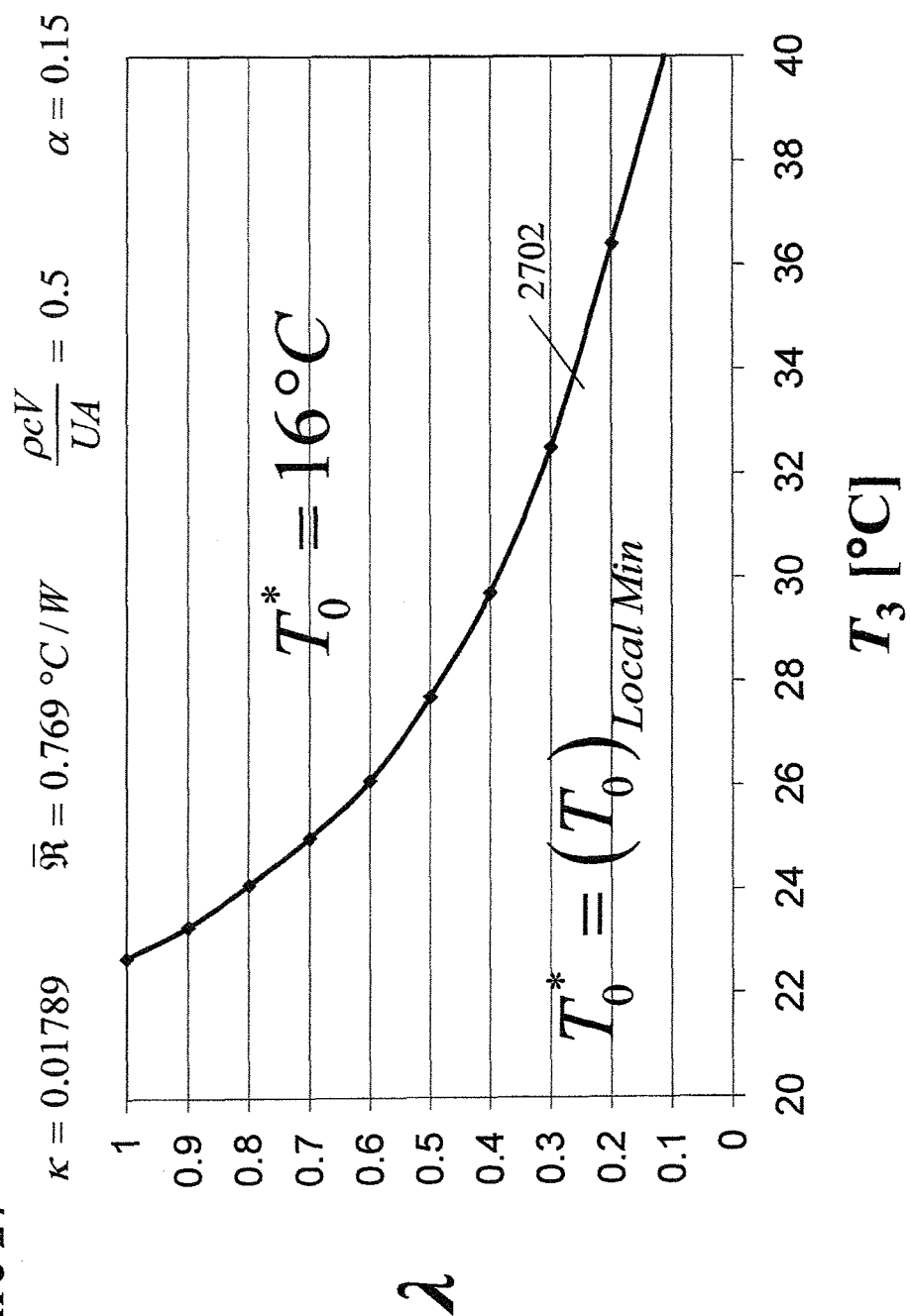
FIG. 27, derived from FIG. 26, plots in $(T_3, \lambda)$ space the locus of points, denoted the "downshift boundary", where the power-minimizing optimal solution for coolant temperature suddenly shifts from a high value to a low value, thereby dividing the space into two regions, one where 100% free cooling is optimal, and the other where 100% chiller cooling is optimal.
Figure 32:
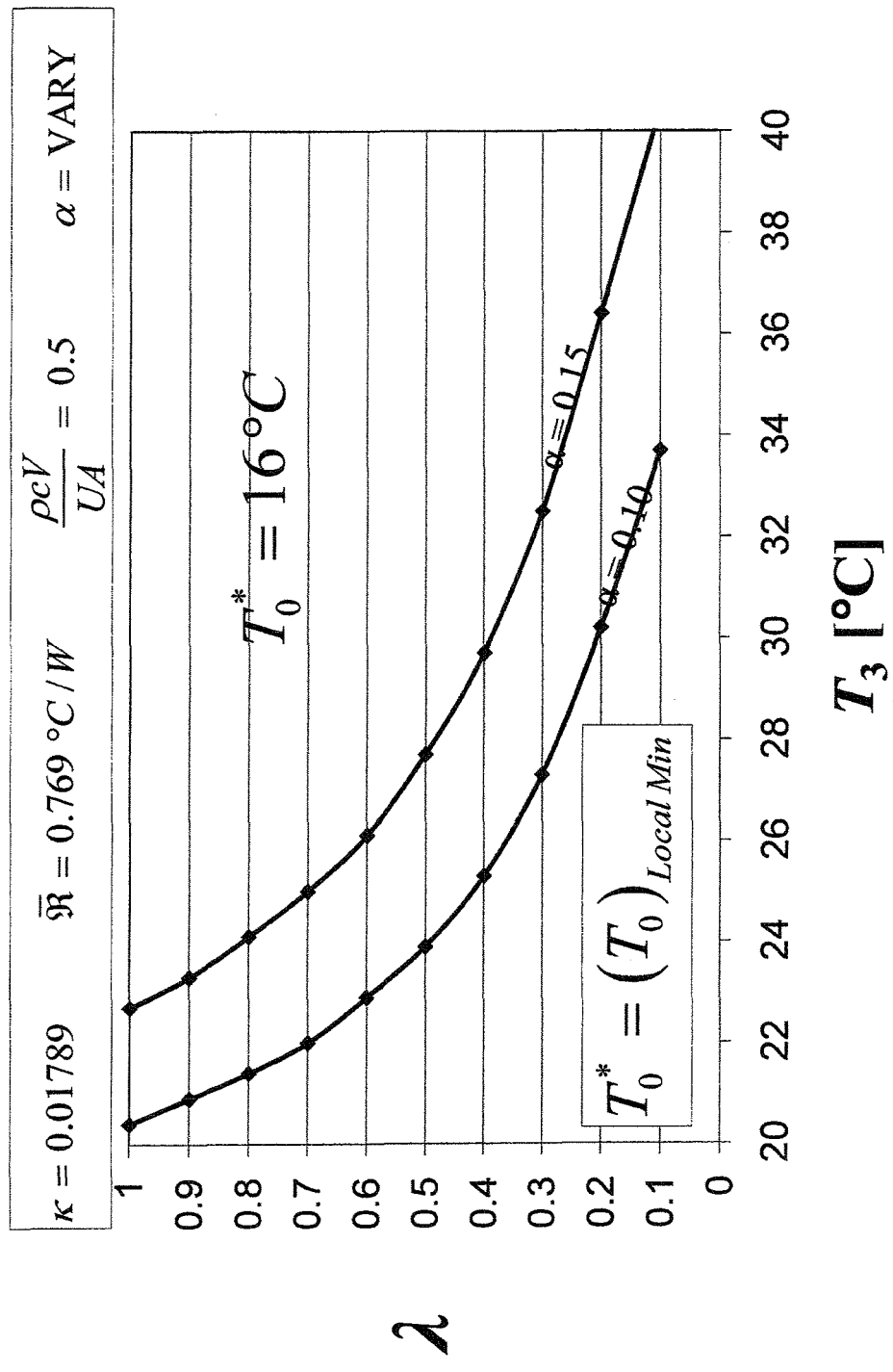

FIG. 32 is similar to FIG. 27, except that parameter α takes on several values, thereby showing how the downshift boundary depends on α.

FIG. 33 illustrates pseudo-code similar to FIG. 4, except that the algorithm is simplified in light of the mathematical model.

FIG. 34 illustrates pseudo-code similar to FIG. 6, except that the algorithm is simplified in light of the mathematical model.

DETAILED DESCRIPTION OF PREFERRED EMBODIMENTS

This invention exploits the fact that the power consumption of computers increases when the temperature $T_0$ of the cooling fluid increases, whereas the power consumption of the associated cooling equipment decreases as $T_0$ increases, because larger $T_0$ allows for more "free cooling". This dichotomy suggests that, for given conditions, an optimum, power-minimizing value of $T_0$ exists, denoted $T_0^*$, a value that will minimize overall energy consumption. The invention specifies how this optimum may be found as a function of weather conditions and the computational state of the computers being cooled.

Figure 2:
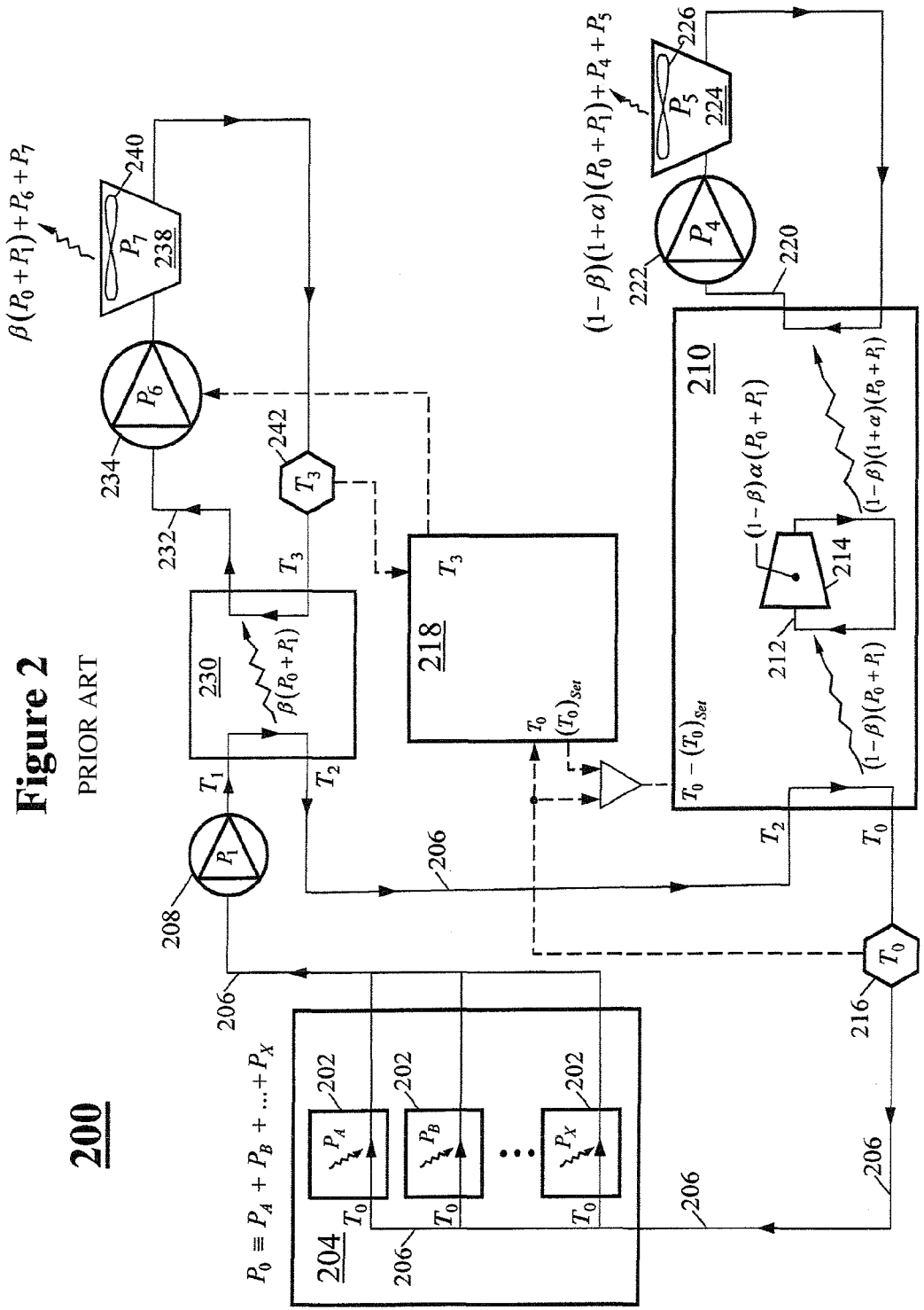
FIG. 2 illustrates a schematic view of a prior-art apparatus comprising a machine room with conventional cooling equipment that is enhanced with free-cooling equipment.
Figure 3:
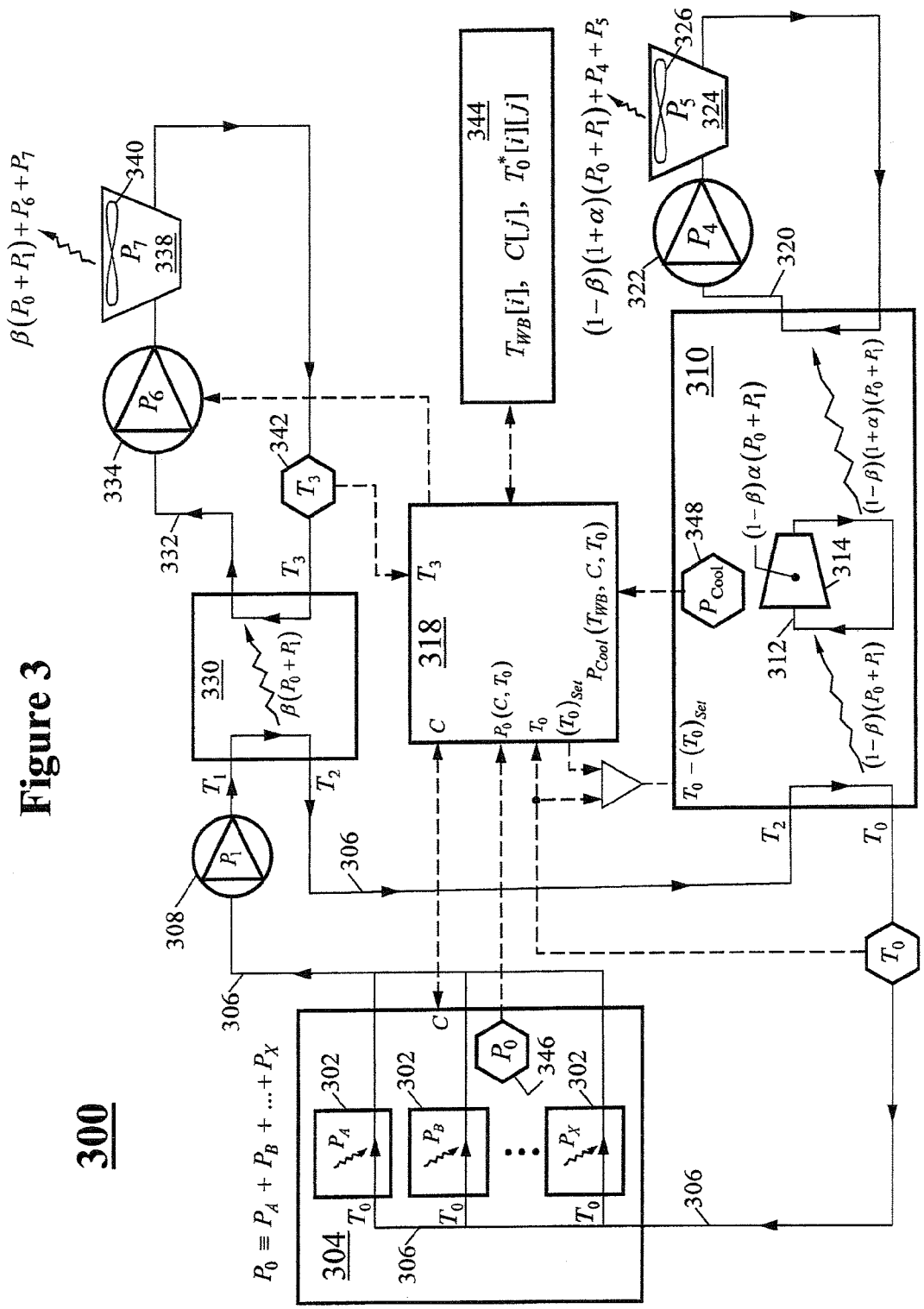
FIG. 3 illustrates a schematic view of an apparatus according to a first embodiment of the invention, including a coolant-temperature selecting device that minimizes total power consumption $P_{Total}$, which is the sum of electronics' power consumption $P_0$ and cooling-equipment power consumption $P_{Cool}$.

Referring to FIG. 3, a first embodiment of this invention specifies a system 300, which is a modified form of the prior-art system 200. In particular, elements 302 through 342 of system 300, shown on FIG. 3, are exactly analogous, respectively, to elements 202 through 242 of system 200, shown on FIG. 2. However, system 300 is distinguished from system 200 by the addition of a number of elements, described presently.

The total power consumption $P_{Total}$ for system 300 is the sum of two terms, as follows, $$P_{Total}(T_0, T_3, C) = P_0(T_0, C) + P_{Cool}(T_0, T_3, C), \quad (16)$$

where the parenthetical lists in equation (16) denote parameters upon which the various components of power depend, and the following definitions apply:

$P_0$ = Power consumption of the computers 302;
C = Computational state of the computers 302. For example, one state may be "idle", another may be "running program XYZ", another may be "50% loaded", etc. The set of states C may be defined in many ways, and will depend on the type of computer involved;
$T_0$ = Coolant temperature at entrance to the computers 302, as selected by $(T_0)_{Set}$;

$$P_{Cool} = P_1 + (1-\beta)\alpha(P_0+P_1) + P_4 + P_5 + P_6 + P_7$$

(the sum of the power dissipated by all cooling equipment in system 300);

$T_3$ ≡ Temperature at which cold water from the cooling tower 338 enters heat exchanger 330

$\equiv T_{WB} + \Delta T_{CT}$.

In the latter equality, $T_{WB}$ is the wet-bulb temperature at cooling tower 338, and $\Delta T_{CT}$ is the cooling-tower "approach temperature", as discussed in connection with equation (12). Thus $T_3$ is dependent on weather.

The optimal value $T_0^*$ of the coolant inlet temperature $T_0$ is the value that minimizes the total power $P_{Total}$ in equation (16). Thus, $T_0^*$ is a function of the weather-related temperature $T_3$ and the computational state C. With the goal of determining this functional dependence $T_0^*(T_3, C)$, system 300 comprises several elements missing from the prior-art system 200.

First, system 300 comprises a storage device 344 in which measured and computed data may be stored and retrieved by processing device 318.

Second, system 300 comprises a power-measurement device 346 that measures the aggregate electrical power $P_0$ being consumed by all the computers 302 in machine room 304.

Third, system 300 comprises one or more power-measurement devices 348 that collectively measure the aggregate electrical power $P_{Cool}$ consumed by all the cooling equipment in system 300:

$$P_{Cool} = P_1(1-\beta)\alpha(P_0+P_1) + P_4 + P_5 + P_6 + P_7. \quad (17)$$

If measuring all terms of $P_{Cool}$ is too expensive, a possible (though inexact) alternative is to measure chiller power only, $P_{Cool} \approx (1-\beta)\alpha(P_0+P_1)$, because chiller power is typically the dominant term on the right-hand side of equation (5). In either case, the power measurements are saved in the storage device 344.

Fourth, referring to FIG. 4 as well as FIG. 3, system 300 comprises a calibration algorithm 400, written in FIG. 4 as pseudo-code, which is stored in the storage device 344 and executed by the processing device 318 when the system 300 is first started. Algorithm 400 finds the array $T_0^*(T_3, C)$ experimentally.

Lines (402) and (404) of calibration algorithm 400 theoretically execute a loop on $T_3$, starting at a minimum valve $(T_3)_{min}$ and proceeding stepwise to a maximum value $(T_3)_{max}$. The loop variable corresponding to $T_3$ is denoted i. This representation of the loop on $T_3$ as a neat, orderly progression from $(T_3)_{min}$ to $(T_3)_{max}$ in equal steps is theoretical rather than actual. In reality, because $T_3$ depends on weather, which cannot be algorithmically dictated, iterations of this loop may actually occur in random order, and at weather-dependent values of $T_3$, over an extended time after system 300 is first installed: when the weather changes to produce a value of $T_3$ substantially different from values for which algorithm 400 has already been run, an additional iteration of this loop is executed. It may take some time (a year or longer) for $T_3$ to run its slowly-varying, seasonal course from extreme to extreme, so iterations of the "for loop" represented by line 402 of algorithm 400 may actually be executed sporadically over an extended period. Thus, in a practical implementation of algorithm 400, line 404 will cause sensor 342 to read temperature $T_3$, and the remainder of the iteration of the "for i" loop will proceed if and only if a similar value of $T_3$ has never been encountered in previously iterations of the loop. Such a strategy prevents needless, redundant experimentation.

Lines (406) and (408) of calibration algorithm 400 execute a loop on "C", the variable representing the computational state of the computers 302 in machine room 304. The precise definition of the "computational state" $C_j$ depends on the types of computers 302 contained in machine-room 304, as well as the types of computational tasks assigned to them. For the embodiment of the invention that utilizes calibration algorithm 400, it is assumed that:

i. an array of well-defined computational states $C_j$ of computers 302 can be identified a priori;
ii. the computers 302 can be commanded by processing device 318 to execute one of these states;
iii. computational state $C_j$ persists long enough to perform iteration j of the loop represented by lines (406) through (434) of calibration algorithm 400;

iv. the power consumption $P_0$ of each state, although a function of time t denoted $P_0(t)$ that is not necessarily constant, nevertheless has the property that the time-averaged power consumption $$\overline{P}_0 \equiv \int_{t=0}^{\tau} P_0(t) \tag{18}$$

is substantially constant if the averaging is done over a sufficiently long time $\tau$, and v. the time allocated in calibration algorithm 400 for measuring $P_0(t)$ to obtain the average $\overline{P}_0$ is at least $\tau$.

Line (408) of calibration algorithm 400 directs the computers 302 to execute the computational task designated by $C_j$. For most computers, one of these computational tasks, denoted $C_0$, will be "do nothing", in which the computers are powered on but idle. Computers often spend considerable time in the idle state. For CMOS-based computers in the idle state, sub-threshold leakage, which is exponentially dependent on absolute temperature, is the dominant form of leakage, and may comprise a major portion of power dissipation. Consequently, for the idle state, providing a low coolant-inlet temperature $T_0$ is likely to save considerably more power in the computers 302 than it costs in the cooling equipment, even if weather forces the chiller 310 to be used to achieve the lower $T_0$. For other computational tasks in CMOS-based computers, where temperature-independent transistor-switching power may dominate $P_0$, the trade-off between $P_0$ and $P_{Cool}$ is complex, and minimization of $P_{Total}$ is best done experimentally; for example, in the manner prescribed by calibration algorithm 400.

Line (410) of calibration algorithm 400 initializes, to the value $(T_0)_{min}$ specified by equation (15), each element of a two-dimensional array $T_0^*$ (i, j) that will ultimately hold the optimum values of $T_0$.

Line (412) of calibration algorithm 400 initializes the variable P*, which is defined mathematically as $$P^* \equiv \min_{T_0} (\overline{P}_0 + \overline{P}_{Cool}) \bigg|_{T_3, C}, \tag{19}$$

where $\overline{P}_0$ and $\overline{P}_{Cool}$ are time-averaged values of $P_0$ and $P_{Cool}$ respectively. That is, over the range of values of coolant-inlet temperature $T_0$ to be tested, P* is the minimum total electrical power consumed for the current values, $(T_3)_i$ and $C_j$, of the loop parameters $T_3$ and C. Initialization of P* to the huge number 9E99, a common programming artifice, insures that, in the subsequent search for minimum power, the initialized value exceeds the first actual value, for reasons described presently.

Line (414) of calibration algorithm 400 executes a loop on the set-point coolant-inlet temperature $(T_0)_{set}$, from a minimum of $(T_0)_{min}$ to a maximum of $(T_0)_{max-allowed}$, in increments of $\Delta T_0$, where $(T_0)_{min}$ is given by equation (15), $(T_0)_{max-allowed}$ is the maximum coolant-inlet temperature allowed by computers 302, and $\Delta T_0$ is chosen at will, but is perhaps 0.5 or 1.0° C.

Line (416) of calibration algorithm 400 pauses program execution while the system comes to thermal equilibrium, such that the measured temperature $(T_0)_{meas}$ is within a tolerance $\epsilon$ of the set-point value $(T_0)_{set}$.

Line (418) of calibration algorithm 400 performs a first reading process to obtain the time-averaged power $\overline{P}_0$ consumed by the computers 302 for the current value of the set-point coolant temperature $(T_0)_{set}$. In this first reading process, samples of the time-varying function $P_0(t)$ are measured by the power-measurement device 346, reported to the processing device 318, and the time-averaged power $\overline{P}_0$ is computed according to equation (18).

Line (420) of calibration algorithm 400 performs a second reading process to obtain the time-averaged power $\overline{P}_{Cool}$ consumed by the cooling equipment for the current value of coolant temperature $T_0$. In this second reading process, samples of the time-varying function $P_{Cool}(t)$ are measured by the power measurement device 348, reported to the processing device 318, and the time-averaged power $$\overline{P}_{Cool} \equiv \int_{t=0}^{\tau} P_{Cool}(t) \tag{20}$$

is computed. Time averaging is expected to be less important for $P_{Cool}(t)$ than for $P_0(t)$ because $P_{Cool}(t)$ is typically slowly varying. Nevertheless, the averaging process (20) makes the measurement more robust.

Line (422) of calibration algorithm 400 sums the time-average computer power consumption $\overline{P}_0$ and the time-averaged cooling-equipment power consumption $\overline{P}_{Cool}$, thereby computing the total time-averaged power consumption $\overline{P}_{Total}$ of system 300 for the current values of $(T_0)_{set}$, $T_3$, and C.

Line (424) of calibration algorithm 400 tests, for the current values of $T_3$ and C, namely $T_3[i]$ and $C[j]$, whether the power consumption $\overline{P}_{Total}$ found for the current value of set-point coolant temperature $(T_0)_{set}$ is less than the current value of P*. If so, line (426) assigns the current time-averaged power consumption $\overline{P}_{Total}$ as the new minimum P* for this (i, j), and line (428) assigns the current value of $(T_0)_{set}$ as the new optimum temperature $T_0^*$ for this (i, j), saving this value in the a two-dimensional array $T_0^*$ [i][j]. Consequently, on the first iteration of the loop on $(T_0)_{set}$, line (426) is guaranteed to be executed because of the initialization P*=9E99 at line (412). On subsequent iterations of this loop, line (426) is executed if and only if $\overline{P}_{Total}$ found for the current value of $(T_0)_{set}$ is less than any value found for all previously tested values of $(T_0)_{set}$. Thus, when the loop on $(T_0)_{set}$ completes, $T_0^*[i][j]$ holds the value of coolant temperature $T_0$ that minimizes total power $P_{Total}$ for the current computational task $C_j$ and the current value of the weather-dependent temperature $T_3$.

The net result of calibration algorithm (400) is the two-dimensional array $T_0^*[i][j]$, which is stored as a look-up table in the storage device 344, and which specifies the optimal coolant temperature that should be used for various combinations of weather conditions and computational tasks. The index i refers to the value of $T_3$ stored in the $i^{th}$ element of the one-dimensional array $T_3[i]$, which is also stored in storage device 344. Likewise the index j refers to the $i^{th}$ element of the one-dimensional array of computational states $C[j]$, which is also stored in storage device 344 in a way that can be usefully identified later. For example, C[0] may hold the string "idle", indicating for later usage that C[0] refers to the idle state of the computers 302.

After calibration algorithm 400 has been run to characterize system 300, during subsequent operation of the machine room 304, an operational algorithm 450 is executed by processing device 318. The operational algorithm 450 comprises the following steps:

Read the current computational state C from computers 302, and determine from the stored array C[j] the associated value of index j.

Read from sensor 342 the current value of temperature $T_3$, and determine the two values in the look-up table, say $T_3[i]$ and $T_3[i+1]$ that bracket the measured value $T_3$.

Compute the power-minimizing value of coolant temperature, denoted $T_0^*(T_3, C)$, by interpolation along the i dimension of the array $T_0^*[i][j]$ retrieved from storage device 344. That is, the interpolated optimum value of $T_0$ for arbitrary measured values of $T_3$ is computed as follows:

$$T_0^*(T_3, C_j) = T_0^*[i][j] + \frac{T_3 - T_3[i]}{T_3[i+1] - T_3[i]}(T_0^*[i+1][j] - T_0^*[i][j]) \quad (21)$$

It should be noted that equation (21) has the correct limiting behavior:

if $T_3 = T_3[i]: T_0^*(T_3, C_j) = T_0^*[i][j]$ if $T_3 = T_3[i+1]: T_0^*(T_3, C_j) = T_0^*[i+1][j]$ (22)

Figure 1:
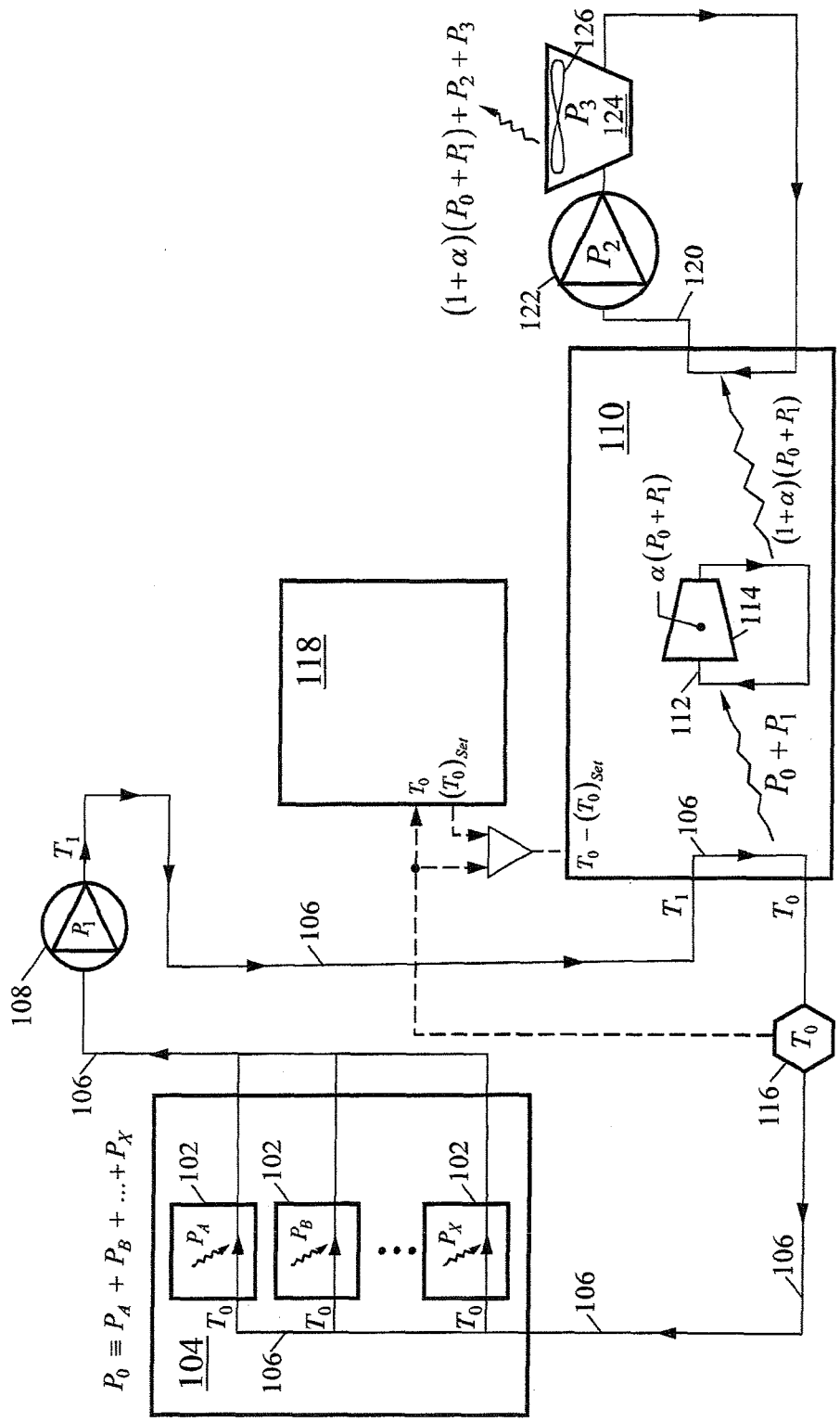
FIG. 1 illustrates a schematic view of a prior-art apparatus comprising a machine room and conventional cooling equipment.

Set the $(T_0)_{Set}$ register to the value $T_0^*(T_3, C)$ given by equation (21). By virtue of the feedback circuitry previously discussed in connection with FIG. 1, $T_0$ is controlled to the set-point temperature $(T_0)_{Set}$. Thus, in accordance with this invention, the optimal coolant temperature $T_0^*$ is provided which achieves the most energy-efficient operation of system 300 as a whole, over a range of weather conditions and computational states.

Figure 5:
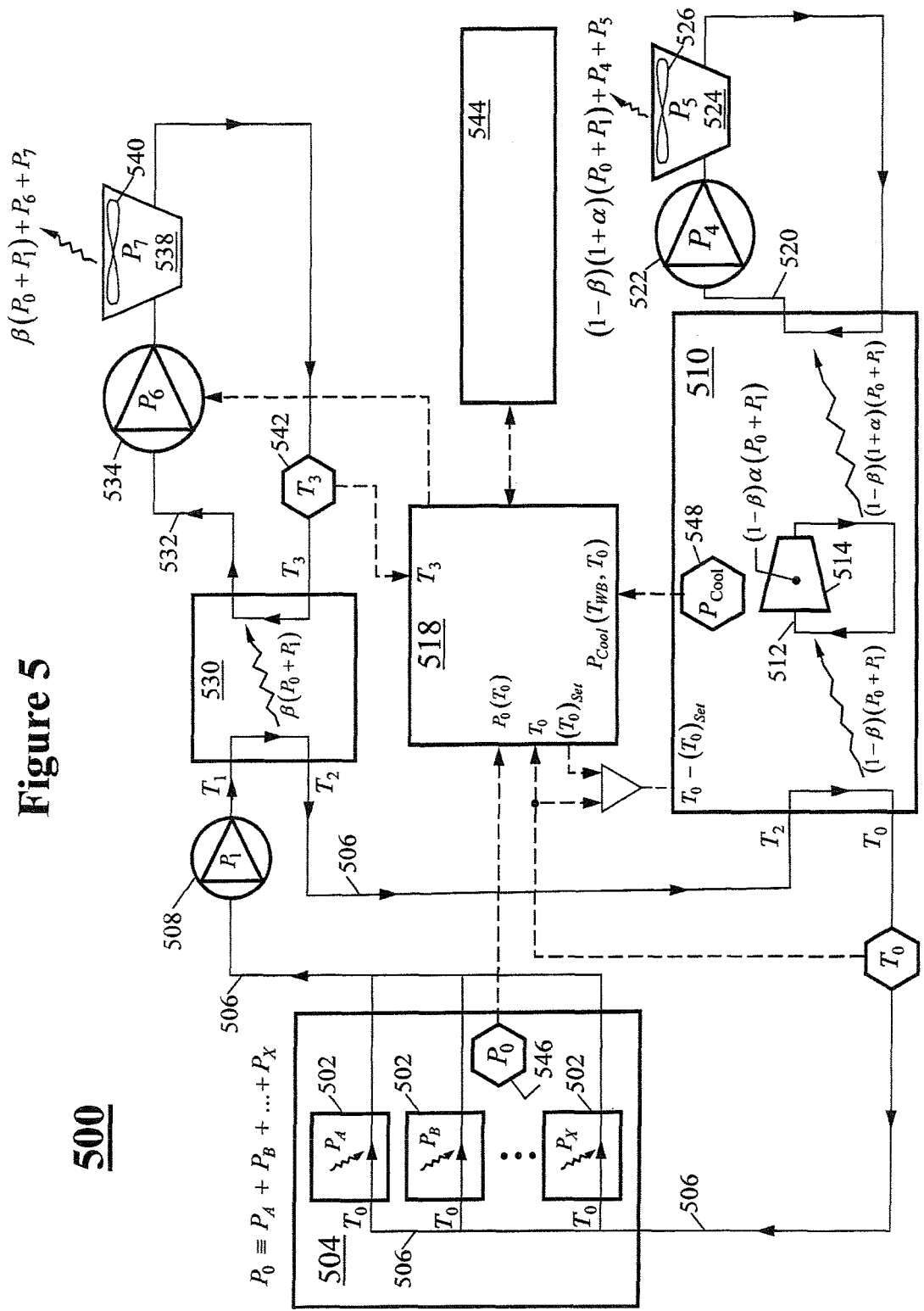
FIG. 5 illustrates a schematic view of an apparatus according to a second embodiment of the invention, including an alternative coolant-temperature selecting device that minimizes total power consumption $P_{Total}$, which is the sum of electronics' power consumption $P_0$ and cooling-equipment power consumption $P_{Cool}$.

Referring now to FIG. 5, a second embodiment of the invention specifies a system 500, which is in many respects identical to system 300, but which differs from system 300 by elimination of the following elements:

i. The calibration algorithm 400. As discussed previously, iterations of the outer loop of calibration algorithm 400, because they depend on weather, may only execute sporadically, and it may thus take a long time to fill in the look-up table $T_0^*[i][j]$. This is inconvenient in practice. Moreover, calibration algorithm 400 assumes that computational states C[j] are identifiable a priori, and are executable on demand at the pleasure of the calibration process. These assumptions may be false in practice.

ii. The need to store the arrays $T_{WB}[i]$, C[j], and $T_0^*[i][j]$ in storage device 544. This follows from (i) because these arrays are produced by the calibration algorithm. Consequently, on FIG. 5 (in contrast to FIG. 3), these arrays have been erased from the block representing storage device 544.

iii. The need for identification of computational states C. Consequently, all references to computational states C have been eliminated from FIG. 5.

Rather, system 500 merely assumes that during operation of the computers 302 in machine room 304, the time-averaged powers $\overline{P}_0$ and $\overline{P}_{Cool}$ specified by equations (18) and (20) respectively are slowly varying compared to the time required to perform an operational algorithm 600 shown on FIG. 6.

Line (610) of operational algorithm 600, analogous to line (410) of calibration algorithm (400), initializes the variable $T_0^*$ to the value $(T_0)_{min}$. $T_0^*$ will ultimately hold the optimum value of $T_0$ for current weather conditions and computational status of computers 502.

Line (612) of operational calibration algorithm 600, analogous to line (412) of calibration algorithm (400), initializes the variable P*, which is defined mathematically as $$P^* \equiv \min_{T_0}(\overline{P}_0 + \overline{P}_{Cool}). \quad (23)$$

That is, over the range of values of coolant-inlet temperature $T_0$ to be tested, P* is the minimum total electrical power consumed under current conditions. Initialization of P* to the huge number 9E99, a common programming artifice, insures that, in the subsequent search for minimum power, the initialized value exceeds the first actual value, for reasons described presently.

Line (614) of operational algorithm 600, analogous to line (414) of calibration algorithm 400, executes a loop on the set-point coolant-inlet temperature $(T_0)_{set}$, from a minimum of $(T_0)_{min}$ to a maximum of $(T_0)_{max}$, in increments of $\Delta T_0$, where $(T_0)$ is given by equation (15), $(T_0)_{max-allowed}$ is the maximum coolant-inlet temperature allowed by computers 302, and $\Delta T_0$ is chosen at will, but is perhaps 0.5 or 1.0° C.

Line (616) of operational algorithm 600, analogous to line (416) of calibration algorithm 400, pauses program execution while the system thermally stabilizes, such that the measured temperature $(T_0)_{meas}$ is within a tolerance $\epsilon$ of the set-point value $(T_0)_{set}$.

Line (618) of operational calibration algorithm 600, analogous to line (418) of calibration 400, performs a first reading process to obtain the time-averaged power $\overline{P}_0$ consumed by the computers 502 for the current value of the set-point coolant temperature $(T_0)_{set}$. In this first reading process, samples of the time-varying function $P_0(t)$ are measured by the power-measurement device 546, reported to the processing device 518, and the time-averaged power $\overline{P}_0$ is computed according to equation (18).

Line (620) of operational algorithm 600, analogous to line (420) of calibration algorithm 400, performs a second reading process to obtain the time-averaged power $\overline{P}_{Cool}$ consumed by the cooling equipment for the current value of coolant temperature $T_0$. In this second reading process, samples of the time-varying function $P_{Cool}(t)$ are measured by the power measurement device 548, reported to the processing device 518, and the time-averaged power $\overline{P}_{Cool}$ is computed according to equation (20). Time averaging is expected to be less important for $P_{Cool}(t)$ than for $P_0(t)$ because $P_{Cool}(t)$ should be slowly varying. Nevertheless, the averaging process (20) makes the measurement more robust.

Line (622) of operational algorithm 600, analogous to line (422) of calibration algorithm 400, sums the time-average computer power consumption $\overline{P}_0$ and the time-averaged cooling-equipment power consumption $\overline{P}_{Cool}$, thereby computing the total time-averaged power consumption $\overline{P}_{Total}$ of system 500 for the current value of $(T_0)_{set}$.

Line (624) of operational algorithm 600, analogous to line (424) of calibration algorithm 400, tests whether the power consumption $\overline{P}_{Total}$ found for the current value of set-point coolant temperature $(T_0)_{set}$ is less than the current value of P*. If so, line (626) assigns the current time-averaged power consumption $\overline{P}_{Total}$ as the new minimum P*, and line (628) assigns the current value of $(T_0)_{set}$ as the new optimum temperature $T_0^*$. Consequently, on the first iteration of the loop on $(T_0)_{set}$, line (626) is guaranteed to be executed because of the initialization P*=9E99 at line (612). On subsequent iterations of this loop, line (626) is executed if an only if $\overline{P}_{Total}$ found for the current value of $(T_0)_{set}$ is less than any value found for all previously tested values of $(T_0)_{set}$. Thus, when the loop on $(T_0)_{set}$ completes, $T_0^*$ holds the value of coolant temperature $T_0$ that minimizes total power $P_{Total}$ for the current computational task $C_j$ and the current value of the weather-dependent temperature $T_3$.

Line (632) of calibration algorithm 600 closes the loop on $(T_0)_{Set}$. At this point in the algorithm, $T_0^*$ holds the optimal value of $(T_0)_{Set}$; that is, the value found to produce minimum total power $\overline{P}_{Total}$.

Line (634) of calibration algorithm 600 assigns the optimal value $T_0^*$ as the set-point value $(T_0)_{Set}$ to be used during subsequent operation. Because coolant temperature $T_0$ entering computers 502 is controlled to $(T_0)_{Set}$, it will thus be controlled to the optimal value $T_0^*$.

The optimal coolant temperature $T_0^*$ will be valid as long as weather conditions and the computational conditions of the computers 502 remains similar to those that existed during execution of algorithm 600. Recognizing that these conditions, particularly computational conditions, may frequently change, lines (610) through (634) of the operational algorithm 600 must be re-executed from time to time, to check whether the current set-point temperature $(T_0)_{Set}$ is still optimal. Two strategies may be pursued:

(a) Repetition of lines (610) through (634) of algorithm 600 may be done periodically, at regular intervals. This option is illustrated conceptually by the pseudo-code shown in FIG. 7 (a). Line (606) begins a loop that continues forever. On each iteration of this loop, lines (610) through (634) are executed, followed by line (636), which causes a delay of $\Delta t$. Consequently, once a value of optimal coolant temperature $T_0^*$ is found, it is retained for the period of time required for iteration of the "while" loop in FIG. 7(a), after which a new search for an optimal value of $T_0^*$ is initiated by re-executing algorithm 600. The penalty for making $\Delta t$ too short is that each traverse of algorithm 600 causes periods of operation at non-optimal coolant temperatures, because the loop comprising lines (614) through (632) tests a variety of set-point values $(T_0)_{Set}$, most of which are not optimal. The penalty for making $\Delta t$ too long is that, during this period, computational conditions may change, thus shifting the optimal value of $T_0$ away from the previously found value $T_0^*$. This shift will not be detected until the next iteration of algorithm 600, so the longer $\Delta t$ is, the longer non-optimal conditions will persist. Thus, choosing $\Delta t$ is a compromise between these two penalties; the best compromise will be system dependent.

(b) Repetition of lines (610) through (634) of algorithm 600 may be triggered by a change in ongoing measurements of $\overline{P}_0$ and $\overline{P}_{Cool}$. This option is illustrated by pseudo-code shown in FIG. 7(b). Line (608) begins a loop that continues forever. On each iteration of this loop, algorithm 600 is executed. Then lines (638) and (640) save the values of power $\overline{P}_0$ and $\overline{P}_{Cool}$, found in algorithm 600, into variables $\overline{P}_{0\_OLD}$ and $\overline{P}_{Cool\_OLD}$ respectively. Finally, line (642) repeatedly measures $\overline{P}_0$ and $\overline{P}_{Cool}$, as indicated by the "Read( )" commands, and compares these values with $\overline{P}_{0\_OLD}$ and $\overline{P}_{Cool\_OLD}$ respectively. If the absolute value of either difference is too large, execution of line (642) terminates, and a new iteration of the while loop at (608) is triggered, thereby causing a new search for an updated value of $T_0^*$. The presumption here is that a change in either the measured computer power consumption $\overline{P}_0$ or in the measured cooling-equipment power consumption $\overline{P}_{Cool}$ may indicate a shift of the optimal value of $T_0$ away from the previously found value $T_0^*$, thus requiring a search for the new optimum. For example, a large increase in $\overline{P}_0$ may indicate the change from the idle state of computers 504, where temperature-dependent leakage power may be a larger fraction of $\overline{P}_0$ than in a more-active computational state where temperature-dependent leakage is less important, thus requiring a reassessment of the optimal value of $T_0$.

Mathematical Model

Many features of the two embodiments discussed in the foregoing are illuminated by a mathematical model that captures the essence of the optimization involved in choosing a value of coolant temperature $T_0$ for computers such as 302 and 502 in FIGS. 3 and 5 respectively. Moreover, the mathematical model produces a surprising result that may be used to simplify considerably the practical implementation of the first embodiment's calibration algorithm 400 and the second embodiment's operational algorithm 600, as will be described later in additional embodiments. The following analysis applies to both systems 300 and 500; system 500 will be used as a reference.

1. Computer Power $P_0$

Figure 8:
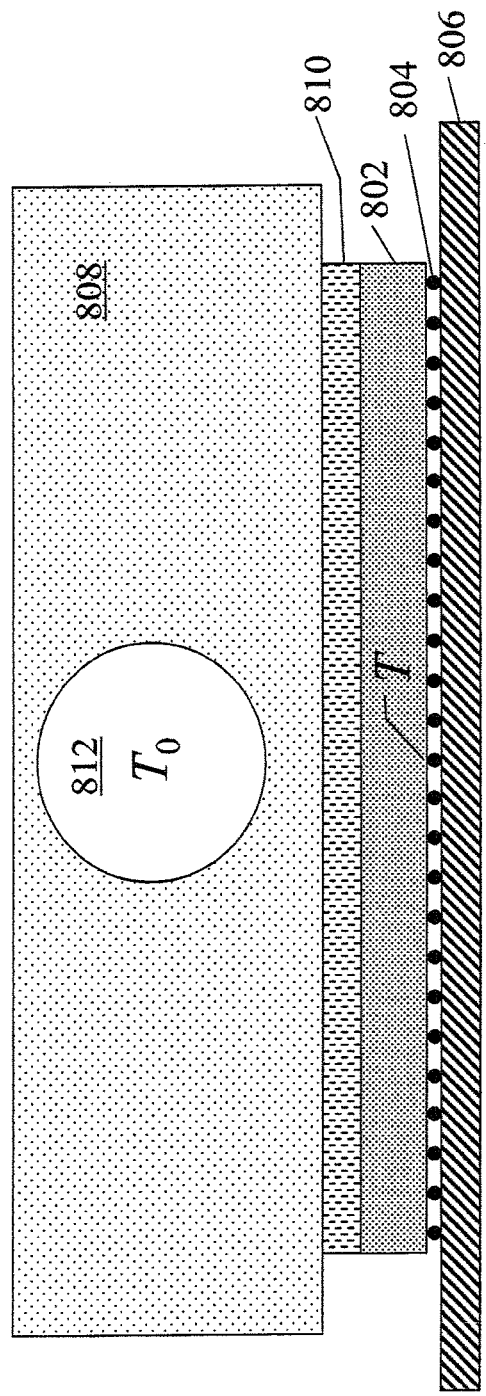
FIG. 8 illustrates the typical thermal path between a heat-producing electronic device and a liquid coolant.

Referring to FIG. 8, consider a system such as 500 in which the computers 502 comprises an arbitrary number N of heat-producing assemblies 800. Each heat-producing assembly 800 comprises a heat-generating CMOS package 802, which is typically affixed by solder balls 804 to a circuit board 806. The CMOS package 802 is cooled by a cold head 808 that is separated therefrom by a layer of compliant, thermal-interface material 810. The cold head 808 comprises at least one coolant channel 812 wherein flows the coolant 506, which enters the cold head at temperature $T_0$. Each CMOS package contains a large number of heat-producing CMOS transistors whose junctions are all assumed to be at junction temperature T. Each transistor dissipates some power that is independent of temperature, such as active power and gate leakage power, as well as sub-threshold leakage power that is exponentially dependent on T, as described in *Leakage in Nanometer CMOS Technologies*, previously cited. These two components of dissipated power, aggregated to the level of the entire set of computers 502 of system 500, together dissipate the total power $P_0$, which may therefore be represented by the sum of two terms, one that is independent of junction temperature $T_j$, and the other that is exponentially dependent on T, whence $$P_0 = P_{ref}\{(1-\lambda) + \lambda \exp[\kappa(T - T_{ref})]\}, \qquad (24)$$

or, equivalently, $$\frac{P_0}{P_{ref}} = 1 + \lambda\{\exp[\kappa(T - T_{ref})] - 1\}. \qquad (25)$$

In equations (24) and (25), for a given computational state, $P_{ref}$, $\lambda$, and $\kappa$ are positive constants, T is a representative junction temperature, and $T_{ref}$ is an arbitrary reference temperature at which $P_0 = P_{ref}$ when $T = T_{ref}$; that is, $P_0$ would equal $P_{ref}$ if the junction temperature T of all transistors in system 500 were held at the reference temperature $T_{ref}$. For example, $$T_{ref} = (T_0)_{min} \equiv 16° C. \qquad (26)$$

is a useful choice, because then $P_0 = P_{ref}$ when $T = (T_0)_{min} \equiv 16°$ C., where the significance of $(T_0)_{min} \equiv 16°$ C. is discussed above in connection with equation (15).

In equation (24), $\lambda$ is the parameter that controls the fraction of computer power that is exponentially dependent on temperature. This fraction is $\lambda$ at $T = T_{ref}$, but the fraction is greater than $\lambda$ when $T > T_{ref}$ due to the exponential growth. Specifically, for CMOS-based electronics, the second term in equation (24), $P_{ref}\lambda\exp[\kappa(T - T_{ref})]$, represents the power consumed by CMOS-transistor sub-threshold leakage, whereas the first term in equation (24), $P_{ref}(1-\lambda)$, represents the sum of all types of power not dependent on temperature, including CMOS-transistor switching power as well as CMOS-transistor leakage components caused by tunneling currents, such as gate leakage.

Consequently, the fraction λ is a function of computational state. For example, λ is relatively large when the transistor is off, because most transistor power in the off state is sub-threshold leakage power. However, λ becomes considerably smaller when the transistor is active, because active power and gate leakage then dominate.

Equation (25) may be written in the mathematically equivalent form $$\frac{P_0}{P_{ref}} = 1 + \lambda\{\exp[\kappa(T - T_0)]\exp[\kappa(T - T_{ref})] - 1\}, \quad (27)$$

in which the temperature difference $T - T_{ref}$ is decomposed into $(T - T_0) + (T_0 - T_{ref})$.

The temperature decomposition in equation (27) is useful because the temperature difference $T - T_0$ may be written as the product of two factors: first, the power $$\frac{P_0}{N}$$

of one of the CMOS packages 802, and second, the thermal resistance $\Re$ from the coolant flowing in cold head 808 to a typical transistor on the CMOS package 802. That is, $$T - T_0 = \left(\frac{P_0}{N}\right)\Re, \quad (28)$$

where $\Re \equiv$ Thermal resistance in cooled assembly 800 from coolant to transistor junction. (29)

Thermal resistance $\Re$ is a function only of the geometry and the thermal conductivities of the components comprising the thermal path from coolant to transistor junction.

Substituting equation (28) into equation (27) yields $$\frac{P_0}{P_{ref}} = 1 + \lambda\left\{\exp\left[\kappa\left(\frac{\Re P_{ref}}{N}\right)\left(\frac{P_0}{P_{ref}}\right)\right]\exp[\kappa(T_0 - T_{ref})] - 1\right\}. \quad (30)$$

Equation (30) is a nonlinear algebraic equation in the unknown ratio $$\frac{P_0}{P_{ref}}$$

an equation that may readily be solved iteratively by starting with the initial guess $$\frac{P_0}{P_{ref}} = 1$$

on the right-hand side of equation (30), thereby to compute an improved estimate of $$\frac{P_0}{P_{ref}}$$

on the left-hand side of equation (30), this improved estimate to be inserted into the right-hand side of equation (30) to compute an even better estimate, and so on, until two successive estimates differ by a negligible amount.

In many cases, the set of N heat-producing devices is arranged in series along the coolant flow path. In such cases, the inlet coolant temperature $T_0$ is truly relevant only for the first heat-producing device in the series; devices further downstream see warmer coolant because the coolant has absorbed heat from upstream devices. Specifically, coolant at the downstream-most device has been heated by N−1 previous devices, so the average device sees warming from ½(N−1) previous devices. Consequently, coolant temperature for the average heat-producing device, denoted $\bar{T}_0$, is obtained by energy balance as $$\bar{T}_0 = T_0 + \frac{(N-1)\left(\frac{P_0}{N}\right)}{2\rho c V} = T_0 + \frac{N-1}{2N}\frac{P_0}{\rho c V}. \quad (31)$$

where ρ=coolant density (1000 kg/m³ for water), c=coolant specific heat (4180 J/kg-C for water), and V=coolant flow rate. In analogy to equation (28), let $\bar{\Re}$ be the thermal resistance of the path from coolant to transistor junction as computed using the averaged coolant temperature $\bar{T}_0$ rather than the inlet coolant temperature $T_0$:

$$T - \bar{T}_0 = \left(\frac{P_0}{N}\right)\bar{\Re}. \quad (32)$$

Averaged versions of coolant temperature and thermal resistance may then be used in the following modified form of equation (30):

$$\frac{P_0}{P_{ref}} = 1 + \lambda\left\{\exp\left[\kappa\left(\frac{\bar{\Re} P_{ref}}{N}\right)\left(\frac{P_0}{P_{ref}}\right)\right]\exp[\kappa(\bar{T}_0 - T_{ref})] - 1\right\}. \quad (33)$$

Substituting (31) into (33) finally yields $$\frac{P_0}{P_{ref}} = 1 + \lambda\left\{\exp\left[\kappa\left(\frac{\bar{\Re} P_{ref}}{N}\right)\left(\frac{P_0}{P_{ref}}\right)\right]\exp\left[\kappa\left(\begin{array}{c}T_0 + \\ \frac{N-1}{2N}\frac{P_{ref}}{\rho c V}\left(\frac{P_0}{P_{ref}}\right) - \\ T_{ref}\end{array}\right)\right] - 1\right\}. \quad (34)$$

Like equation (30), equation (34) is a nonlinear algebraic equation in the unknown ratio $$\frac{P_0}{P_{ref}},$$

an equation that may readily be solved by iteration as explained above in connection with equation (30).

Equation (34) is used instead of equation (30) whenever heat-producing devices are arranged in series, as in the experimental example considered below.

2. Cooling Power $P_{Cool}$

For simplicity, consider only the largest component of $P_{Cool}$; namely, the power consumed by compressor 514. Then, according to FIG. 5, $$P_{Cool} \approx (1-\beta)\alpha(P_0+P_1), \quad (35)$$

where $\beta$ is the fraction of power $P_0+P_1$ rejected by coolant 506 to free-cooling water 532 via the "free-cooling" heat exchanger 530. As will be shown, $\beta$ is a function of $T_0$.

To simplify further, assume $P_1 \square P_0$; that is, assume that the computers 502 consume much more power than the pump 508 that circulates the coolant 506. This is a very reasonable assumption for most systems of the type represented by 500. Thus $$P_{cool} \approx (1-\beta)\alpha P_0. \quad (36)$$

3. Optimum Coolant Temperature $T_0^*$

The range of coolant-inlet temperature $T_0$ over which $P_{Total}$ must be considered is typically limited to $$(T_0)_{min} \leq T_0 \leq (T_0)_{max-allowed}. \quad (37)$$

The lower limit $(T_0)_{min} \equiv 16°$ C. is imposed by condensation issues, as discussed previously in connection with equation (15). The upper limit $(T_0)_{max-allowed}$ is imposed by manufacturers of computers 502 due to the cooling requirements thereof, because junction temperatures in the electronics 502 rise at least as much as $T_0$ rises—in fact slightly more due to the additional leakage power caused by higher temperature—and thus the electronics may be damaged if $T_0$ is too high.

In general, in the range given by equation (37), for fixed values of all other parameters, there will be an optimum value of $T_0$, denoted $T_0^*$, where $P_{Total}(T_0)$ is minimized. This optimum is often at one of the two limits $(T_0)_{min}$ or $(T_0)_{max-allowed}$. For example, if $P_{Total}(T_0)$ is a monotonically increasing function in the range given by equation (37), then $T_0^* = (T_0)_{min}$. Conversely, if $P_{Total}(T_0)$ is a monotonically decreasing function in the range given by equation (37), then $T_0^* = (T_0)_{max-allowed}$. If $P_{Total}(T_0)$ first increases then decreases in the range given by equation (37), then $T_0^*$ is either $(T_0)_{min}$ or $(T_0)_{max-allowed}$. Only if $P_{Total}(T_0)$ first decreases then increases in the range given by equation (37) will there be a local minimum within the range, but even then, this local minimum is not necessarily the global minimum of total power $P_{Total}(T_0)$, as illustrated by example below.

4. Dependence of $\beta$ on Coolant Temperature $T_0$

To find the optimum coolant temperature $T_0^*$, it is necessary to derive the functional dependence of $\beta$ on $T_0$ for system 500 under the approximations expressed by equation (36). Let $\rho \equiv$ Density of coolant 506 [kg/m³]

$c \equiv$ Heat capacity of coolant 506 [J/kg-° C.]

$V \equiv$ Volumetric flow rate of coolant 506 [m³/s]

$UA \equiv$ Figure of merit for the free-cooling heat exchanger 530; (38)

the product of its overall heat-transfer coefficient U [W/m²-° C.]
and its heat-transfer area A [m²].

Recall equation (11), repeated here for convenience, $$\beta = \frac{T_1 - T_2}{T_1 - T_0}, \quad (39)$$

which says that the fraction $\beta$ of the heat load $P_0+P_1$ removed by free-cooling heat exchanger 530 is equal to the ratio of the temperature drop across the free-cooling heat exchanger 530, $T_1-T_2$, to the total temperature drop $T_1-T_0$ across the free-cooling heat exchanger 530 and the chiller 510 combined. In equation (39), the unknown temperature $T_1$ may be expressed in terms of other variables by writing the energy balance across the computers 502, $$P_0 \approx \rho cV(T_1-T_0), \quad (40)$$

and the unknown temperature $T_2$ may be expressed likewise by writing the free-cooling heat-exchanger's heat-transfer equation, $$\beta P_0 \approx UA(T_2-T_3) \quad (41)$$

where $T_3$ is the sum of wet-bulb temperature $T_{WB}$ and cooling-tower approach temperature $\Delta T_{CT}$ as specified by equation (12). In both equations (40) and (41), as previously, the small pump power $P_1$ is neglected in comparison with the large computer power $P_0$, as indicated by the approximately-equal signs. Solving for $T_1$ in equation (40) and $T_2$ in equation (41) yields $$T_1 = T_0 + \frac{P_0}{\rho cV}; \quad (42)$$

$$T_2 = T_3 + \frac{\beta P_0}{UA}. \quad (43)$$

Substituting equations (42) and (43) into equation (39) yields $$\beta = \frac{\left(T_0 + \frac{P_0}{\rho cV}\right) - \left(T_3 + \frac{\beta P_0}{UA}\right)}{\frac{P_0}{\rho cV}} \quad (44)$$

Solving for $\beta$ in equation (44) yields $$\beta = \frac{1 + \frac{\rho cV}{P_0}(T_0 - T_3)}{1 + \frac{\rho cV}{UA}}, \quad (45)$$

or, equivalently, $$\beta = \frac{1 + \left(\frac{\rho cV}{P_{ref}}\right)\left(\frac{P_0}{P_{ref}}\right)^{-1}(T_0 - T_3)}{1 + \frac{\rho cV}{UA}}. \quad (46)$$

Two exceptional cases occur. First, some combinations of parameters in equation (46) yield $\beta<0$. Physically this means that the free-cooling heat exchanger 530 can accomplish no cooling of the incoming hot-side coolant 506 at temperature $T_1$, because the incoming cold-side temperature $T_3=T_{WB}+\Delta T_{CT}$ is larger than $T_1$. In fact, $\beta<0$ implies that the free-cooling heat exchanger would warm the coolant, which would never be allowed; in such a situation, the free-cooling heat exchanger would instead be bypassed, producing $\beta=0$.

Second, other combinations of parameters in equation (46) yield $\beta>1$.

Physically this means that the free-cooling heat exchanger 530 is more than adequate to reduce the incoming hot-side coolant 506 at temperature $T_1$ to the required temperature $T_0$. In fact, to achieve the required coolant temperature $T_0$ with $\beta>1$ would involve reheating the coolant after it exits the free cooling heat exchanger. This would be a waste of energy without reason, and would never be implemented. Instead, the flow of free-cooling water 532 would be modulated to limit the cooling achieved by the free-cooling heat exchanger, as may be necessary to prevent the coolant temperature $T_0$ from becoming less than $(T_0)_{min} \equiv 16°$ C. Thus, the actual value of $\beta$ in such cases is $\beta=1$. Because of these exceptions, equation (46) must be re-written as follows:

$$\beta = \begin{cases} 0 & \text{if } \hat{\beta} < 0 & \text{(Regime I: No Free Cooling)} \\ \hat{\beta} & \text{if } 0 \le \hat{\beta} \le 1 & \text{(Regime II: Partial Free Cooling)} \\ 1 & \text{if } \hat{\beta} > 1 & \text{(Regime III: 100\% Free Cooling)} \end{cases} \quad (47)$$

where $$\hat{\beta} \equiv \frac{1 + \left(\frac{\rho c V}{P_{ref}}\right)\left(\frac{P_0}{P_{ref}}\right)^{-1}(T_0 - T_3)}{1 + \frac{\rho c V}{UA}}. \quad (48)$$

5. Total Power $P_{Total}$

The total power $P_{Total}$ of system 500 is found, with the help of equation (36), to be $$P_{Total} = P_0 + P_{Cool} = [1 + (1-\beta)\alpha]P_0, \quad (49)$$

Normalizing by the power $P_{ref}$, which is the value of power $P_0$ that would occur if all chips were cooled to temperature $T_{ref}$, gives $$\frac{P_{Total}}{P_{ref}} = [1 + (1-\beta)\alpha]\frac{P_0}{P_{ref}}. \quad (50)$$

The computation occurs in three steps. First, $$\frac{P_0}{P_{ref}}$$

is found by solving the nonlinear algebraic equation (34) for the given set of the parameters $\lambda$, $\kappa$, $\bar{\mathfrak{R}}$, $P_{ref}$, $T_0$, N, $$\frac{P_{ref}}{\rho c V},$$

and $T_{ref}$. Second, $\beta$ is computed from equations (47) and (48) for the given set of the parameters $$\frac{\rho c V}{P_{ref}},$$

$T_0$, $T_3$ and $$\frac{\rho c V}{UA}.$$

Third, the two results are combined, in equation (50), to produce $$\frac{P_{total}}{P_{ref}}.$$

The impetus for this invention is that, as coolant-inlet temperature $T_0$ is increased, the two factors on the right-hand side of equation (50) oppose each other, suggesting that an optimum value of $T_0$ exists. Specifically, equations (47) and (48) show that, as the coolant temperature $T_0$ supplied to computers 502 is increased, the fraction $\beta$ of the heat load $P_0$ that can be rejected to the "free cooling" heat exchanger 530 either remains the same (when $\beta=0$ or $\beta=1$) or increases (when $0<\beta<1$), and consequently the fraction $1-\beta$ that must be rejected to the chiller 510 either remains the same or decreases, thereby reducing the power consumption of compressor 514. This power saving is precisely why prior-art schemes focus on increasing $T_0$. However, these prior-art schemes ignore the fact that the power consumption $P_0$ of the computers 502 increases as $T_0$ increases, such that the total power of system 500, given by equation (50), may actually rise as $T_0$ increases. That is, depending on the various parameters, as $T_0$ increases, the exponential growth of $P_0$ in equation (34) may overwhelm the diminution of $[1+(1-\beta)\alpha]$ equation (50). Consequently, increasing $T_0$ may actually increase overall power consumption, despite "free-cooling".

6. Experimental Determination of Computer-Cooling Parameters

Several of the parameters in equation (34) may be determined experimentally for a particular set of computers 502. To illustrate this process, experiments have been conducted on an ensemble of 32 compute chips used in a water-cooled supercomputer called Blue Gene/Q, which is currently being developed by International Business Machines. Thus, in this experiment, the computers 502 are represented by the 32 Blue Gene/Q compute chips, which are arranged in series along the coolant flow path.

Consequently, equation (34) with N=32 is used to obtain $$\frac{P_0}{P_{ref}}$$

as a function of the inlet water temperature $T_0$. Power $P_0$ is the aggregated power of the 32 chips. In this experiment, it is important to understand which parameters in equation (34) depend on the computer hardware only, and which depend both on hardware and on the computational state implied by the software being executed on the hardware.

Figure 9:
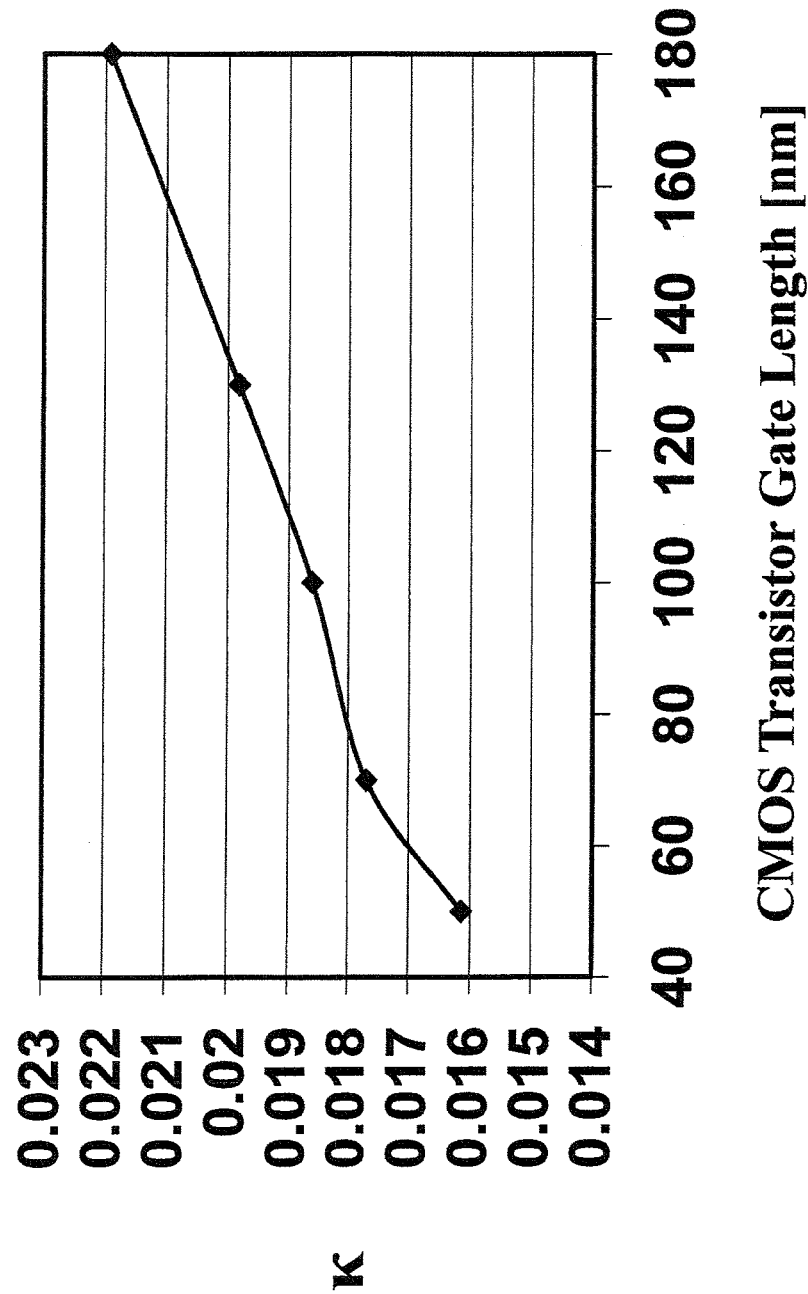
FIG. 9 plots the parameter $\kappa$ vs. CMOS transistor gate length, where $\kappa$ is a measure of how strongly the power consumption of the transistor depends on temperature.

First, the exponential parameter $\kappa$ is a function of CMOS technology, so it is fixed for given hardware. In particular, parameter $\kappa$ is smaller for more advanced generations of CMOS than it is for older generations, as shown in FIG. 9, which is derived from FIG. 1-9 on page 11 of *Leakage in CMOS Nanometer Technologies*, previously cited. The value of $\kappa$ appropriate for the Blue Gene/Q chips is derived below from experimental measurements, and found to be roughly in agreement with the values plotted on FIG. 9.

Second, parameter $\bar{\mathfrak{R}}$, the average thermal resistance of the path from a transistor junction to the coolant, is also determined by hardware; namely, by the geometries and thermal conductivities of materials in the thermal path. The value of ℜ appropriate for the Blue Gene/Q system is derived below from experimental measurements.

Third, reference temperature $T_{ref}$ is chosen arbitrarily, so it is the same for all hardware and all computational states. $T_{ref}$=16° C. is chosen herein, for reasons explained in connection with equation (26).

Fourth, parameter is a function of computational state as well as hardware, because, referring to equation (24), different computational states exhibit different fractions of power consumed by temperature-dependent leakage at $T=T_{ref}$. Values of λ appropriate for various computational states of the Blue Gene/Q system are derived below from experimental measurements.

Fifth, reference power $P_{ref}$ is a function of both computational state and hardware, since each combination thereof leads to a different amount of dissipated power $P_{ref}$ at the reference temperature $T_{ref}$. Values of $P_{ref}$ appropriate for various computational states of the Blue Gene/Q compute chips are derived below from experimental measurements.

Figure 10:
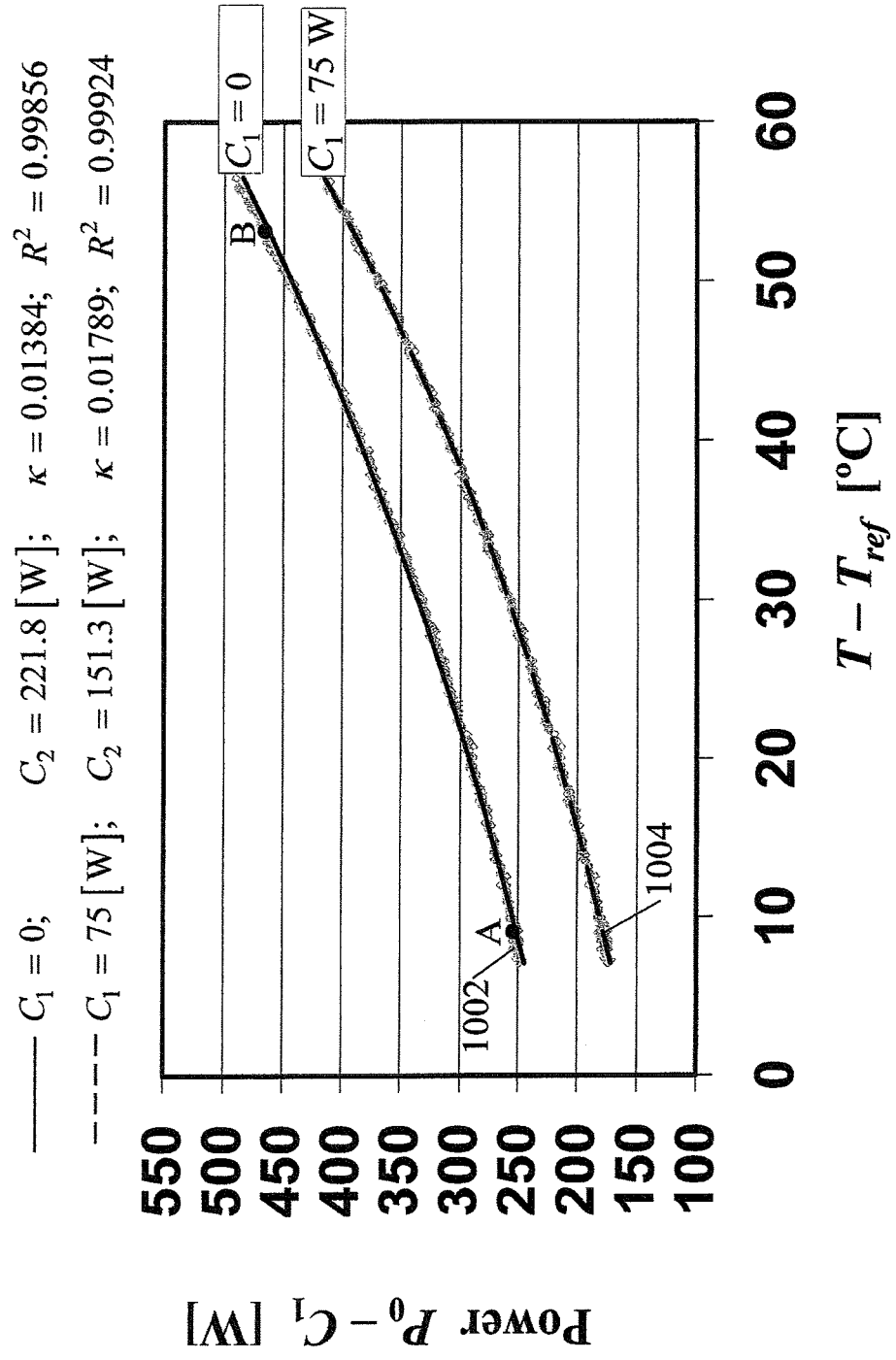
FIG. 10 illustrates consumed power vs. temperature for a typical, modern computer system, which is used experimentally to quantify the potential advantages of the invention.

Referring to FIG. 10, a first experiment on the 32-chip Blue Gene/Q system is conducted in which the chips are powered on but un-initialized, hereafter called the "Un-Initialized" computational state. In this state, the chips are allowed to run for a small number of minutes with zero coolant flow rate, causing the chips to progress slowly through a large range of temperature. During this temperature rise, the ensemble average temperature T of the 32 chips, as well as the overall consumed power $P_0$, are periodically measured. The result, $P_0$ vs. $T-T_{ref}$, is shown in FIG. 10 as the set of gray data points 1002, on the curve marked $C_1$=0. The significance of $C_1$ will be described presently.

To fit data 1002 to the mathematical model herein, equation (24) may be written as $$P_0 = C_1 + C_2 \exp[\kappa(T - T_{ref})] \tag{51}$$

where $$C_1 \equiv P_{ref}(1-\lambda); \quad C_2 \equiv P_{ref}\lambda, \tag{52}$$

whence $$P_{ref} = C_1 + C_2; \quad \lambda = \frac{C_2}{C_1 + C_2}. \tag{53}$$

Rather than performing a three-parameter nonlinear regression to choose values of $C_1$, $C_2$ and κ in equation (51) that best fit dataset 1002, it is simpler to note that equation (51) may be written as $$y = C_2 \exp(\kappa x), \tag{54}$$

where $$x \equiv T - T_{ref}; \quad y \equiv P_0 - C_1. \tag{55}$$

Taking the natural log of both sides of equation (54) yields a two-parameter linear regression for the unknown regression constants $C_2$ and κ. A series of such linear regressions may be easily performed for various assumed values of $C_1$. For each regression, the best-fit values of $C_2$ and κ, as well as the correlation coefficient $R^2$, are recorded. The value of $C_1$ producing the highest correlation $R^2$ is then assumed to provide the best fit to the three-parameter model (51). Specifically, referring again to FIG. 10, regression with the value $C_1$=0 produces $C_2$=221.8 W, κ=0.01384, and a correlation coefficient $R^2$=0.99856, corresponding to the curve shown in FIG. 10 as the solid black line that overlays dataset 1002. However, the best result is obtained with the value $C_1$=75 W, which produces $C_2$=151.3 W, κ=0.01789, and a correlation coefficient $R^2$=0.99924, corresponding to the curve shown in FIG. 10 as the dashed black line that overlays dataset 1004, which is shift downward by $C_1$=75 W in accordance with the transformation $y=P_0-C_1$ in equation (55). Consequently, the following values are adopted for the Un-Initialized state:

$$C_1 = 75.0 \text{ W}; \quad C_2 = 151.3 \text{ W}; \quad \kappa = 0.01789. \tag{56}$$

Substituting equations (56) into the first of equations (53) yields the reference power $$P_{ref} = 226.3 \text{ W}, \tag{57}$$

which is the value of $P_0$ that would occur if all chips were cooled to the reference temperature $T_{ref}$.

Substituting equations (56) into the second of equations (53) yields $$\lambda = 0.6686. \tag{58}$$

That is, referring to equation (24), in the Un-Initialized state, 66.9% of the power at $T=T_{ref}$ is temperature-dependent, sub-threshold leakage power. The remaining 33.1% is gate-leakage power, because there is no active power in this state.

In equations (56), the experimentally deduced value of the important parameter κ, namely, $$\kappa = 0.01789, \tag{59}$$

is similar to the textbook value shown on FIG. 9. The CMOS transistor gate length for the Blue Gene/Q chips is 45 nm, for which FIG. 9 would predict $\kappa = \tilde{\kappa} \approx 0.016$. This rough agreement with equation (59) validates the methods above.

Let $$f(T) \equiv \text{Fraction of power that is sub-threshold leakage power, as a function of junction temperature } T. \tag{60}$$

According to the two terms in equation (24), $$f(T) \equiv \frac{\lambda \exp[\kappa(T - T_{ref})]}{(1-\lambda) + \lambda \exp[\kappa(T - T_{ref})]}. \tag{61}$$

For example, for the Un-Initialized computational state for which equation (58) applies, $$f(30° \text{ C.}) = 0.722; \quad f(40° \text{ C.}) = 0.756. \tag{62}$$

That is, at a junction temperature of 30° C., sub-threshold leakage in the Un-Initialized state consumes 72.2% of total power; at 40° C., it consumes 75.6%.

Referring to FIG. 11, the experiment described above for the Un-Initialized state is represented by Cases A and B, where points A and B respectively are extracted from FIG. 10 for comparison to other computational states. Values for λ, $P_{ref}$ and κ, derived above in equations (57) through (59), are also noted, with the reminder that κ applies to all computational states.

Two additional experiments with the system of 32 Blue Gene/Q chips, summarized in FIG. 11 as Cases C through F, represent computational states referred to as "Idle" (Cases C and D) and "Full Power" (Cases E and F). Unlike Cases A and B, which were obtained with zero coolant flow, Cases C through F were obtained with coolant flowing at the rate $$V = 3.3 \text{ liter/min} = 5.48E-5 \text{ m}^3/\text{s}, \tag{63}$$

so that a steady thermal state is reached. The coolant is water, so $$\rho = 1000 \left[\frac{kg}{m^3}\right]; c = 4180 \left[\frac{J}{kg - °C.}\right]. \quad (64)$$

Cases C and E were run at a low value of inlet coolant temperature $T_0$, whereas Cases D and F were run at a somewhat higher value of coolant temperature $T_0$. As for Cases A and B, each value of junction temperature T tabulated for Cases C through F represents a measured, ensemble average of 32 junction temperatures reported by the 32 chips used in the experiment. Each value of 1 represents the measured, aggregate power consumed by the 32 chips. The ensemble-average coolant temperature $\overline{T}_0$ is calculated for each case according to equation (31), using N=32 and the values in equations (63) and (64).

Thermal impedance $\overline{\Re}$ of the path from coolant to transistor junction, as depicted in FIG. 8, may be determined from any one of the Cases C through F. For example, substituting the values for Case F from FIG. 11 into equation (32) yields $$\overline{\Re} = \frac{T - \overline{T}_0}{\frac{P_0}{N}} = \frac{67.1 - 28.4}{\frac{1610.9}{32}} = 0.769 \left[\frac{°C.}{W}\right]; \quad (65)$$

In principle, this result applies to all Cases, because it is a thermal characterization of the physical path from coolant to junction, which, does not change with computational state. In reality, somewhat different results are obtained for other cases: $\overline{\Re}$ =0.700 [° C./W] for Case C; $\overline{\Re}$ =0.722 [° C./W] for Case D; $\overline{\Re}$ =0.791 [° C./W] for Case E. The result for Case F, given in equation (65), is chosen for subsequent computations because the temperature difference in the numerator of (65) is the largest of all the Cases, and thus is believed to be the most accurate.

Consider now the "Idle" computational state represented by Cases C and D in FIG. 11. Denoting Cases C and D by subscripts "C" and "D" respectively, and applying equation (25) to each Case yields $$\text{Case } C: \frac{P_{0C}}{P_{ref}} = 1 + \lambda\{\exp[\kappa(T_C - T_{ref})] - 1\} \quad (66)$$

$$\text{Case } D: \frac{P_{0D}}{P_{ref}} = 1 + \lambda\{\exp[\kappa(T_D - T_{ref})] - 1\}. \quad (67)$$

Equations (66) and (67) represent two equations in the two unknown parameters $P_{ref}$ and $\lambda$. Dividing equation (67) by equation (66) to eliminate $P_{ref}$ yields $$\frac{P_{0D}}{P_{0C}} = \frac{1 + \lambda\{\exp[\kappa(T_D - T_{ref})] - 1\}}{1 + \lambda\{\exp[\kappa(T_C - T_{ref})] - 1\}} \quad (68)$$

Clearing fractions and solving for $\lambda$ yields $$\lambda = \frac{P_{0D} - P_{0C}}{P_{0C}\{\exp[\kappa(T_D - T_{ref})] - 1\} - P_{0D}\{\exp[\kappa(T_C - T_{ref})] - 1\}}. \quad (69)$$

From FIG. 11, for Cases C and D, the measured values are $$P_{0C}=935.7 \text{ W}; P_{0D}=978.2 \text{ W}; T_C=38.1° \text{ C.}; T_D=48.5° \text{ C.} \quad (70)$$

In light of equations (26) and (59), substituting the values from equations (70) into equation (69) yields $$\lambda=0.1613. \quad (71)$$

This means that, in the "Idle" computational state, if the transistor junctions of the Blue Gene/Q chips are all held at the reference temperature $T_{ref}$=16° C., 16.1% of the power $P_0$ is temperature-dependent, sub-threshold leakage power. At a junction temperature T higher than $T_{ref}$, the fraction f of power consumed by sub-threshold leakage is higher. For example, applying equation (61) for the junction temperatures $T_C$ and $T_D$ measured experimentally in the "Idle" state, the power fraction f is $$f_C \equiv \frac{\lambda\exp[\kappa(T_C - T_{ref})]}{(1 - \lambda) + \lambda\exp[\kappa(T_C - T_{ref})]} = 0.222 \quad (72)$$

$$f_D \equiv \frac{\lambda\exp[\kappa(T_D - T_{ref})]}{(1 - \lambda) + \lambda\exp[\kappa(T_D - T_{ref})]} = 0.256 \quad (73)$$

That is, at the operating temperatures found for Cases C and D, sub-threshold leakage is 22.2% and 25.6% of total power, respectively.

The reference power $P_{ref}$ for the "Idle" computational state may be found by substituting the values from equations (70) and (71) into equation (66):

$$P_{ref} = \frac{P_{0C}}{1 + \lambda\{\exp[\kappa(T_C - T_{ref})] - 1\}} \quad (74)$$
$$= \frac{935.7}{1 + 0.1613\{\exp[(0.01789)(22.1)] - 1\}}$$
$$= 867.8 \text{ W}$$

Similar substitution into equation (67) yields $$P_{ref} = \frac{P_{0D}}{1 + \lambda\{\exp[\kappa(T_D - T_{ref})]\}} \quad (75)$$
$$= \frac{978.2}{1 + 0.1613\{\exp[(0.01789)(32.5)] - 1\}}$$
$$= 867.8 \text{ W}$$

As expected, the two results agree: the computed value of $\lambda$ insures it.

Consider now the "Full Power" computational state represented by Cases E and F on FIG. 11. Denoting Cases E and F by subscripts "E" and "F" respectively, and proceeding as for the "Idle" state, produces by analogy to equation (69)

$$\lambda = \frac{P_{0F} - P_{0E}}{P_{0E}\{\exp[\kappa(T_F - T_{ref})] - 1\} - P_{0F}\{\exp[\kappa(T_E - T_{ref})] - 1\}}. \quad (76)$$

From FIG. 9, for Cases E and F, the measured values are $$P_{0E}=1558.1 \text{ W}; P_{0F}=1610.9 \text{ W}; T_E=56.8° \text{ C.}; \\ T_F=67.1° \text{ C.} \quad (77)$$

In light of equations (26) and (59), substituting the values from equations (70) into equation (69) yields, for the "Full Power" computational state $$\lambda = 0.08839. \quad (78)$$

This means that, in the "Full Power" computational state, if the transistor junctions of the Blue Gene/Q chips are all held at the reference temperature $T_{ref}=16°$ C., 8.8% of the power $P_0$ is temperature-dependent, sub-threshold leakage power. At a junction temperature T higher than $T_{ref}$, the fraction f of power consumed by sub-threshold leakage will be higher. Using definition (61), for Cases E, the fraction f is $$f_E \equiv \frac{\lambda\exp[\kappa(T_E - T_{ref})]}{(1-\lambda) + \lambda\exp[\kappa(T_E - T_{ref})]} = 0.167 \quad (79)$$

Similarly, for Case F, the fraction f is $$f_F \equiv \frac{\lambda\exp[\kappa(T_F - T_{ref})]}{(1-\lambda) + \lambda\exp[\kappa(T_f - T_{ref})]} = 0.195 \quad (80)$$

That is, in the "Full Power" state, at the operating temperatures found for Cases E and F, sub-threshold leakage power is 16.7% and 19.5% of total power, respectively.

The reference power $P_{ref}$ for the "Full Power" computational state is computed as described above for the "Idle" state. For Case E:

$$P_{ref} = \frac{P_{0E}}{1 + \lambda\{\exp[\kappa(T_E - T_{ref})] - 1\}} \quad (81)$$
$$= \frac{1558.1}{1 + 0.08839\{\exp[(0.01789)(40.8)] - 1\}}$$
$$= 1422.9 \text{ W}$$

Similarly, for Case F:

$$P_{ref} = \frac{P_{0F}}{1 + \lambda\{\exp[\kappa(T_F - T_{ref})]\}} \quad (82)$$
$$= \frac{1610.9}{1 + 0.08839\{\exp[(0.01789)(51.1)] - 1\}}$$
$$= 1422.9 \text{ W}$$

As expected, the two results agree—the computed value of $\lambda$, insures it.

Figure 12:
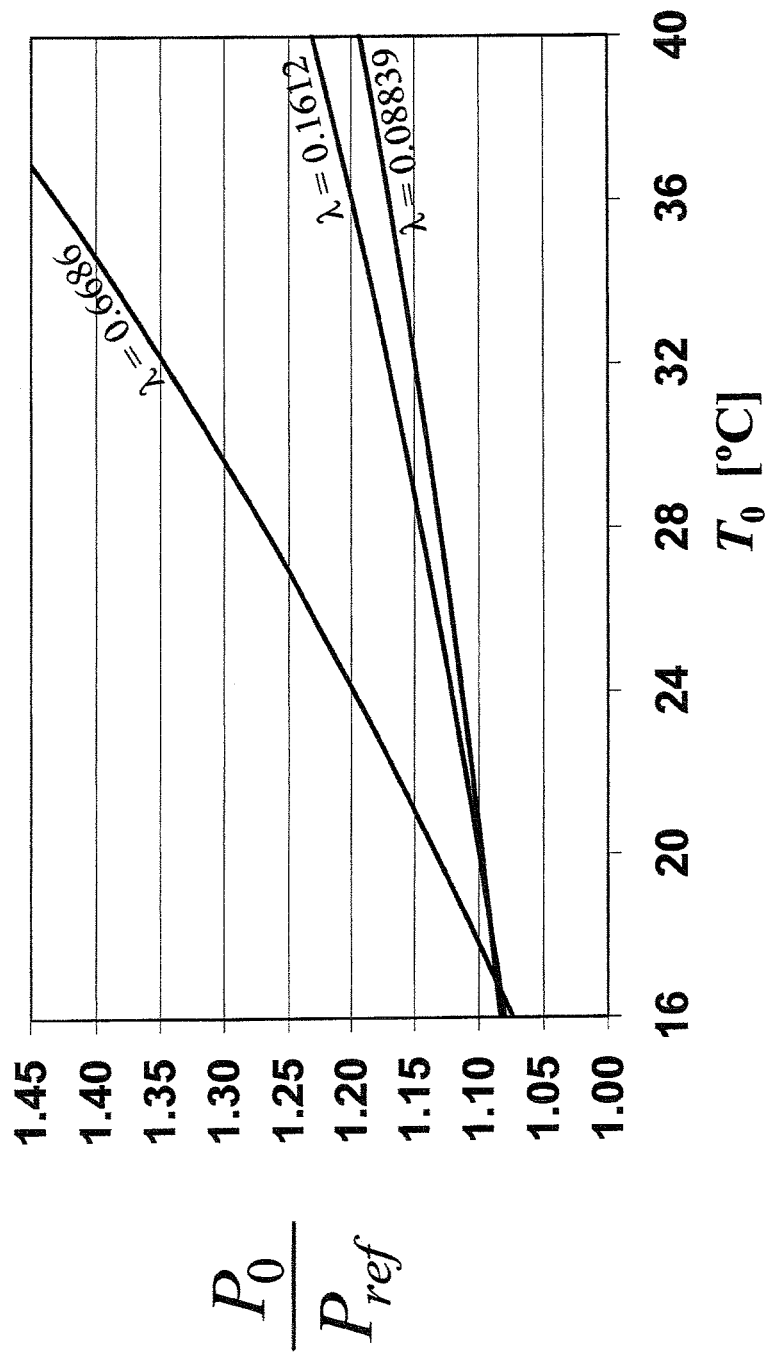
FIG. 12 illustrates consumed power vs. temperature for three computational states of the computer used to test the advantages of the invention.

Referring to FIG. 12, substituting parameter values from FIG. 11 and equations (63) and (64) into the non-linear algebraic equation (34), and solving iteratively for $$\frac{P_0}{P_{ref}}$$

yields the curves labeled "$\lambda=0.6686$", "$\lambda=0.1613$", and "$\lambda=0.08839$" on FIG. 11, which correspond to the Un-Initialized, Idle, and Full-Power computational states, respectively. Recall that, by definition, $P_{ref}$ is the value of $P_0$ that would occur if the temperature T of all transistors were held at $(T_0)_{min}=16°$ C. Consequently, it should be no surprise that $$\frac{P_0}{P_{ref}} > 1$$

at $T_0=16°$ C. on FIG. 12. Instead, $$\frac{P_0}{P_{ref}} = 1$$

occurs at some value of inlet coolant temperature $T_0$ lower than 16° C.; specifically, at the value of $T_0$ corresponding to a value of chip-averaged coolant temperature $\overline{T}_0$ that allows transistors in the average chip to achieve 16° C. in the presence of the thermal resistance $\overline{\mathfrak{R}}$ between coolant and transistor.

To simplify the interpretation of plots such as FIG. 12, it is convenient to define a reference power denoted $(P_0)_{16° C.}$, whose value, like $P_{ref}$ will vary with $\lambda$:

$$(P_0)_{16° C.} \equiv P_0 @ T_0 = 16° \text{ C.} \quad (83)$$

Figure 13:
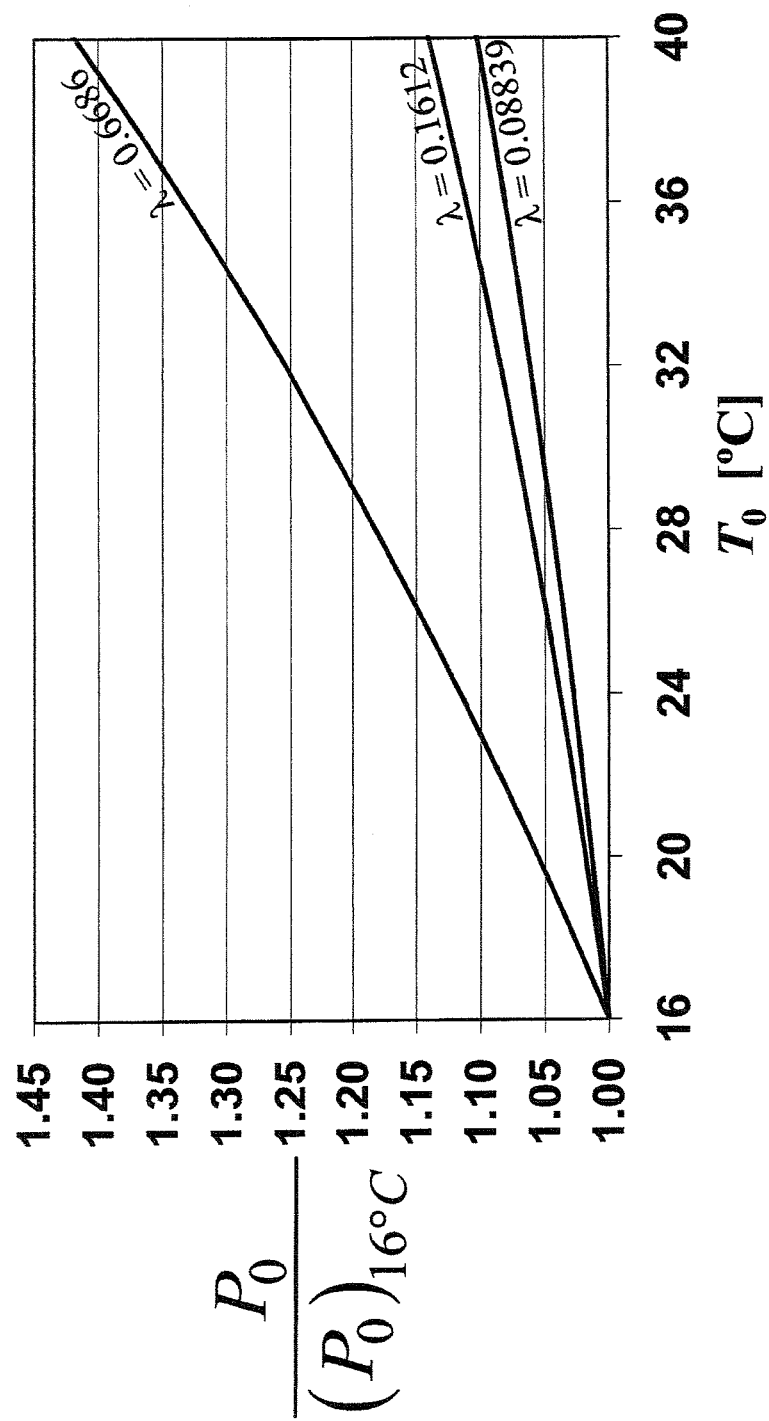
FIG. 13 illustrates the data given in FIG. 12 renormalized.

That is, $(P_0)_{16° C.}$ is the consumed power for the ensemble of chips when the coolant inlet temperature at the first chip in the series is 16° C. For each curve on FIG. 12, the values of $(P_0)_{16° C.}$ may be read at $T_0=16°$ C. as a multiple of $P_{ref}$. The value of $(P_0)_{16° C.}$ for the three experimental computational states are tabulated in FIG. 11. Converting from reference power $P_{ref}$ to this more-intuitive reference power $(P_0)_{16° C.}$ defined by equation (83) produces FIG. 13, which is simply a re-normalized version of FIG. 12. From FIG. 13 it is clear, for example, that when the chips are in the "Uninitialized" computational state, corresponding to the curve $\lambda=0.6686$, the penalty for increasing inlet temperature from 16° C. to 40° C. is a 42% increase in chip power consumption.

Figure 14:
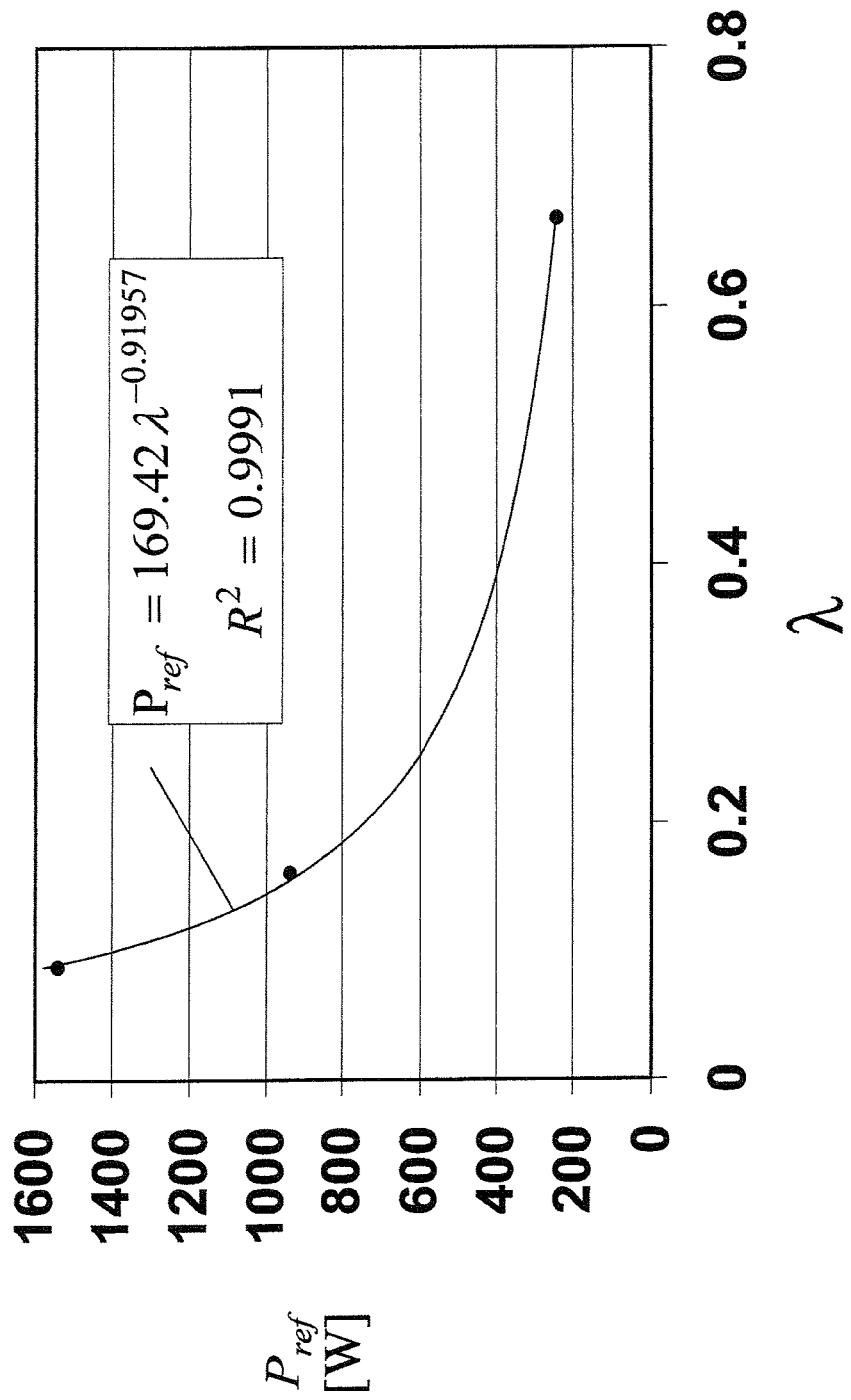
FIG. 14 illustrates the dependence of a reference-power parameter on the computational-state parameter $\lambda$.
Figure 15:
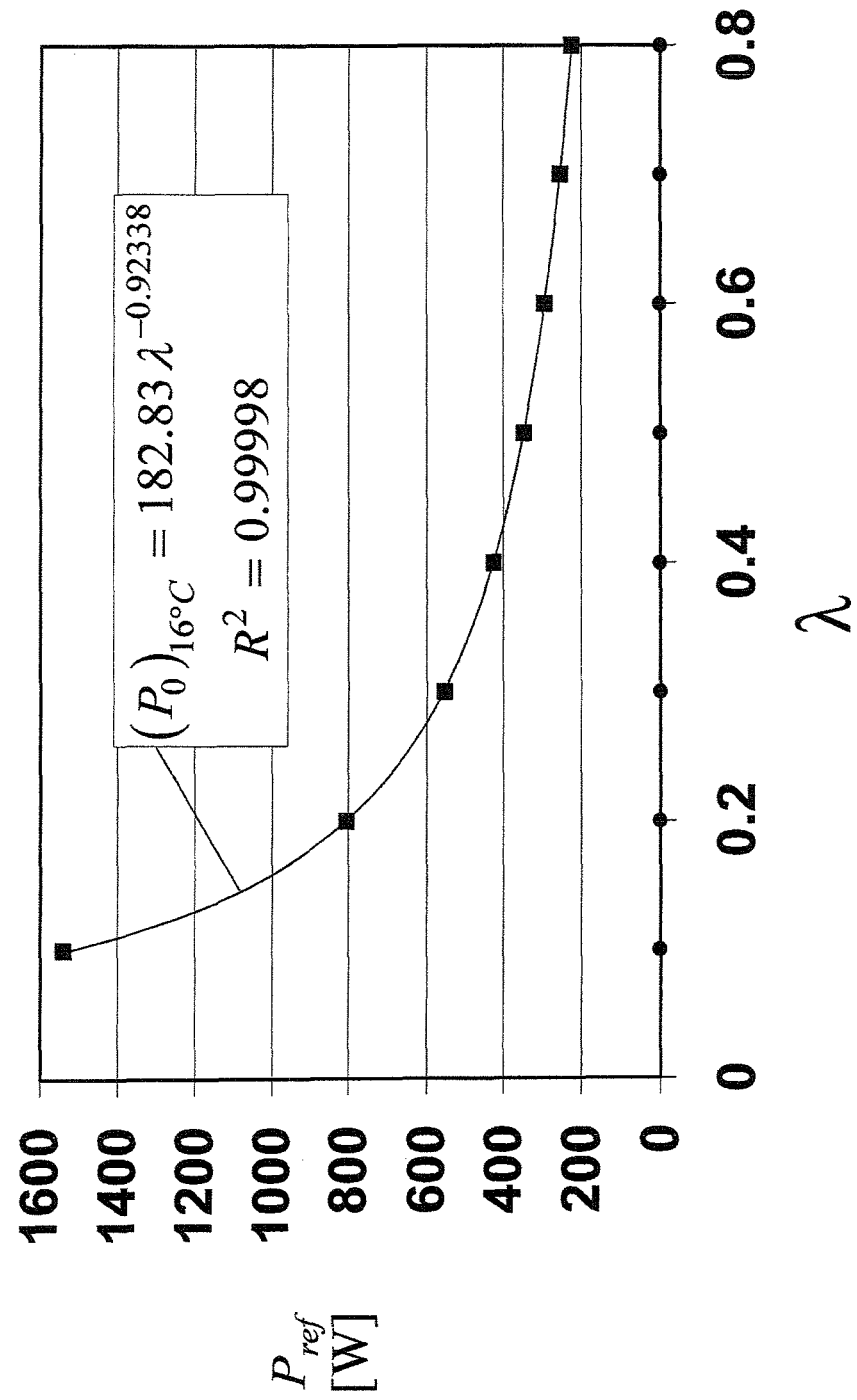
FIG. 15 illustrates the dependence of a second reference-power parameter on the computational-state parameter $\lambda$.
Figure 16:
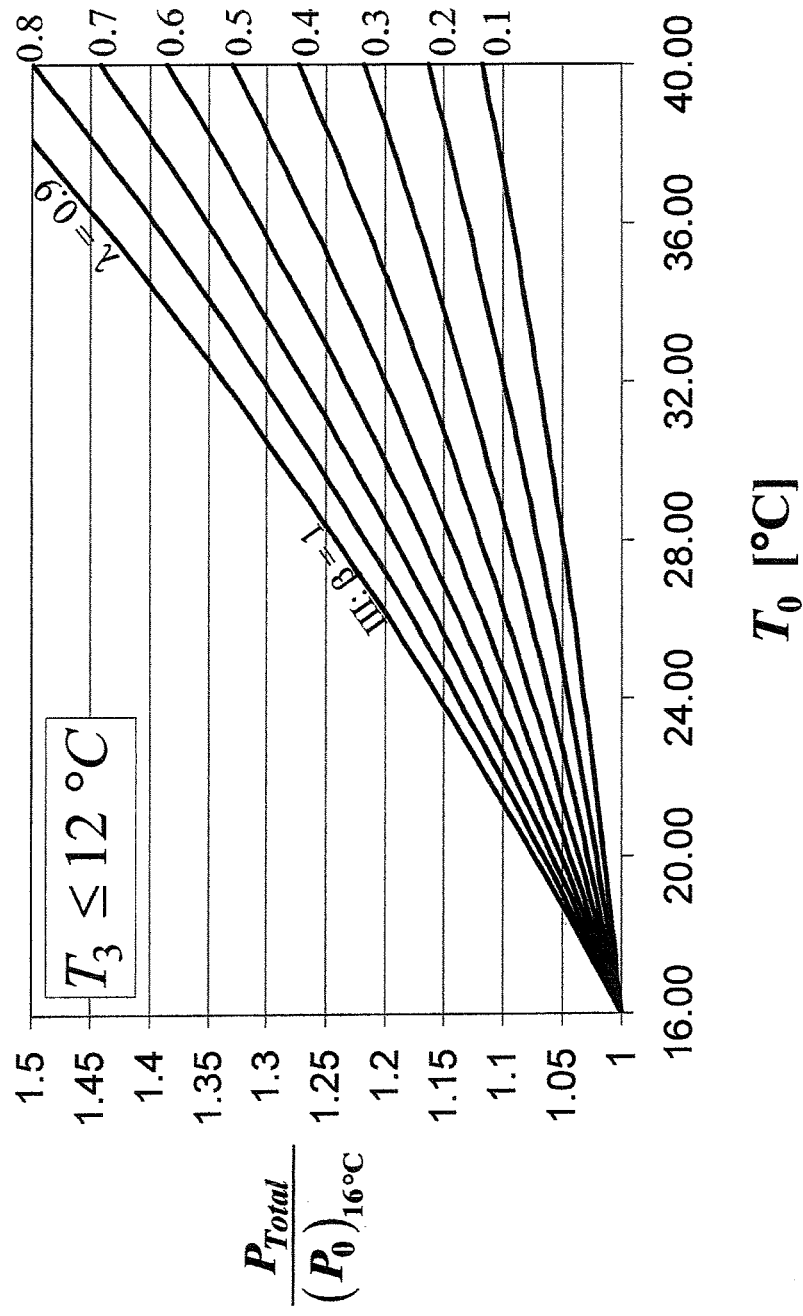
FIGS. 16 through 24 illustrate results of the mathematical model for differing values of $T_3$, each Figure plotting total consumed power vs. coolant temperature $T_0$ and the computational-state parameter $\lambda$.
Figure 17:
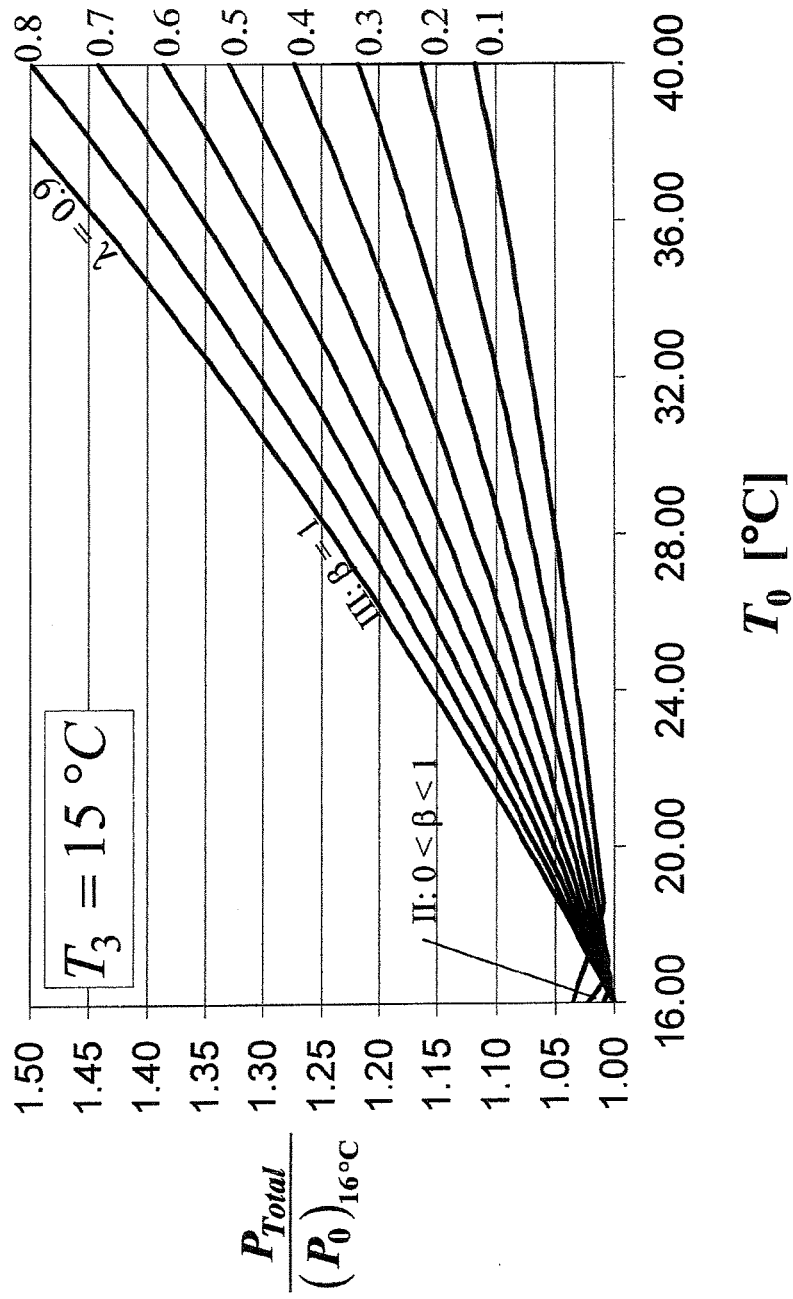
Figure 18:
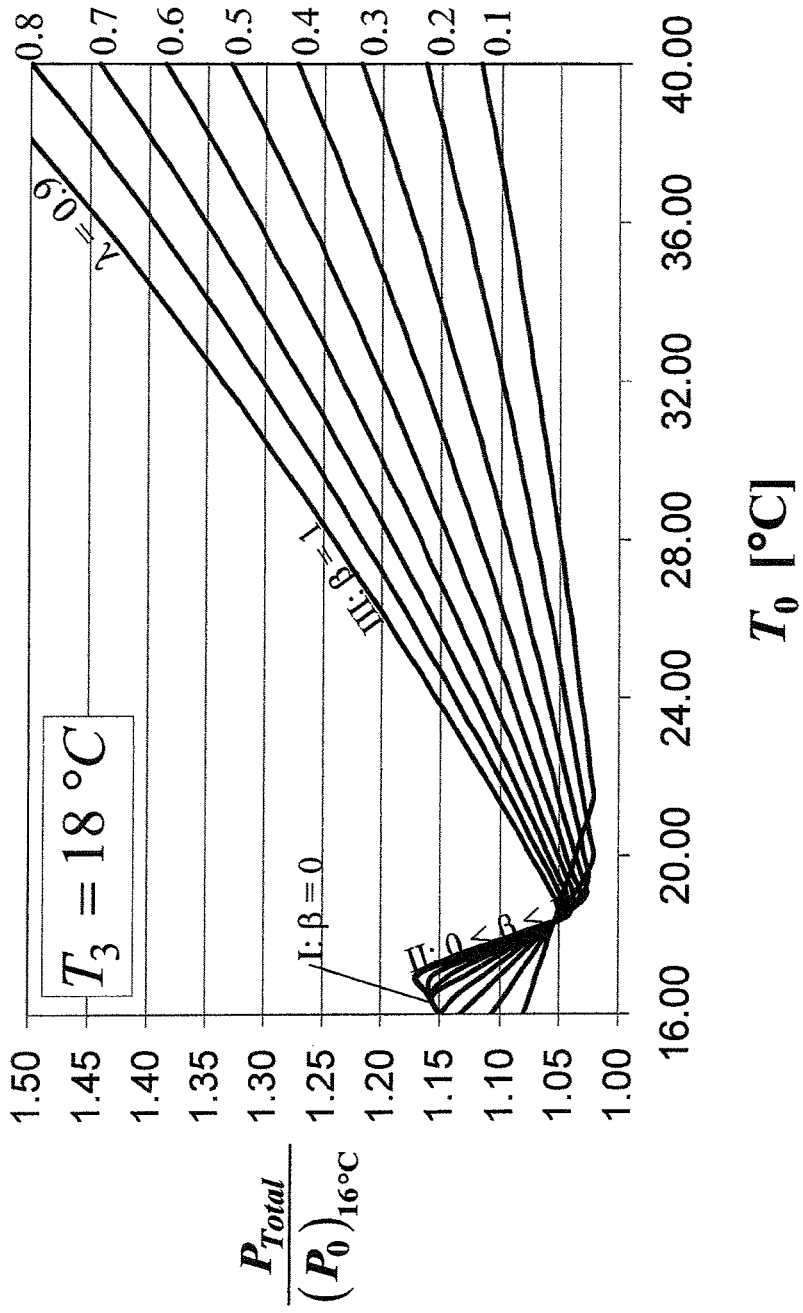
Figure 19:
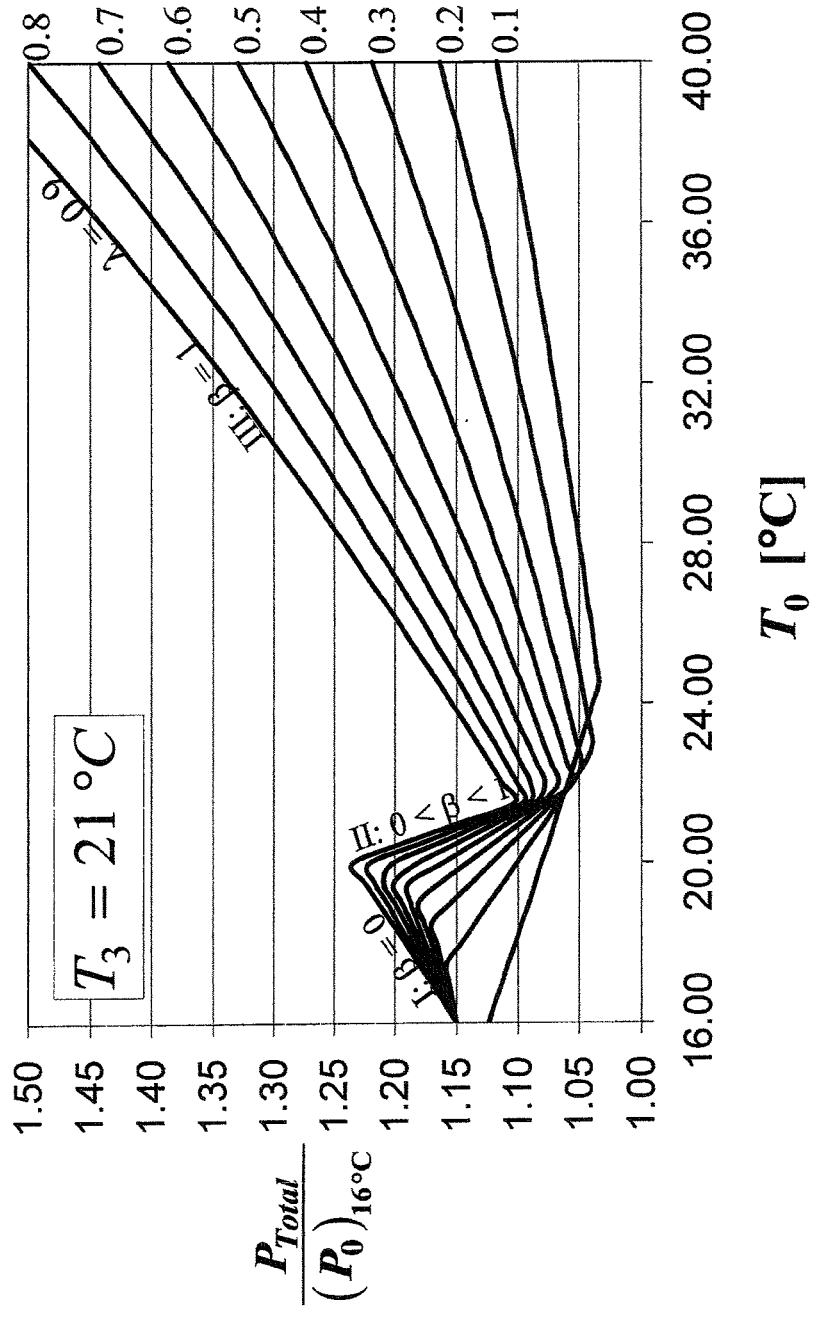
Figure 20:
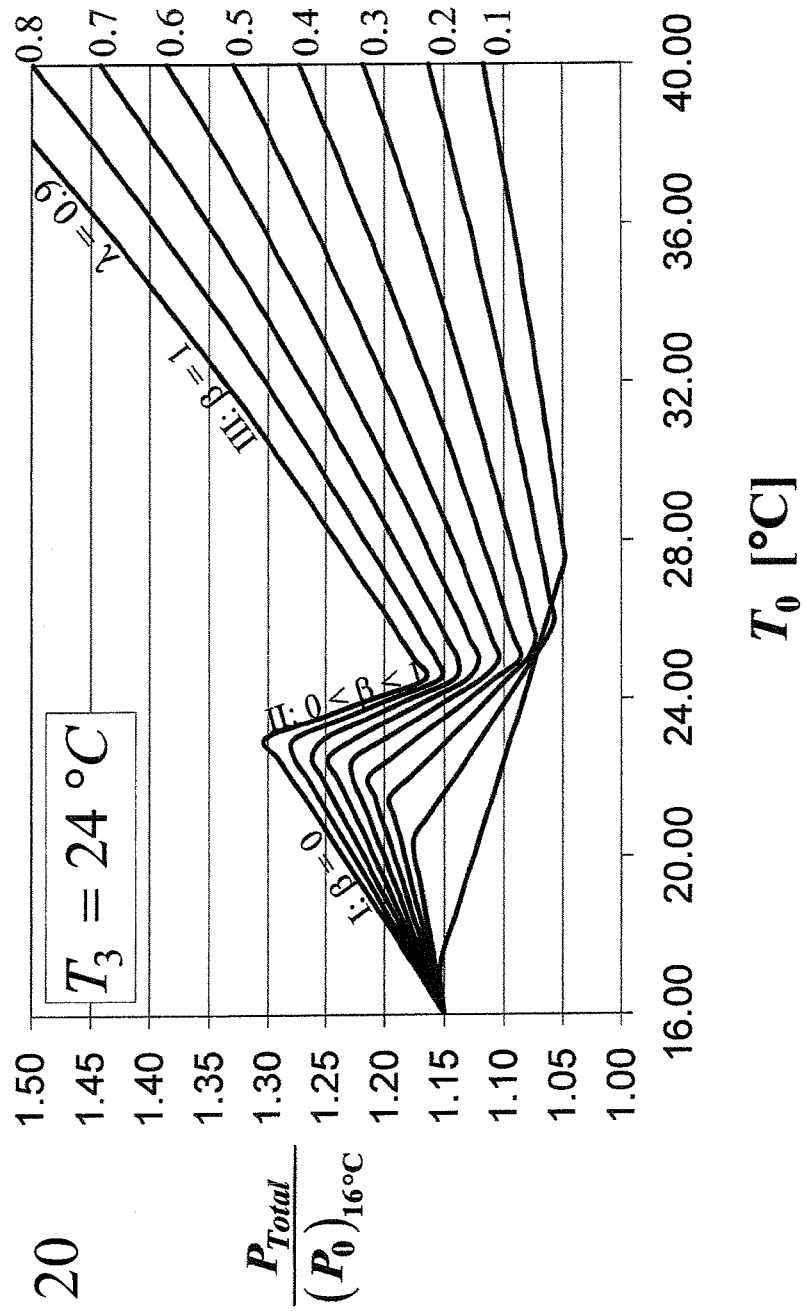

The experiments described above show that the parameters $\lambda$, $P_{ref}$ depend on computational state. However, $P_{ref}$ appears to be related to $\lambda$, as shown on FIG. 14, where regression is used to obtain a best-fit power law to the three Cases tabulated in FIG. 10. Consequently, for purposes of the numerical study below, the following assumption is adopted for the 32-chip Blue Gene system:

$$P_{ref}=169.42\lambda^{-0.91957}. \quad (84)$$

7. Dependence of Total Power $P_{Total}$ on Parameters

The above results characterizing computer power $P_0$ may now be used to study $P_{Total}=P_0+P_{Cool}$, where equation (50) for $P_{Total}$ may be renormalized as $$\frac{P_{Total}}{(P_0)_{16° C.}} = [1 + (1-\beta)\alpha]\frac{P_0}{(P_0)_{16° C.}}. \quad (85)$$

The computation occurs in four steps. First, $$\frac{P_0}{P_{ref}}$$

as a function of $T_0$, denoted $$\frac{P_0}{P_{ref}}(T_0),$$

is found by repeatedly solving the nonlinear algebraic equation (50) for the given set of the parameters $$\lambda, \kappa, \overline{\mathfrak{R}}, P_{ref}, N, \frac{P_{ref}}{\rho c V}, \text{ and } T_{ref}. \tag{86}$$

Second, each result for $$\frac{P_0}{P_{ref}}(T_0)$$

is normalized by the result at $T_0 = 16°$ C., denoted $$\frac{P_0}{P_{ref}}(16° \text{ C.}),$$

to produce $$\frac{P_0}{(P_0)_{16° C.}}(T_0) = \frac{\frac{P_0}{P_{ref}}(T_0)}{\frac{P_0}{P_{ref}}(16° \text{ C.})}. \tag{87}$$

Third, the factor $[1+(1-\beta)\alpha]$ in equation (85) is computed from equations (47) and (48) for the given set of the parameters $$\alpha, \frac{\rho c V}{P_{ref}}, T_0, T_3, \text{ and } \frac{\rho c V}{UA}. \tag{88}$$

Fourth, the results for $$\frac{P_0}{(P_0)_{16° C.}}(T_0)$$

and $[1+(1-\beta)\alpha]$ are combined, in equation (85), to produce $$\frac{P_{Total}}{(P_0)_{16° C.}}.$$

Numerical values of the several parameters shall now be adopted for use in FIGS. 15-24. Values of $\kappa$, $\overline{\mathfrak{R}}$, $T_{ref}$, N, and $\rho c V$ are adopted from the Blue Gene/Q experiments described above:

$$\kappa = 0.01789; \overline{\mathfrak{R}} = 0.769[° \text{ C./W}]; T_{ref} = 16[° \text{ C.}]; N=32;$$
$$\rho c V = 229[W/° \text{ C.}]. \tag{89}$$

Combining equations (84) and (89) yields the functional relationship between $\lambda$ and the parameter grouping $$\frac{\rho c V}{P_{ref}}$$

that appears in equations (34) and (46):

$$\frac{\rho c V}{P_{ref}} = 1.3517\lambda^{0.91957}. \tag{90}$$

Assume that the free-cooling heat exchanger, sized to handle the small amount of power represented by the 32 Blue Gene/Q compute chips, has the figure of merit $$UA = 458[W/° \text{ C.}], \tag{91}$$

which is tantamount to assuming the dimensionless parameter $$\frac{\rho c V}{UA} = 0.5. \tag{92}$$

Assume that the chiller consumes 15% of the heat that it transfers, so $$\alpha = 0.15. \tag{93}$$

As a result of the numerical assumptions above, $$\frac{P_{Total}}{(P_0)_{16° C.}}$$

vs. $T_0$ may be plotted, as a function of just two free parameters, $\lambda$ and $T_3$, because all other parameters are known or assumed from equations (89) through (93). Specifically, the numerical values of $\kappa$, $\overline{\mathfrak{R}}$, N, and $\rho c V$ are known for the given system of 32 Blue Gene/Q compute chips, the numerical values of $T_{ref}$, $$\frac{\rho c V}{UA},$$

and $\alpha$ are assumed, and the numerical values of $P_{ref}$ and $$\frac{\rho c V}{P_{ref}}$$

depend only on $\lambda$, according to equations (84) and (90). The two free parameters $\lambda$ and $T_3$ correspond to the two primary variables of the system 500; namely, the computational state, as represented by $\lambda$, and the weather, as represented by $T_3$, inasmuch as $T_3$ is related to wet-bulb temperature, according to equation (12).

To illustrate the computation process described above, consider the case $$\lambda=0.5; \, T_3=21° \text{ C.}; \, T_0=20° \text{ C.} \tag{94}$$

Substituting (94) into equation (84) produces $$P_{ref}=169.42(0.5)^{-0.91957}=320.47 \text{ W.} \tag{95}$$

Substituting values from equations (89), (94) and (95) into equation (34) yields, after several iterations, $$\frac{P_0}{P_{ref}}(T_0 = 20° \text{ C.}) = 1.127. \tag{96}$$

Repeating the latter procedure with $T_0=16°$ C. produces $$\frac{P_0}{P_{ref}}(T_0 = 16° \text{ C.}) = 1.080. \tag{97}$$

Substituting equations (96) and (97) into equation (87) yields $$\frac{P_0}{(P_0)_{16° C.}}(T_0 = 20° \text{ C.}) = \frac{1.127}{1.080} = 1.044. \tag{98}$$

Substituting equations (89), (92), (94), (95), and (96) into equation (47) and (48) yields $$\beta=\hat{\beta}=0.244. \tag{99}$$

Substituting (93), (98), and (99) into (85) yields $$\frac{P_{Total}}{(P_0)_{16° C.}} = [1 + (1 - 0.244)(0.15)](1.044) = 1.162. \tag{100}$$

If the three free parameters in (94) only $\lambda$ affects $(P_0)_{16° C.}$. As shown on FIG. 15, numerical studies of the type just described show that, given (84), (89), and (93), $$(P_0)_{16° C.}=182.83\lambda^{-0.92338}[W]. \tag{101}$$

Equation (101) is helpful to interpret physically subsequent plots where $P_{Total}$ is normalized by $(P_0)_{16° C.}$.

Repeating the calculations represented by (94) through (100) many times, for various values of the three parameters in (94), yields FIGS. 16 through 24, in which $$\frac{P_{Total}}{(P_0)_{16° C.}}$$

is plotted vs. $T_0$, $\lambda$, and $T_3$. That is, FIGS. 16 through 24 show how the total system power $P_{Total}$ (computer power plus chiller power) varies as a function of coolant inlet temperature ($T_0$), computational state (as represented by $\lambda$) and weather (as represented by $T_3$). In these plots, $T_0$ varies over the full practical range of inlet coolant temperature, $$(T_0)_{min} \leq T_0 \leq (T_0)_{max}, \tag{102}$$

where $(T_0)_{min} \equiv 16°$ C. and $(T_0)_{max} \equiv 39°$ C. as discussed in connection with equations (14) and (15).

In general, each curve on FIGS. 16-24 has either one, two, or three segments. From left to right, these segments are denoted as Regimes I, II, and III. The three Regimes correspond to the value of the "free-cooling" fraction $\beta$, defined by equations (47) and (48) above:

Regime I: $\beta=0$ (No free cooling)

Regime II: $0<\beta<1$ (Mixed free cooling and chiller cooling)

Regime III: $\beta=1$ (100% free cooling). (103)

Figure 21:
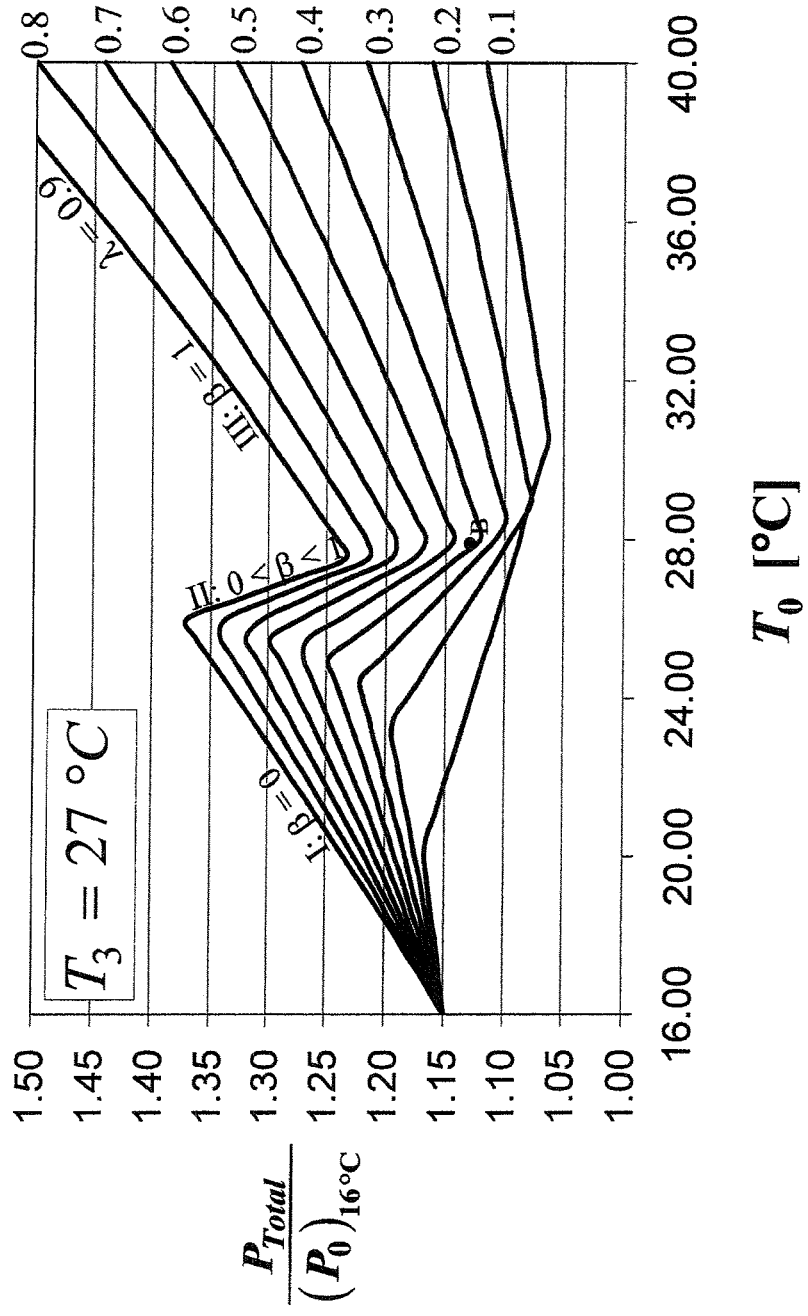

For example, for the curve $\lambda=0.9$ on FIG. 21, Regime I prevails for $T_0 \leq 25.9°$ C., Regime II prevails for $25.9°$ C.$<T_0 \leq 27.6°$ C., and Regime III prevails for $T_0>27.6°$ C. Physically speaking, Regime I prevails when the temperature $T_3$ of the water returned from the cooling tower 538 to the free-cooling heat exchanger 530 is so warm that free-cooling cannot provide any assistance in achieving the specified value of $T_0$. Consequently, Regime I tends to occur when $T_3$ is high and $T_0$ is low; for example, on the left portion of FIGS. 22 through 24. Regime II prevails when $T_3$ is cool enough to allow the free-cooling heat exchanger 530 to provide some but not all of the cooling required to achieve the specified value of $T_0$. Regime III prevails when $T_3$ is cool enough to allow free-cooling to provide all of the cooling required to achieve the specified value of $T_0$. Consequently, Regime III occurs then $T_3$ is low and/or the specified value of $T_0$ is high; for example, on the right portion of FIGS. 16-23.

On FIGS. 16-24, for each curve where boundaries between Regimes exist, let $$(T_0)_{Local\ Max} \equiv \text{Boundary between Regimes I and II,} \tag{104}$$

typically corresponding to a local maximum of $\frac{P_{Total}}{(P_0)_{16° C.}}$;

$$(T_0)_{Local\ Min} \equiv \text{Boundary between Regimes II and III,} \tag{105}$$

typically corresponding to a local minimum of $\frac{P_{Total}}{(P_0)_{16° C.}}$.

Figure 22:
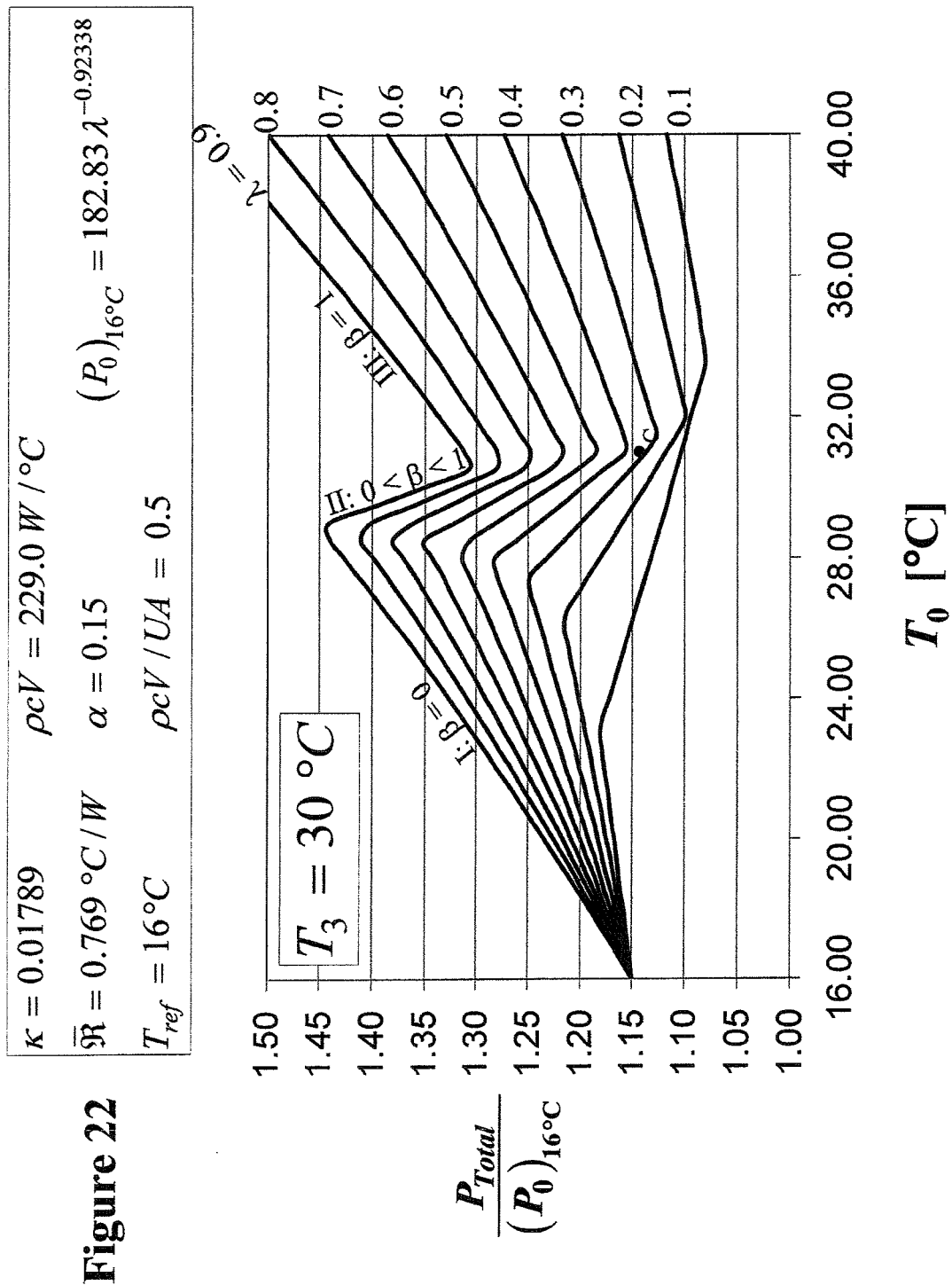
Figure 23:
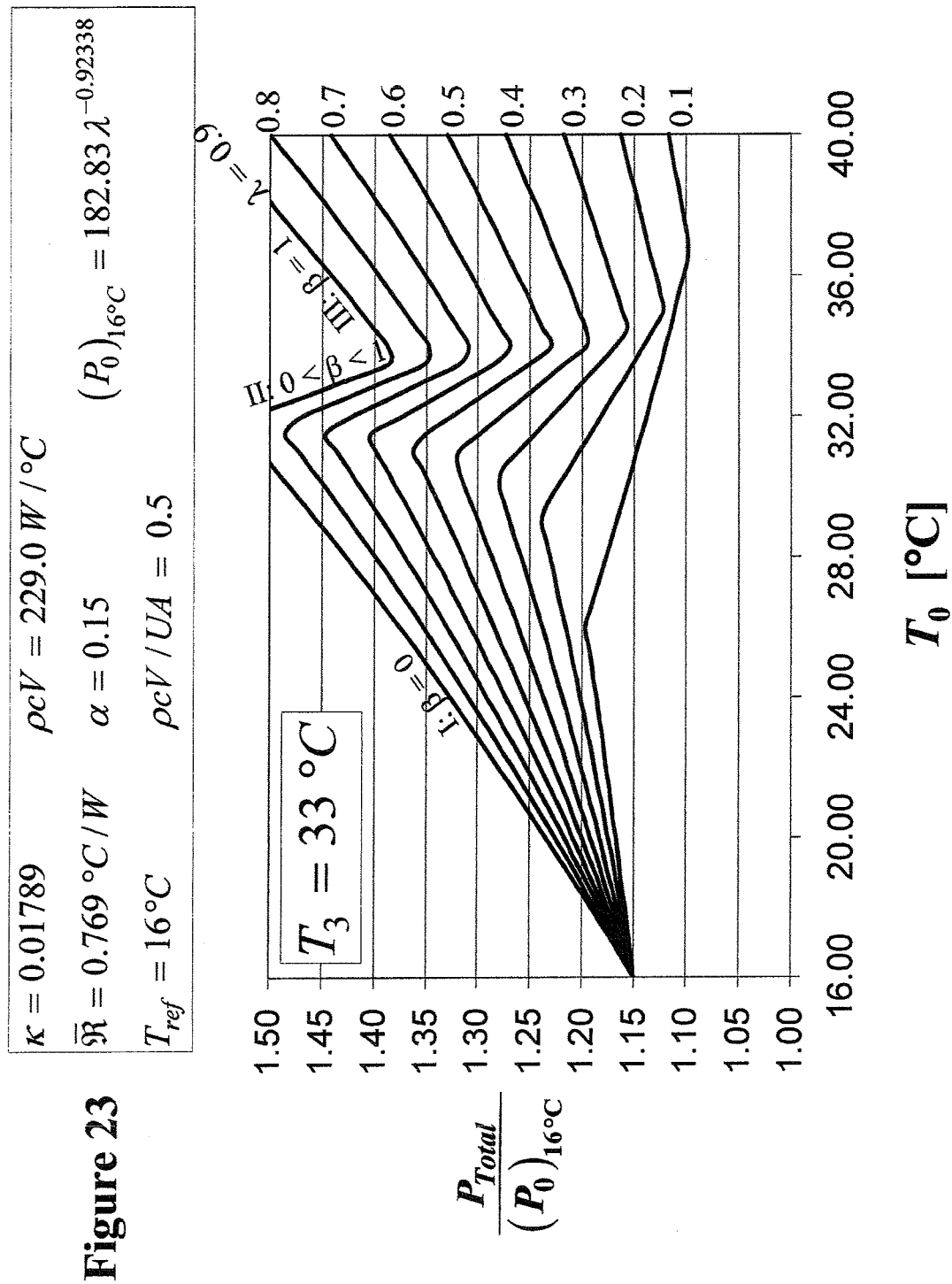
Figure 24:
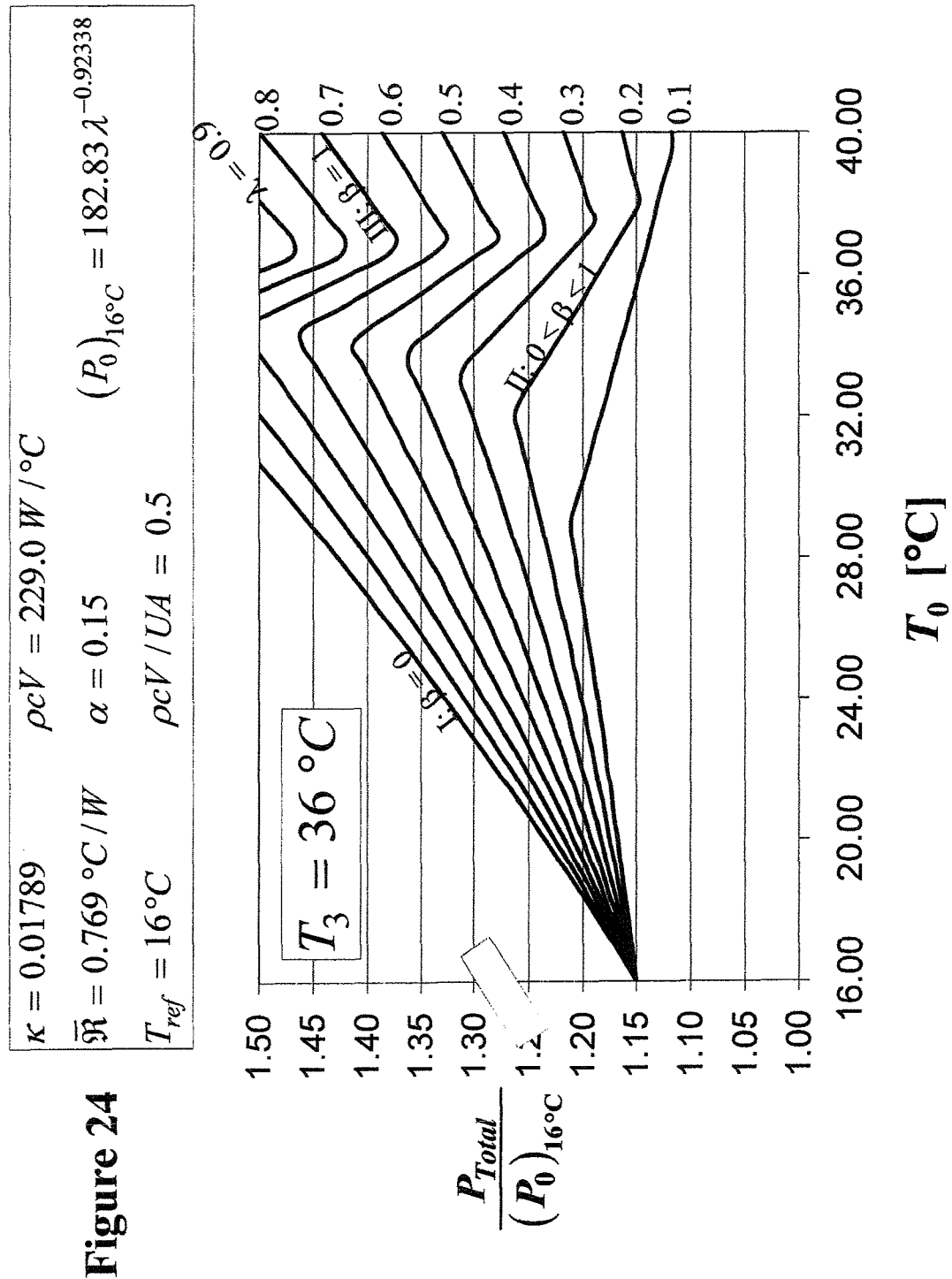

For example, referring to the aforesaid curve $\lambda=0.9$ on FIG. 22, $$(T_0)_{Local\ Max}=25.9° \text{ C. and}$$

$$(T_0)_{Local\ Min}=27.6° \text{ C.}$$

In general, $P_{Total}$ always increases with $T_0$ in Regimes I and III, due to the exponential dependence of $P_0$ on $T_0$ in equation (33). $P_{Total}$ typically decreases with $T_0$ in Regime II, due to the gradual onset of free cooling, where $\beta$ grows from 0 to 1, and thus the factor $[1+(1-\beta)\alpha]$ in equation (85) decreases. However, depending on parameters, particularly $\kappa$, the aforesaid exponential growth in $P_0$ may, in equation (85), outweigh the decrease of $[1+(1-\beta)\alpha]$. In such a case, $P_{Total}$ is monotonically increasing with $T_0$, no local minimum exists at the boundary between Regimes II and III, and $(T_0)_{Local\ Min}$ is a mis-nomer. Nevertheless, for all cases shown herein, the local minimum at $(T_0)_{Local\ Min}$ exists.

Two features of FIGS. 16-24 require explanation. First, on FIG. 16, Regime III prevails throughout, which means that the chiller is idle throughout, so $P_{Cool}=0$, whence $P_{Total}=P_0$. Second, for all curves on FIGS. 19-24, where Regime I prevails at $T_0=16°$ C., $$\frac{P_{Total}}{(P_0)_{16° C.}} = 1.15 \ @ \ T_0 = 16° C. \tag{106}$$

This is a natural consequence of assumption (93), α=0.15, because, according to equation (85), in Regime I where β=0, $$\frac{P_{Total}}{(P_0)_{16° C.}}\bigg|_{T_0=16° C.} = [1 + (1 - \beta)\alpha] \tag{107}$$

$$\frac{P_0}{(P_0)_{16° C.}}\bigg|_{T_0=16° C.} = [1 + (1 - 0)(0.15)](1) = 1.15.$$

That is, at $T_0=16°$ C., the fully utilized chiller consumes 15% of $P_0$, so total power is $1.15P_0$.

It is clear that, as $T_3$ increases beyond a certain point, free cooling ceases to produce lower total power $P_{Total}$ compared to conventional cooling at $T_0=16°$ C. Specifically, FIG. 25, which is derived from FIGS. 16-24, compares the free-cooling-induced induced local minima in FIGS. 16-24, denoted $(P_{Total})_{Local \ Min}$, to the value of $P_{Total}$ at $T_0=16°$ C., denoted $(P_{Total})_{16° \ C.}$. For example, on FIG. 22 ($T_3=30°$ C.), on the curve λ=0.9, $$\frac{(P_{Total})_{Local \ Min}}{(P_0)_{16° C.}} = 1.302 \ @ \ T_0 = 30.6° \ C., \tag{108}$$

whereas $$\frac{(P_{Total})_{16° C.}}{(P_0)_{16° C.}} = 1.15 \ @ \ T_0 = 16° \ C.. \tag{109}$$

Consequently, $$\frac{(P_{Total})_{Local \ Min}}{(P_{Total})_{16° C.}} = \frac{1.302}{1.15} = 1.132 \tag{110}$$

Figure 25:
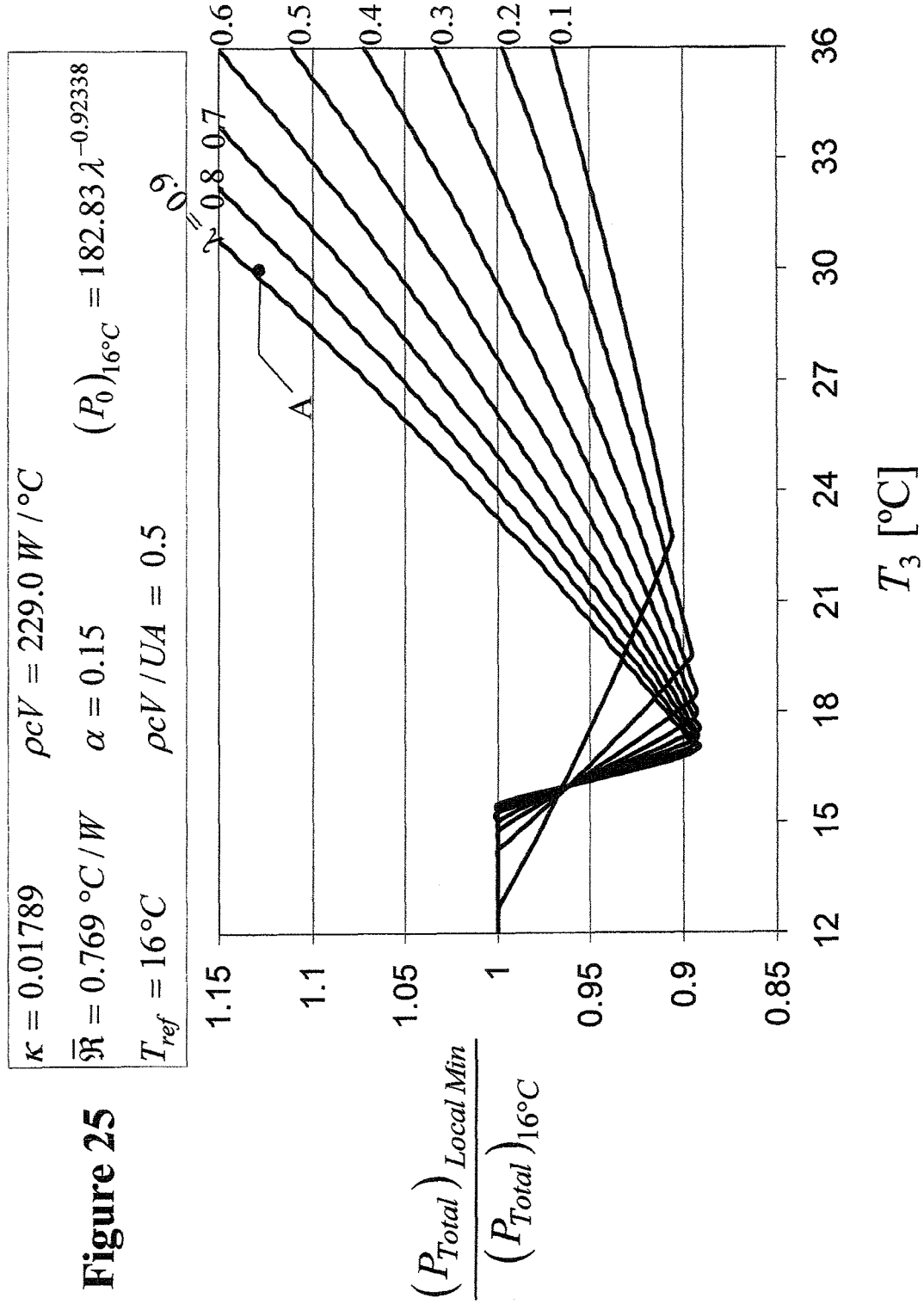
FIG. 25, derived from FIGS. 16-24, illustrates a comparison of the minimum power consumed using 100% free cooling vs. the power consumed at a low coolant temperature in the absence of free cooling, as a function of the computational-state parameter $\lambda$ and the weather-related temperature $T_3$.

The value in equation (110) appears on FIG. 25 as Point A. This example is an illustration of the fact that the local minimum of total power $P_{Total}$, which is achieved by using 100% free cooling, is not necessarily the global minimum of total power. In this case, the free-cooling local minimum at $T_0=30.6°$ C. actually requires 13.2% more power than the global minimum at $T_0=16°$ C., because the higher temperature required to use free cooling incurs more additional leakage power than it saves by eliminating chiller power. This is true whenever the curves in FIG. 25 are above 1.00 on the vertical axis.

8. Optimal Coolant Temperature $T_0^*$

Figure 26:
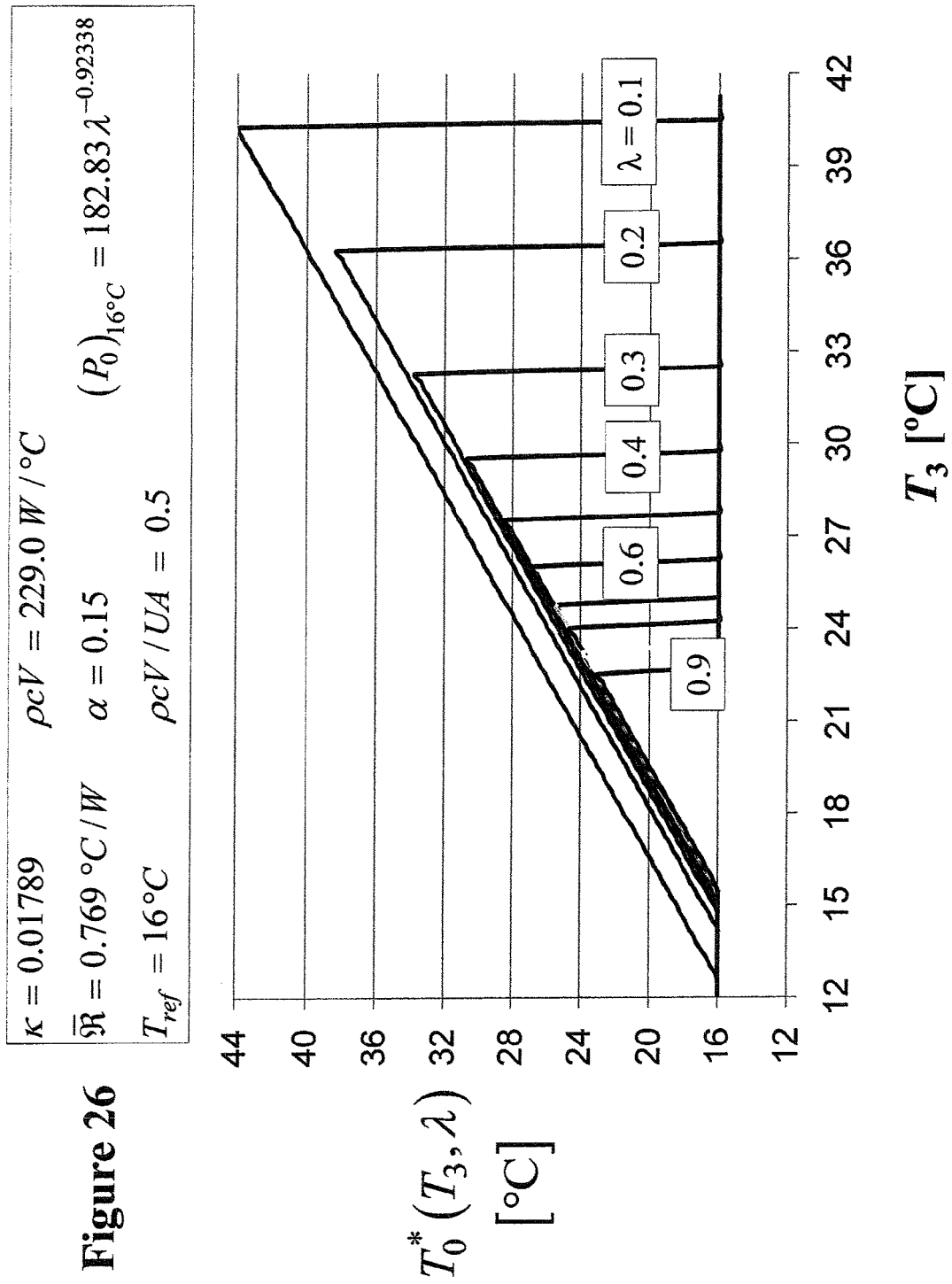
FIG. 26, also derived from FIGS. 16-24, plots the optimal, $P_{Total}$-minimizing coolant temperature as a function of the computational-state parameter $\lambda$ and the weather-related temperature $T_3$.

Referring now to FIG. 26, an example of the principal result of this analysis is shown; namely, a map of the optimal, most power-efficient inlet coolant temperature, denoted $T_0^*$, as a function of the computational state parameter λ and the weather-related parameter $T_3$. This map of $T_0^*$ is found by computations like those plotted on FIGS. 16-24, except that a much finer gradation in $T_3$ is used, and the global minimum of each curve is saved. These computations yield, for each combination of λ and $T_3$, the value of $T_0^*$ that produces the global minimum of $$\frac{P_{Total}}{(P_0)_{16° C.}},$$

whether this minimum be the local minimum defined by equation (105), or whether it be the "edge minimum" at 16° C., as discussed in the previous paragraph. For each value of λ, the optimal value $T_0^*$ is 16° C. for low values of $T_3$, then rises linearly with $T_3$, and then suddenly drops again to $T_0^*=16°$ C. The reason for the sudden drop is explained by the interplay between the aforementioned local minimum and the edge minimum at $T_0^*=16°$ C. For example, consider the curves for λ=0.4 on FIG. 21 ($T_3=27°$ C.) and FIG. 22 ($T_3=30°$ C.). The local minimum of the curve on FIG. 21, $$\frac{P_{Total}}{(P_0)_{16° C.}} = 1.120 \ at \ T_0 = 28.1° \ C.,$$

denoted Point B, is slightly below the edge minimum $$\frac{P_{Total}}{(P_0)_{16° C.}} = 1.15 \ at \ T_0 = 16° \ C.,$$

whereas the local minimum on FIG. 22, $$\frac{P_{Total}}{(P_0)_{16° C.}} = 1.155$$

at $T_0=31.1°$ C., denoted Point C, is slightly above the edge minimum. It is clear that at some "critical" value of $T_3$ between $T_3=27°$ C. and $T_3=30°$ C., the value of the local minimum will be exactly $$\frac{P_{Total}}{(P_0)_{16° C.}} = 1.15$$

at an abscissa value of $T_0=(T_0)_{Local \ Min}$. At this "critical" value of $T_3$, the value of $T_0$ that minimizes $$\frac{P_{Total}}{(P_0)_{16° C.}}$$

will, as a function of $T_3$, suddenly jump from the local minimum at $T_0^*=(T_0)_{Local \ Min}$ to the edge minimum at $T_0^*=16°$ C. In the example with λ=0.4, this sudden shift is reflected in FIG. 26 as the near-vertical segment of the λ=0.4 curve at $T_3=29.5°$ C. Once the optimum coolant temperature $T_0^*$ has "downshifted" in this manner to 16° C., it remains at 16° C. for all higher values of $T_3$.

9. Downshift Boundary

FIG. 27 summarizes the downshift behavior described above by showing the downshift-boundary curve 2702, where each of the diamond-shaped points on curve 2702 is a combination of ($T_3$, λ) in FIG. 26 where the downshift from $T_0^*=(T_0)_{Local \ Min}$ to $T_0^*=(T_0)_{Local \ Min}$ occurs. Consequently, in the region of ($T_3$, λ) space below the downshift-boundary curve 2702, 100% free-cooling (β=1) is optimal: to minimize total power in this region of ($T_3$,λ) space, the coolant temperature should be whatever the free-cooling system can provide, namely $(T_0)_{Local \ Min}$, provided this coolant temperature does not imply equipment temperatures that exceed the equipment's thermal limitations. However, in the region of ($T_3$,λ) space above the downshift-boundary curve 2702, 100% chiller cooling (β=0) is optimal: to minimize total power in this region of ($T_3$,λ) space, the coolant temperature should be as low as possible consistent with the avoidance of condensation, typically 16° C.

The quantitative results shown in FIGS. 16 through 27—in particular the location of the downshift-boundary curve in FIG. 27—depend on the set of parameters given by equations (89) through (93), to which all of the FIGS. 16 through 27 apply. To understand how the results depend on parameters, consider variation of the four parameters $\kappa$, $\bar{\mathfrak{R}}$, $$\frac{\rho cV}{UA}$$

and $\alpha$, as tabulated in FIG. 28, whose left-hand column refers to FIGS. 29 through 32. FIGS. 29 through 32 illustrate how the downshift boundary varies with $\kappa$, $\bar{\mathfrak{R}}$, $$\frac{\rho cV}{UA}$$

and $\alpha$ respectively. Numerical values written in bold-face type in FIG. 28 are the nominal values used for the earlier FIGS. 16 through 27. As each of the four parameters $\kappa$, $\bar{\mathfrak{R}}$, and $$\frac{\rho cV}{UA}$$

and $\alpha$ is varied in FIGS. 29-32, the other three parameters are held at these nominal values.

Figure 29:
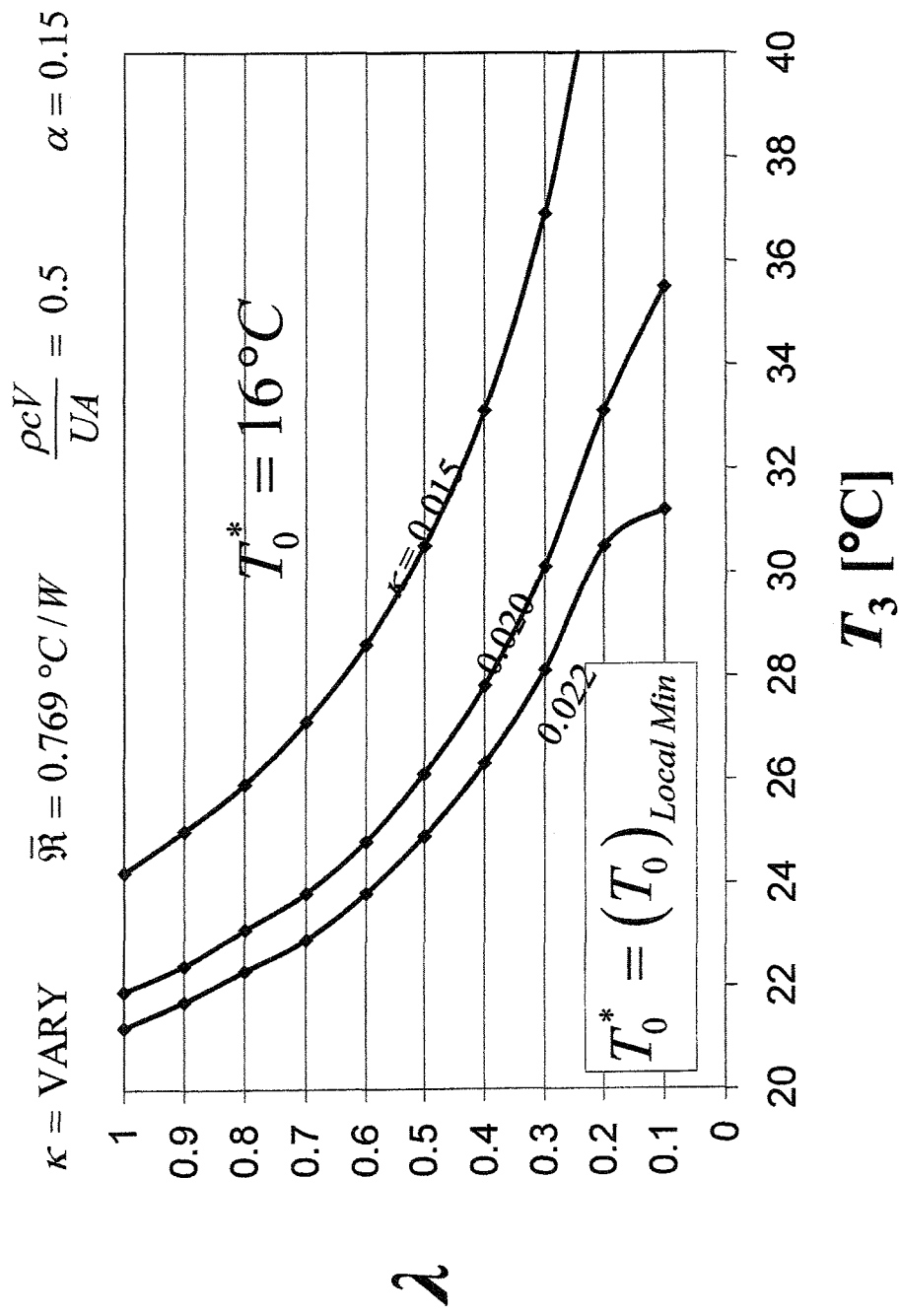
FIG. 29 is similar to FIG. 27, except that parameter $\kappa$ takes on several values, thereby showing how the downshift boundary depends on $\kappa$.

FIG. 29 demonstrates that the location of the downshift boundary is a strong function of $\kappa$, as expected, because $\kappa$ is a factor in the exponent of both exponential functions in equation (34). Increasing $\kappa$ pulls the downshift boundary to the left, because higher $\kappa$ implies that computer power $P_0$ is more sensitive to temperature, which makes the higher coolant temperatures required by free cooling less effective at saving power. Thus, an accurate knowledge of $\kappa$ for a given system is important in determining where the downshift boundary actually lies.

Figure 30:
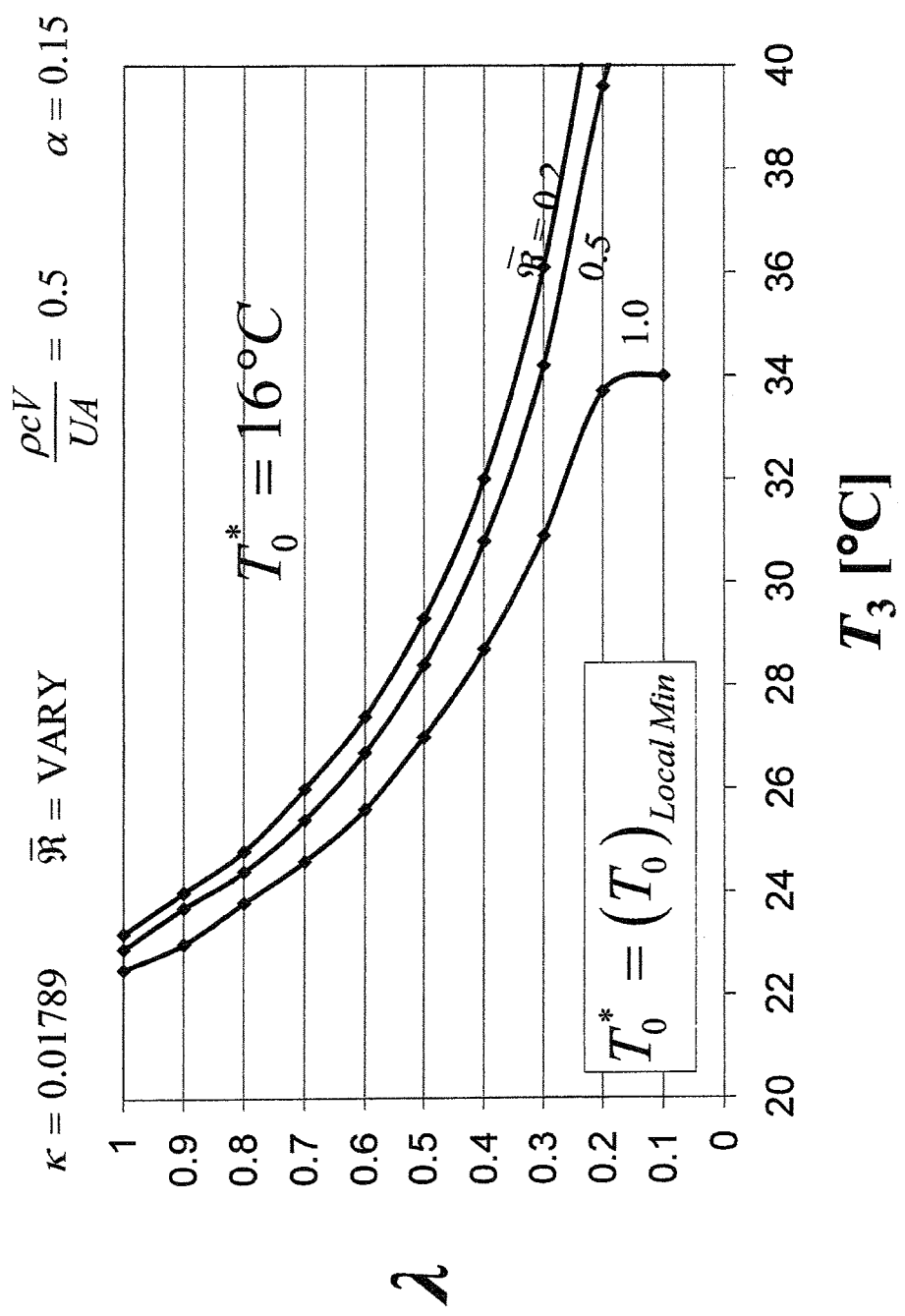
FIG. 30 is similar to FIG. 27, except that parameter $\bar{\mathfrak{R}}$ takes on several values, thereby showing how the downshift boundary depends on $\bar{\mathfrak{R}}$.

FIG. 30 shows the downshift boundary's dependence on thermal impedance $\bar{\mathfrak{R}}$. This dependence is strongest at small values of $\lambda$, values which are important for many computational states, based on the values of $\lambda$ tabulated in FIG. 11. Increasing $\bar{\mathfrak{R}}$ pulls the downshift boundary to the left for the same reason that increasing $\kappa$ pulls it to the left: $P_0$ is more sensitive to temperature. Thus, an accurate knowledge of $\bar{\mathfrak{R}}$ for a given system is important in determining where the downshift boundary lies.

Figure 31:
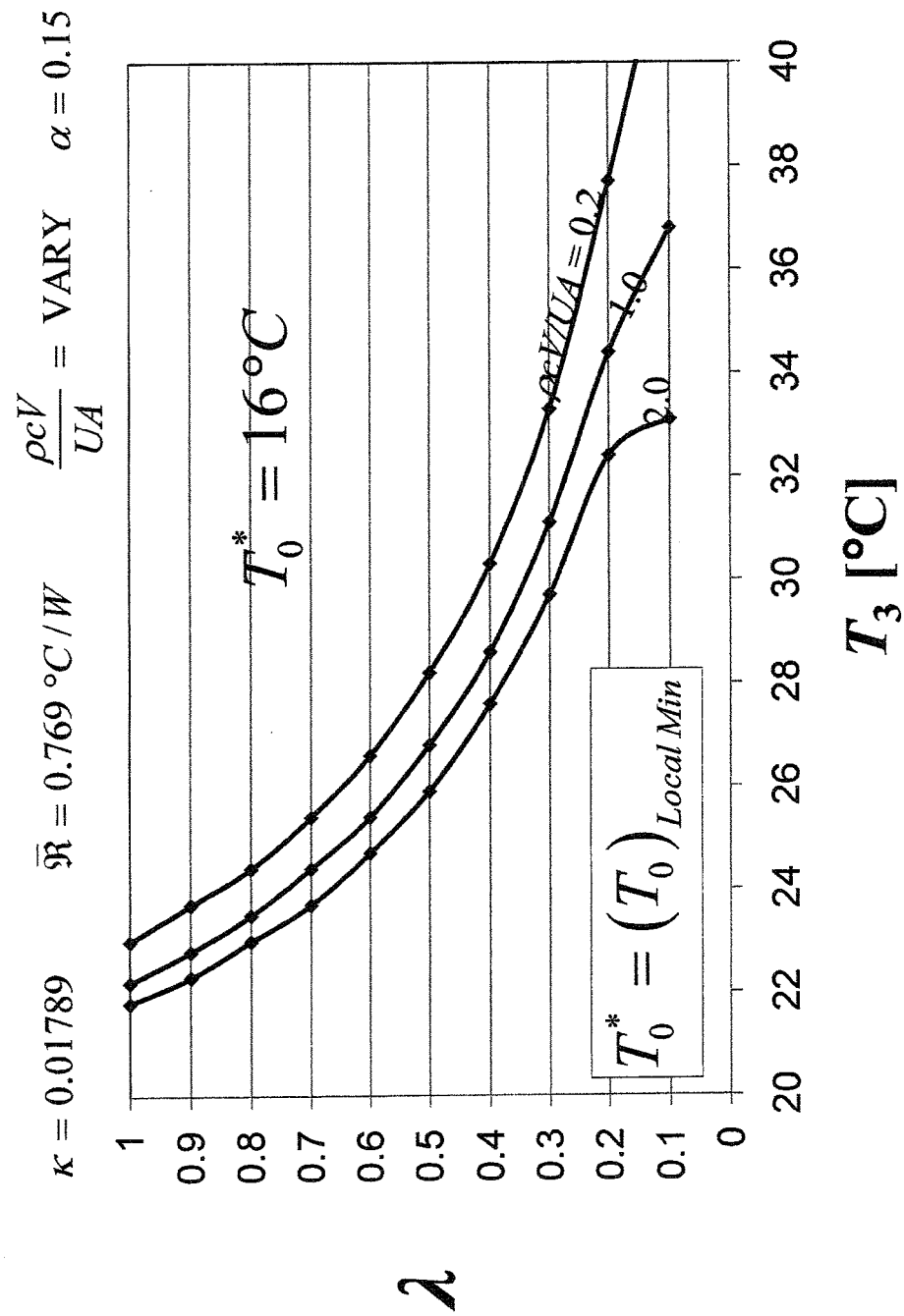
FIG. 31 is similar to FIG. 27, except that a dimensionless grouping of parameters, $$\frac{\rho c V}{UA},$$

FIG. 31 shows the downshift boundary's dependence on the dimensionless group $$\frac{\rho cV}{UA}.$$

As $$\frac{\rho cV}{UA}$$

increases, the downshift boundary moves to the left. Physically, this corresponds to the fact that $$\frac{\rho cV}{UA}$$

increases as UA decreases, which makes sense: UA is the figure of merit for the free-cooling heat exchanger, so lower UA implies a less effective free-cooling system, which impedes its usefulness at high $T_3$, thereby pushing the downshift boundary leftward.

FIG. 32 shows the downshift boundary's dependence on $\alpha$. Decreasing $\alpha$ pulls the downshift boundary to the left. Physically, this corresponds to the fact that $\alpha$ is the chiller figure of merit: smaller $\alpha$ implies a more efficient chiller, which favors the 100% chiller solution $T_0^* = 16°$ C. over the 100% free-cooling solution $T_0^*$ $(T_0)_{Local\ Min}$.

FIGS. 29 through 32 show that, for temperate climates, operation of modern, CMOS-based electronics is likely to take place below the downshift boundary, where overall power consumption is minimized by using the coolant temperature $(T_0)_{Local\ Min}$ that is naturally provided by 100% free cooling. However, in climates with high wet-bulb temperature, where $T_3$ is large, operation of CMOS-based electronics may well take place above the downshift boundary, where overall power consumption is minimized by using a coolant temperature that is as low as possible, typically 16° C., despite the availability of free cooling. Thus, especially in high-wet-bulb climates, this invention may be utilized to minimize power consumption in data centers and similar installations of electronics.

In summary, the mathematical model presented above as equations (24) through (50), as well as the numerical examples of this model presented as FIGS. 10 through 31, make it clear that, when electronics such as computers are cooled by a system involving the complementary use of a conventional chiller and a free-cooling system, the temperature dependence of the electronics' power must be taken into account to reach the best, most energy-efficient choice of coolant temperature $T_0$. Particularly in climates having high wet-bulb temperatures, it is wrong to believe that using the high coolant temperature required to achieve free cooling is necessarily energy efficient merely because it extends the reach of free cooling. Rather, the total consumed power under various conditions of weather and computational load must be ascertained as a function of coolant temperature $T_0$ to choose between 100% free cooling or 100% conventional, chiller-based cooling, these two choices being the two potential optima revealed by the downshifting phenomenon described above. However, because the mathematical model above cannot possibly capture all the complexities of a real system, physical measurement of the total power under various conditions is necessary to develop the optimal cooling strategy vs. computational state and weather conditions. The current invention provides apparatus and various methods to accomplish this goal.

Additional Embodiments Suggested by the Mathematical Model

The mathematical model above shows that the optimum, energy-minimizing coolant temperature $T_0^*$ is either $(T_0)_{min}$ or $(T_0)_{Local\ Min}$. The former temperature, $(T_0)_{min}$, is defined by equation (26), or more generally as slightly higher than the machine room's ambient dew-point temperature. The latter temperature, $(T_0)_{Local\ Min}$, is defined by equation (105). This mathematical result greatly simplifies the calibration algorithm 400 in FIG. 4 described above in connection with the first embodiment: according to the mathematical model, it is not necessary to test a multitude of values of the set-point coolant temperature $(T_0)_{set}$ at line (414); rather, it is only necessary to test the two values $(T_0)_{min}$ and $(T_0)_{Local\ Min}$. The value of $(T_0)_{min}$ is given either by adherence to a blanket standard, such as the ASHRAE 2008 Class 1 guideline, $T_{Dew\ point}=15°\ C.$, which suggests $(T_0)_{min}=16°\ C.$, or by direct measurement of the ambient dew-point and application of a rule such as $$(T_0)_{min} = T_{DewPoint} + 1°\ C. \tag{112}$$

For given weather conditions, the value of $(T_0)_{Local\ Min}$ is provided by the system 300 itself: it is the temperature at which coolant 306 is returned to machine room 304 if the free-cooling heat exchanger 330 is used while the chiller 310 is turned off or bypassed.

Consequently, referring to FIG. 33, an additional embodiment of this invention is identical to apparatus 300 except that the calibration algorithm 400 in FIG. 4, executed by processing device 318, is replaced by calibration algorithm 3300, which is identical to algorithm 400 except that lines 414 through 432 are replaced by lines 3314 through 3340. That is, the "for loop" at line 414, which specifies that a multitude of values of $(T_0)_{set}$ tested, is replaced by the "for loop" at line 3314, which specifies that only two values of $(T_0)_{set}$ be tested, namely $(T_0)_{min}$ and $(T_0)_{Local\ Min}$.

Likewise, referring to FIG. 34, yet another embodiment of this invention is identical to apparatus 500 except that the operational algorithm 600 in FIG. 6, executed by processing device 518, is replaced by operational algorithm 3400, which is identical to algorithm 600 except that lines 614 through 632 are replaced by lines 3414 through 3440. That is, the "for loop" at line 614, which specifies that a multitude of values of $(T_0)_{set}$ be tested, is replaced by the "for loop" at line 3414, which specifies that only two values of $(T_0)_{set}$ be tested, namely $(T_0)_{min}$ and $(T_0)_{Local\ Min}$.

Computer Implementations

FIG. 35 illustrates an exemplary hardware configuration of a computing system 3500. The hardware configuration preferably has at least one processor or central processing unit (CPU) 3511. The CPUs 3511 are interconnected via a system bus 3512 to a random access memory (RAM) 3514, read-only memory (ROM) 3516, input/output (I/O) adapter 3518 (for connecting peripheral devices such as disk units 3521 and tape drives 3540 to the bus 3512), user interface adapter 3522 (for connecting a keyboard 3524, mouse 3526, speaker 3528, microphone 3532, and/or other user interface device to the bus 3512), a communication adapter 3534 for connecting system 3500 to a data processing network, the Internet, an Intranet, a local area network (LAN), etc., and a display adapter 3536 for connecting the bus 3512 to a display device 3538 and/or printer 3539 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An apparatus for cooling electronics comprising:
   a. a fluid-moving means for moving fluid coolant in a closed loop, adapted to permit the coolant to enter the electronics at a temperature $T_0$ and leave the electronics at a temperature $T_1$ that is greater than $T_0$;
   b. a free-cooling means for receiving the coolant downstream of the electronics, adapted to permit the coolant to enter the free-cooling means at a temperature substantially equal to $T_1$ and leave the free-cooling means at a temperature $T_2$ that is less than or equal to $T_1$;
   c. a chilling means for receiving coolant downstream of the free-cooling means, adapted to permit the coolant to enter the chilling means at a temperature substantially equal to $T_2$ and leaves the chilling means at the temperature $T_0$ that is less than or equal to $T_2$, thereafter to flow to the electronics to complete the closed loop;
   d. a control means for modulating the operation of the chilling means to obtain a pre-determined value of the temperature $T_0$,
   e. a first power-measurement means to measure electrical power consumption $P_0$ of the electronics;
   f. a second power-measurement means to measure electrical power consumption $P_{Cool}$ of the chilling means; and
   g. a computing means, in communication with the control means and with the first and second power-measurement means, for calculating an optimum coolant temperature $T_0^*$ based on $P_0$ and $P_{cool}$, said optimum coolant temperature $T_0^*$ calculated by:
      directing the control means to produce a series of values of the temperature $T_0$, the $i^{th}$ element of this series being stored in an array denoted $T_0[i]$, each value $T_0[i]$ persisting as the fluid temperature $T_0$ long enough for the apparatus to come to thermal equilibrium, and for the computing means to perform:
         obtaining a reading $P_0[i]$ from the first measurement means;
         obtaining a reading $P_{Cool}[i]$ from the second measurement means;
         computing and storing the total electrical power consumption for $T_0 = T_0[i]$ according to $P_{Total}[i] \equiv P_0[i] + P_{Cool}[i]$; and
      configuring the computing means to:
         find the value $i^*$ of index i for which $P_{Total}[i^*]$ is the minimum of the array $P_{Total}[i]$, and
         select, for subsequent operation of the apparatus, the corresponding coolant temperature $T_0^* \equiv T_0[i^*]$, such that the apparatus will consume, in subsequent operation, the smallest possible amount of electrical power.

2. An apparatus according to claim 1, wherein the series of values of the temperature $T_0$ comprises elements $T_0[1]$ and $T_0[2]$, where $T_0[1]$ is a lowest-permissible coolant temperature, and $T_0[2]$ is a coolant temperature obtained when the free-cooling means provides 100% of the cooling, with the chilling means turned off or bypassed.

3. An apparatus according to claim 2, wherein the lowest-permissible coolant temperature $T_0[1]$ is calculated based on an ambient dew-point temperature $T_{Dew\ Point}$.

4. An apparatus according to claim 3, wherein the lowest-permissible coolant temperature $T_0[1]$ is calculated as $T_0[1] = T_{DewPoint} + 1° C$.

5. An apparatus for cooling electronics comprising:
   a. plumbing including a pump that moves fluid coolant in a closed loop, adapted to permit the coolant to enter the electronics at a temperature $T_0$ and leave the electronics at a temperature $T_1$ that is greater than $T_0$;
   b. a heat exchanger that receives the coolant downstream of the electronics, adapted to permit the coolant to enter the heat exchanger at a temperature substantially equal to $T_1$ and leaves the heat exchanger at a temperature $T_2$ that is less than or equal to $T_1$;
   c. a chiller that receives coolant downstream of the heat exchanger, adapted to permit the coolant to enter the chiller at a temperature substantially equal to $T_2$ and leave the chilling means at the temperature $T_0$ that is less than or equal to $T_2$, thereafter to flow to the electronics to complete the closed loop;
   d. a controller that modulates the operation of the chiller to obtain a pre-determined value of the temperature $T_0$,
   e. a first power meter that measures electrical power consumption $P_0$ of the electronics;
   f. a second power meter that measures electrical power consumption $P_{Cool}$ of the chiller; and
   g. a computer processor, in communication with the controller and with the first and second power meters, programmed to calculate an optimum coolant temperature $T_0^*$ based on $P_0$ and $P_{Cool}$ said computer processor configure to:

direct the controller to produce a series of values of the temperature $T_0$, the $i^{th}$ element of this series being stored in an array denoted $T_0[i]$, each value $T_0[i]$ persisting as the fluid temperature $T_0$ long enough for the apparatus to come to thermal equilibrium, and for the computer processor to:

obtain a reading $P_0[i]$ from the first measurement means;

obtain a reading $P_{Cool}[i]$ from the second measurement means;

compute and store the total electrical power consumption for $T_0=T_0[i]$ according to $P_{Total}[i] \equiv P_0[i]+P_{Cool}[i]$; and the computer processor further configured to:

find the value $i^*$ of index i for which $P_{Total}[i^*]$ is the minimum of the array $P_{Total}[i]$, and select, for subsequent operation of the apparatus, the corresponding coolant temperature $T_0^* \equiv T_0[i^*]$, such that the apparatus will consume, in subsequent operation, the smallest possible amount of electrical power.

6. An apparatus according to claim 5, wherein the series of values of the temperature $T_0$ comprises elements $T_0[1]$ and $T_0[2]$, where $T_0[1]$ is a lowest-permissible coolant temperature, and $T_0[2]$ is a coolant temperature obtained when the free-cooling means provides 100% of the cooling, with the chiller turned off or bypassed.

7. An apparatus according to claim 6, wherein the lowest-permissible coolant temperature $T_0[1]$ is calculated based on an ambient dew-point temperature $T_{Dew\,Point}$.

8. An apparatus according to claim 7, wherein the lowest-permissible coolant temperature $T_0[1]$ is calculated as $T_0[1]=T_{DewPoint}+1°$ C.

9. A method for cooling electronics comprising:

a. providing a fluid coolant with a pre-determined temperature $T_0$;

b. moving the coolant in a closed-loop system so that the coolant enters the electronics at the temperature $T_0$ and leaves the electronics at a temperature $T_1$ that is greater than $T_0$;

c. receiving the coolant in a heat exchanger downstream of the electronics at a temperature substantially equal to $T_1$ and cooling the coolant to a temperature $T_2$ that is less than or equal to $T_1$;

d. receiving the coolant in a chiller downstream of the heat exchanger at a temperature substantially equal to $T_2$ and cooling the coolant to the temperature $T_0$ that is less than or equal to $T_2$, thereafter moving the coolant to the electronics to complete the system's closed loop;

e. measuring an electrical power consumption $P_0$ of the electronics;

f. measuring an electrical power consumption $P_{cool}$ of the chiller; and g. calculating an optimum coolant temperature $T_0^*$ based on $P_0$ and $P_{Cool}$, said calculating $T_0^*$ comprising:

producing a series of values of the temperature $T_0$, the $i^{th}$ element of this series being stored in an array denoted $T_0[i]$, each value $T_0[i]$ persisting as the temperature $T_0$ long enough for the closed-loop system to come to thermal equilibrium and for the following steps to be performed:

obtain a reading $P_0[i]$ from the step of measuring the electrical power consumption $P_0$ of the electronics;

obtain a reading $P_{Cool}[i]$ from the step of measuring electrical power consumption $P_{Cool}$ of the chiller;

compute and store the total electrical power consumption for $T_0=T_0[i]$, namely $P_{Total}[i] \equiv P_0[i]+P_{cool}[i]$;

finding the value $i^*$ of index i for which $P_{Total}[i^*]$ is the minimum of the array $P_{Total}[i]$, and selecting, for subsequent operation of the closed-loop system, the corresponding coolant temperature $T_0^* \equiv T_0[i^*]$, such that the closed loop will consume, in subsequent operation, the smallest possible amount of electrical power.

10. A method according to claim 9, wherein the series of values of the temperature $T_0$ comprises elements $T_0[1]$ and $T_0[2]$, where $T_0[1]$ is a lowest-permissible coolant temperature, and $T_0[2]$ is the coolant temperature obtained when the free-cooling means provides 100% of the cooling, with the chilling means turned off or bypassed.

11. A method according to claim 10, wherein the lowest-permissible coolant temperature $T_0[1]$ is calculated based on an ambient dew-point temperature $T_{Dew\,Point}$.

12. A method according to claim 10, wherein the lowest-permissible coolant temperature $T_0[1]$ is calculated as $(T_0)_{min}=T_{DewPoint}+1°$ C.

* * * * *